US012629981B2

(12) United States Patent
Sanders et al.

(10) Patent No.: US 12,629,981 B2
(45) Date of Patent: May 19, 2026

(54) USER INTERFACES FOR AN ELECTRONIC KEY

(71) Applicant: Apple Inc., Cupertino, CA (US)

(72) Inventors: Matthew Sanders, Santa Clara, CA (US); Mayura Dhananjaya Deshpande, San Carlos, CA (US); Vitalii Kramar, Woodinville, WA (US); Thomas John Miller, San Jose, CA (US); Marcel Van Os, Santa Cruz, CA (US); Trevor W. Young, Livermore, CA (US)

(73) Assignee: Apple Inc., Cupertino, CA (US)

( * ) Notice: Subject to any disclaimer, the term of this patent is extended or adjusted under 35 U.S.C. 154(b) by 114 days.

(21) Appl. No.: 18/628,031

(22) Filed: Apr. 5, 2024

(65) Prior Publication Data

US 2024/0253419 A1 Aug. 1, 2024

Related U.S. Application Data

(63) Continuation of application No. 17/375,767, filed on Jul. 14, 2021, now Pat. No. 11,981,181.

(Continued)

(51) Int. Cl.
*B60R 25/24* (2013.01)
*B60H 1/00* (2006.01)
(Continued)

(52) U.S. Cl.
CPC ..... *B60H 1/00657* (2013.01); *B60H 1/00878* (2013.01); *B60H 1/00985* (2013.01);
(Continued)

(58) Field of Classification Search
CPC .............. B60H 1/00657; B60R 25/245; B60R 2325/20; G06F 3/0482; G06F 9/451; G06F 21/31; G07C 2209/64
See application file for complete search history.

(56) References Cited

U.S. PATENT DOCUMENTS 2,013,027 A 9/1935 Branch
8,353,448 B1 1/2013 Miller et al.
(Continued)

FOREIGN PATENT DOCUMENTS

AU 2021100511 A4 4/2021
AU 2021213717 A1 2/2022
(Continued)

OTHER PUBLICATIONS

Office Action received for Korean Patent Application No. 10-2023-7024663, mailed on Jul. 15, 2025, 12 pages (5 pages of English Translation and 7 pages of Official Copy).
(Continued)

*Primary Examiner* — Vernal U Brown
(74) *Attorney, Agent, or Firm* — YHE Law LLP

(57) ABSTRACT

A computer system is configured to display an accounts user interface that includes a user interface object corresponding to a secure credential that is associated with a vehicle. In response to detecting selection of the user interface object, the computer system displays one or more control user interface objects with different appearances based on a distance between the computer system and the vehicle.

33 Claims, 28 Drawing Sheets

Related U.S. Application Data

(60) Provisional application No. 63/176,805, filed on Apr. 19, 2021.

(51) Int. Cl.

| | |
|---|---|
| *G05D 1/00* | (2006.01) |
| *G06F 3/0482* | (2013.01) |
| *G06F 3/0484* | (2022.01) |
| *G06F 9/451* | (2018.01) |
| *G06F 21/31* | (2013.01) |
| *G06F 21/62* | (2013.01) |
| *G07C 9/00* | (2020.01) |
| *G06F 3/0488* | (2022.01) |

(52) U.S. Cl.
CPC ......... *B60R 25/245* (2013.01); *G05D 1/0016* (2013.01); *G06F 3/0482* (2013.01); *G06F 3/0484* (2013.01); *G06F 9/451* (2018.02); *G06F 21/31* (2013.01); *G06F 21/629* (2013.01); *G07C 9/00309* (2013.01); *B60R 2325/20* (2013.01); *G06F 3/0488* (2013.01); *G07C 2209/64* (2013.01)

(56) References Cited

U.S. PATENT DOCUMENTS

| | | | |
|---|---|---|---|
| 8,381,969 | B1 | 2/2013 | Miller et al. |
| 8,466,875 | B2 | 6/2013 | Nakada et al. |
| 8,720,771 | B2 | 5/2014 | Mackinnon Keith |
| 8,943,187 | B1 | 1/2015 | Saylor |
| 9,324,067 | B2 | 4/2016 | Van Os et al. |
| 9,348,492 | B1 | 5/2016 | Penilla et al. |
| 9,485,251 | B2 | 11/2016 | White et al. |
| 9,608,970 | B1 | 3/2017 | Gehret et al. |
| 9,961,408 | B2 | 5/2018 | Mickelsen et al. |
| 10,057,227 | B1 | 8/2018 | Hess et al. |
| 10,108,909 | B2 | 10/2018 | Sulavik et al. |
| 10,163,105 | B1 | 12/2018 | Ziraknejad et al. |
| 10,164,975 | B1 | 12/2018 | Son et al. |
| 10,192,217 | B1 | 1/2019 | Ellis et al. |
| 10,234,953 | B1 | 3/2019 | Li et al. |
| 10,242,351 | B1 | 3/2019 | Wilson et al. |
| 10,275,956 | B1 | 4/2019 | Gehret et al. |
| 10,282,727 | B2 | 5/2019 | Van Os et al. |
| 10,332,104 | B2 | 6/2019 | Prakash et al. |
| 10,339,521 | B1 | 7/2019 | Bodkin et al. |
| 10,366,387 | B2 | 7/2019 | Aabye et al. |
| 10,373,395 | B1 | 8/2019 | Harned et al. |
| 10,503,912 | B1 | 12/2019 | Kerr |
| 10,621,575 | B1 | 4/2020 | Belleville et al. |
| 10,701,067 | B1 | 6/2020 | Ziraknejad et al. |
| 10,769,625 | B2 | 9/2020 | Pandiarajan et al. |
| 10,776,779 | B1 | 9/2020 | Ellis et al. |
| 10,803,400 | B2 | 10/2020 | Sindia et al. |
| 10,853,791 | B1 | 12/2020 | Ellis et al. |
| 10,878,437 | B2 | 12/2020 | Ye et al. |
| 11,026,085 | B2 | 6/2021 | Grange et al. |
| 11,080,700 | B2 | 8/2021 | Ortiz et al. |
| 11,127,013 | B1 | 9/2021 | Boyd et al. |
| 11,134,294 | B2 | 9/2021 | Lee et al. |
| 11,157,918 | B1 | 10/2021 | Ellison et al. |
| 11,182,774 | B1 | 11/2021 | Boyd et al. |
| 11,206,544 | B2 | 12/2021 | Boyd et al. |
| 11,312,207 | B1 | 4/2022 | Sanders et al. |
| 11,488,140 | B2 | 11/2022 | Bhuptani et al. |
| 11,615,199 | B1 | 3/2023 | Poder et al. |
| 11,748,507 | B2 | 9/2023 | Cool et al. |
| 2002/0120867 | A1 | 8/2002 | Mitchell et al. |
| 2005/0074126 | A1 | 4/2005 | Stanko |
| 2005/0099275 | A1 | 5/2005 | Kamdar et al. |
| 2005/0177867 | A1 | 8/2005 | Toutonghi |
| 2006/0255906 | A1 | 11/2006 | Ghabra et al. |
| 2008/0041936 | A1 | 2/2008 | Vawter |
| 2008/0048022 | A1 | 2/2008 | Vawter |
| 2008/0214150 | A1 | 9/2008 | Ramer et al. |
| 2009/0320125 | A1 | 12/2009 | Pleasant et al. |
| 2010/0026503 | A1 | 2/2010 | Proefke et al. |
| 2010/0075656 | A1 | 3/2010 | Howarter et al. |
| 2011/0077983 | A1 | 3/2011 | Hua et al. |
| 2011/0113363 | A1 | 5/2011 | Hunt et al. |
| 2011/0126003 | A1 | 5/2011 | Engert |
| 2011/0131494 | A1 | 6/2011 | Ono et al. |
| 2011/0165859 | A1 | 7/2011 | Wengrovitz |
| 2011/0202988 | A1 | 8/2011 | Otranen et al. |
| 2011/0231911 | A1 | 9/2011 | White et al. |
| 2011/0282785 | A1 | 11/2011 | Chin |
| 2012/0129493 | A1 | 5/2012 | Vasudevan |
| 2012/0200390 | A1 | 8/2012 | Saravanan |
| 2012/0323664 | A1 | 12/2012 | Klems |
| 2013/0024371 | A1 | 1/2013 | Hariramani et al. |
| 2013/0046600 | A1 | 2/2013 | Coppinger |
| 2013/0073459 | A1 | 3/2013 | Zacarias et al. |
| 2013/0099892 | A1 | 4/2013 | Tucker et al. |
| 2013/0263211 | A1 | 10/2013 | Neuman et al. |
| 2013/0275008 | A1 | 10/2013 | Breed |
| 2013/0304642 | A1 | 11/2013 | Campos |
| 2014/0047331 | A1 | 2/2014 | Feldman et al. |
| 2014/0129053 | A1 | 5/2014 | Kleve et al. |
| 2014/0244494 | A1 | 8/2014 | Davis et al. |
| 2014/0244495 | A1 | 8/2014 | Davis et al. |
| 2014/0244514 | A1 | 8/2014 | Rodriguez et al. |
| 2014/0258110 | A1 | 9/2014 | Davis et al. |
| 2014/0279519 | A1 | 9/2014 | Mattes et al. |
| 2014/0304173 | A1 | 10/2014 | Ersdorff |
| 2014/0365466 | A1 | 12/2014 | Chu et al. |
| 2015/0053757 | A1 | 2/2015 | Williams et al. |
| 2015/0074774 | A1 | 3/2015 | Nema et al. |
| 2015/0081346 | A1 | 3/2015 | Charles |
| 2015/0178721 | A1 | 6/2015 | Pandiarajan et al. |
| 2015/0210287 | A1 | 7/2015 | Penilla et al. |
| 2015/0271175 | A1 | 9/2015 | Je et al. |
| 2015/0278780 | A1 | 10/2015 | Vaidyanathan et al. |
| 2015/0294515 | A1 | 10/2015 | Bergdale et al. |
| 2015/0324791 | A1 | 11/2015 | Khan |
| 2015/0348001 | A1 | 12/2015 | Van Os et al. |
| 2016/0018525 | A1 | 1/2016 | Lanzagorta |
| 2016/0055511 | A1 | 2/2016 | Chidella et al. |
| 2016/0057138 | A1 | 2/2016 | Hoyos et al. |
| 2016/0070447 | A1 | 3/2016 | Righter et al. |
| 2016/0072794 | A1 | 3/2016 | Engert |
| 2016/0078143 | A1 | 3/2016 | Huang et al. |
| 2016/0078581 | A1 | 3/2016 | Maher |
| 2016/0134599 | A1 | 5/2016 | Ross et al. |
| 2016/0180332 | A1 | 6/2016 | Wilczynski |
| 2016/0232518 | A1 | 8/2016 | Butler et al. |
| 2016/0252978 | A1 | 9/2016 | Yoo et al. |
| 2016/0259497 | A1 | 9/2016 | Foss et al. |
| 2016/0294831 | A1 | 10/2016 | Borunda et al. |
| 2016/0295005 | A1 | 10/2016 | Schussmann et al. |
| 2016/0300054 | A1 | 10/2016 | Turgeman et al. |
| 2016/0357752 | A1 | 12/2016 | Yang et al. |
| 2016/0373458 | A1 | 12/2016 | Moreton et al. |
| 2017/0032485 | A1 | 2/2017 | Vemury |
| 2017/0053470 | A1 | 2/2017 | Bergerhoff et al. |
| 2017/0091765 | A1 | 3/2017 | Lloyd et al. |
| 2017/0103388 | A1 | 4/2017 | Pillai et al. |
| 2017/0109901 | A1 | 4/2017 | Raj |
| 2017/0120864 | A1 | 5/2017 | Fischer et al. |
| 2017/0124312 | A1 | 5/2017 | Inoue |
| 2017/0140642 | A1 | 5/2017 | Kim |
| 2017/0151928 | A1 | 6/2017 | Kang et al. |
| 2017/0169528 | A1 | 6/2017 | Kundu et al. |
| 2017/0213211 | A1 | 7/2017 | Sibert et al. |
| 2017/0232933 | A1 | 8/2017 | Nishidai et al. |
| 2017/0243200 | A1 | 8/2017 | Vaidyanathan et al. |
| 2017/0248946 | A1 | 8/2017 | Ogura et al. |
| 2017/0249791 | A1 | 8/2017 | Woo et al. |
| 2017/0286648 | A1 | 10/2017 | Yamaguchi et al. |
| 2017/0286656 | A1 | 10/2017 | Kohli |
| 2017/0337542 | A1 | 11/2017 | Kim et al. |
| 2017/0339151 | A1 | 11/2017 | Van Os et al. |
| 2017/0343200 | A1 | 11/2017 | Lai et al. |
| 2017/0357520 | A1 | 12/2017 | De Vries et al. |

(56) References Cited

U.S. PATENT DOCUMENTS

| | | |
|---|---|---|
| 2017/0357973 A1 | 12/2017 | Van Os et al. |
| 2018/0013769 A1 | 1/2018 | Robinson et al. |
| 2018/0018595 A1 | 1/2018 | Scott et al. |
| 2018/0018664 A1 | 1/2018 | Purves et al. |
| 2018/0029560 A1 | 2/2018 | Mohaupt et al. |
| 2018/0033034 A1 | 2/2018 | Ye et al. |
| 2018/0041503 A1 | 2/2018 | Lindemann |
| 2018/0103414 A1 | 4/2018 | Golsch |
| 2018/0108031 A1 | 4/2018 | Jones et al. |
| 2018/0130044 A1 | 5/2018 | Gage et al. |
| 2018/0165655 A1 | 6/2018 | Marcelle et al. |
| 2018/0165676 A1 | 6/2018 | Bhatt et al. |
| 2018/0167387 A1 | 6/2018 | Bhatt et al. |
| 2018/0186333 A1 | 7/2018 | Santiano et al. |
| 2018/0191501 A1 | 7/2018 | Lindemann |
| 2018/0195874 A1 | 7/2018 | Andrew et al. |
| 2018/0198909 A1 | 7/2018 | Milstein |
| 2018/0260553 A1 | 9/2018 | Hoyos et al. |
| 2018/0265095 A1 | 9/2018 | Joe et al. |
| 2018/0276657 A1 | 9/2018 | Cho et al. |
| 2018/0322488 A1 | 11/2018 | Arana et al. |
| 2018/0335928 A1 | 11/2018 | Van Os et al. |
| 2018/0336327 A1 | 11/2018 | Wallace et al. |
| 2018/0349581 A1 | 12/2018 | Ramalingam |
| 2018/0357846 A1 | 12/2018 | Chen |
| 2018/0367946 A1 | 12/2018 | Best |
| 2019/0043148 A1 | 2/2019 | Vemury |
| 2019/0057412 A1 | 2/2019 | Bhattacharjee et al. |
| 2019/0061687 A1 | 2/2019 | Khalil |
| 2019/0080070 A1 | 3/2019 | Van Os et al. |
| 2019/0080189 A1 | 3/2019 | Van Os et al. |
| 2019/0092279 A1 | 3/2019 | Jarvis et al. |
| 2019/0163876 A1 | 5/2019 | Remme et al. |
| 2019/0164165 A1 | 5/2019 | Ithabathula |
| 2019/0168036 A1 | 6/2019 | Conboy |
| 2019/0168410 A1 | 6/2019 | Conboy |
| 2019/0171998 A1 | 6/2019 | Conboy |
| 2019/0172149 A1 | 6/2019 | Conboy |
| 2019/0172161 A1 | 6/2019 | Conboy |
| 2019/0180021 A1 | 6/2019 | Mukundala |
| 2019/0197527 A1 | 6/2019 | Agarwalla et al. |
| 2019/0213525 A1 | 7/2019 | Haci et al. |
| 2019/0220662 A1 | 7/2019 | Dawoud |
| 2019/0263356 A1 | 8/2019 | Golsch et al. |
| 2019/0287111 A1 | 9/2019 | Cvetkovich et al. |
| 2019/0304216 A1 | 10/2019 | Mendelson et al. |
| 2019/0305949 A1 | 10/2019 | Hamel et al. |
| 2019/0327228 A1 | 10/2019 | Pantfoerder et al. |
| 2019/0355191 A1 | 11/2019 | Jones et al. |
| 2019/0364020 A1 | 11/2019 | Wardell et al. |
| 2019/0370781 A1 | 12/2019 | Van Os et al. |
| 2020/0020196 A1 | 1/2020 | Petersen et al. |
| 2020/0029173 A1 | 1/2020 | Pang et al. |
| 2020/0052905 A1 | 2/2020 | Mathias et al. |
| 2020/0065822 A1 | 2/2020 | Lin et al. |
| 2020/0079320 A1 | 3/2020 | Lacoss-Arnold |
| 2020/0125223 A1 | 4/2020 | Fu |
| 2020/0126052 A1 | 4/2020 | Deliwala et al. |
| 2020/0211031 A1 | 7/2020 | Patil |
| 2020/0254875 A1* | 8/2020 | Strandberg ............ G07C 5/008 |
| 2020/0269811 A1 | 8/2020 | Kim et al. |
| 2020/0320653 A1 | 10/2020 | Hastings et al. |
| 2020/0349244 A1 | 11/2020 | Kim et al. |
| 2020/0387686 A1 | 12/2020 | Jhang et al. |
| 2020/0391049 A1 | 12/2020 | Moffat et al. |
| 2021/0004792 A1 | 1/2021 | Kikinis et al. |
| 2021/0014678 A1 | 1/2021 | Seagraves et al. |
| 2021/0089635 A1 | 3/2021 | Weeresinghe |
| 2021/0127233 A1 | 4/2021 | Santavicca et al. |
| 2021/0168602 A1 | 6/2021 | Kim et al. |
| 2021/0229630 A1 | 7/2021 | Kramar et al. |
| 2021/0266500 A1 | 8/2021 | Taylor et al. |
| 2021/0287768 A1 | 9/2021 | Craig et al. |
| 2021/0319468 A1 | 10/2021 | Zhu et al. |
| 2021/0319862 A1 | 10/2021 | Boyd et al. |
| 2021/0321263 A1 | 10/2021 | Boyd et al. |
| 2021/0373744 A1 | 12/2021 | Miller et al. |
| 2021/0373745 A1 | 12/2021 | Chang |
| 2021/0374714 A1 | 12/2021 | Chang |
| 2021/0374750 A1 | 12/2021 | Miller et al. |
| 2021/0377742 A1 | 12/2021 | Boyd et al. |
| 2021/0392125 A1 | 12/2021 | Bryson |
| 2022/0011999 A1 | 1/2022 | Lovelock et al. |
| 2022/0014353 A1 | 1/2022 | Lim et al. |
| 2022/0135001 A1 | 5/2022 | Alsina et al. |
| 2022/0277295 A1 | 9/2022 | Robinson-Morgan et al. |
| 2022/0332285 A1 | 10/2022 | Sanders et al. |
| 2022/0391481 A1 | 12/2022 | Villanueva Gaviola et al. |
| 2022/0391482 A1 | 12/2022 | Villanueva Gaviola et al. |
| 2023/0039942 A1 | 2/2023 | Young et al. |
| 2023/0045850 A1 | 2/2023 | Sammoura et al. |
| 2023/0089689 A1 | 3/2023 | Pons Bordes et al. |
| 2023/0234537 A1 | 7/2023 | Kramar et al. |
| 2023/0394899 A1 | 12/2023 | Young |
| 2024/0036713 A1 | 2/2024 | Chang |
| 2024/0104188 A1 | 3/2024 | Villanueva Gaviola et al. |
| 2024/0147243 A1 | 5/2024 | Villanueva Gaviola et al. |
| 2024/0198960 A1 | 6/2024 | Kramar et al. |
| 2025/0142343 A1 | 5/2025 | Villanueva Gaviola et al. |
| 2025/0196805 A1 | 6/2025 | Kramar et al. |
| 2025/0217466 A1 | 7/2025 | Pons Bordes et al. |
| 2025/0263046 A1 | 8/2025 | Alsina |
| 2025/0356710 A1 | 11/2025 | Young |
| 2025/0376129 A1 | 12/2025 | Young et al. |

FOREIGN PATENT DOCUMENTS

| | | |
|---|---|---|
| CN | 101689188 A | 3/2010 |
| CN | 101884188 A | 11/2010 |
| CN | 2014-44719 A | 3/2014 |
| CN | 103635923 A | 3/2014 |
| CN | 103886460 A | 6/2014 |
| CN | 104823383 A | 8/2015 |
| CN | 105099694 A | 11/2015 |
| CN | 105190659 A | 12/2015 |
| CN | 105321067 A | 2/2016 |
| CN | 105338066 A | 2/2016 |
| CN | 105398420 A | 3/2016 |
| CN | 105787755 A | 7/2016 |
| CN | 06157125 A | 11/2016 |
| CN | 106157125 A | 11/2016 |
| CN | 106453341 A | 2/2017 |
| CN | 106846563 A | 6/2017 |
| CN | 107231797 A | 10/2017 |
| CN | 107609865 A | 1/2018 |
| CN | 108064393 A | 5/2018 |
| CN | 109353309 A | 2/2019 |
| CN | 109583876 A | 4/2019 |
| CN | 109949120 A | 6/2019 |
| CN | 110086609 A | 8/2019 |
| CN | 110135872 A | 8/2019 |
| CN | 110197059 A | 9/2019 |
| CN | 112819475 A | 5/2021 |
| EP | 2981115 A2 | 2/2016 |
| EP | 3460692 A1 | 3/2019 |
| EP | 3476670 A1 | 5/2019 |
| EP | 3926888 A1 | 12/2021 |
| JP | 2004-213362 A | 7/2004 |
| JP | 2010-86327 A | 4/2010 |
| JP | 2012-508930 A | 4/2012 |
| JP | 2013-37568 A | 2/2013 |
| JP | 2013-257878 A | 12/2013 |
| JP | 2014-44719 A | 3/2014 |
| JP | 2015-124530 A | 7/2015 |
| JP | 2016-133969 A | 7/2016 |
| JP | 2016-526211 A | 9/2016 |
| JP | 2017-517788 A | 6/2017 |
| JP | 2018-501680 A | 1/2018 |
| JP | 2018-501880 A | 1/2018 |
| JP | 2018-136886 A | 8/2018 |
| JP | 2018-156283 A | 10/2018 |
| JP | 2019-46122 A | 3/2019 |
| JP | 2019-149167 A | 3/2019 |
| JP | 2019-95880 A | 6/2019 |

(56)          References Cited

FOREIGN PATENT DOCUMENTS

| JP | 2019-191753 A | 10/2019 |
| JP | 2019-197332 A | 11/2019 |
| JP | 2019-535931 A | 12/2019 |
| KR | 10-2013-0035286 A | 4/2013 |
| KR | 10-2013-0131956 A | 12/2013 |
| KR | 10-1509596 B1 | 4/2015 |
| KR | 10-2015-0066892 A | 6/2015 |
| KR | 10-2016-0013334 A | 2/2016 |
| KR | 10-1684188 B1 | 12/2016 |
| KR | 10-2062919 B1 | 1/2020 |
| KR | 10-2020-0108515 A | 9/2020 |
| WO | 2008/157016 A1 | 12/2008 |
| WO | 2009/009788 A1 | 1/2009 |
| WO | 2013/003210 A3 | 2/2013 |
| WO | 2014/105162 A1 | 7/2014 |
| WO | 2014/134180 A2 | 9/2014 |
| WO | 2014/146186 A1 | 9/2014 |
| WO | 2015/153154 A1 | 10/2015 |
| WO | 2015/184353 A1 | 12/2015 |
| WO | 2015/194135 A1 | 12/2015 |
| WO | 2016/128569 A1 | 8/2016 |
| WO | 2016/196054 A1 | 12/2016 |
| WO | 2016/196143 A1 | 12/2016 |
| WO | 2017/078635 A1 | 5/2017 |
| WO | 2017/218490 A1 | 12/2017 |
| WO | 2018/048703 A1 | 3/2018 |
| WO | 2018/071674 A1 | 4/2018 |
| WO | 2018/074504 A1 | 4/2018 |
| WO | 2018/081317 A1 | 5/2018 |
| WO | 2018/160863 A1 | 9/2018 |
| WO | 2019/069129 A1 | 4/2019 |
| WO | 2019/191213 A1 | 10/2019 |
| WO | 2020/197694 A1 | 10/2020 |
| WO | 2021/038298 A2 | 3/2021 |

OTHER PUBLICATIONS

Final Office Action received for U.S. Appl. No. 18/375,932, mailed on Aug. 12, 2025, 34 pages.

Final Office Action received for U.S. Appl. No. 17/951,818, mailed on Sep. 4, 2025, 33 pages.

Notice of Allowance received for Korean Patent Application No. 10-2023-7018460, mailed on Aug. 27, 2025, 7 pages (2 pages of English Translation and 5 pages of Official Copy).

Intention to Grant received for European Patent Application No. 23165330.4, mailed on Feb. 19, 2025, 8 pages.

Office Action received for European Patent Application No. 21707473.1, mailed on Feb. 11, 2025, 9 pages.

Office Action received for European Patent Application No. 22723512.4, mailed on Feb. 10, 2025, 9 pages.

Applicant-Initiated Interview Summary received for U.S. Appl. No. 17/900,734, mailed on Feb. 3, 2025, 4 pages.

Final Office Action received for U.S. Appl. No. 17/951,818, mailed on Jan. 27, 2025, 31 pages.

Intention to Grant received for European Patent Application No. 22732745.9, mailed on Feb. 7, 2025, 14 pages.

Khedekar, et al., "Strength of QR Code over Design and Implementation of Authentication System", International Conference on Communication and Signal Processing, Online available at: https://ieeexplore.ieee.org/document/7754571, Apr. 6-8, 2016, pp. 2190-2193.

Non-Final Office Action received for U.S. Appl. No. 18/375,932, mailed on Jan. 29, 2025, 39 pages.

Result of Consultation received for European Patent Application No. 22732745.9, mailed on Jan. 23, 2025, 4 pages.

Corrected Notice of Allowance received for U.S. Appl. No. 17/971,407, mailed on May 20, 2025, 2 pages.

Decision to Grant received for European Patent Application No. 22732745.9, mailed on May 22, 2025, 4 pages.

Decision to Grant received for European Patent Application No. 23200887.0, mailed on May 22, 2025, 4 pages.

Non-Final Office Action received for U.S. Appl. No. 17/951,818, mailed on May 15, 2025, 32 pages.

Office Action received for Australian Patent Application No. 2023233133, mailed on May 23, 2025, 5 pages.

Office Action received for European Patent Application No. 21707473.1, mailed on May 9, 2025, 7 pages.

Office Action received for European Patent Application No. 22785826.3, mailed on May 8, 2025, 7 pages.

Decision to Grant received for European Patent Application No. 21731662.9, mailed on Sep. 12, 2024, 4 pages.

Non-Final Office Action received for U.S. Appl. No. 17/951,818, mailed on Sep. 9, 2024, 30 pages.

Notice of Allowance received for Chinese Patent Application No. 202311569957.3, mailed on Sep. 2, 2024, 5 pages (1 page of English Translation and 4 pages of Official Copy).

Result of Consultation received for European Patent Application No. 21707473.1, mailed on Sep. 6, 2024, 3 pages.

Summons to Attend Oral Proceedings received for European Patent Application No. 22732745.9, mailed on Sep. 3, 2024, 11 pages.

Applicant-Initiated Interview Summary received for U.S. Appl. No. 17/222,568, mailed on Apr. 16, 2025, 3 pages.

Corrected Notice of Allowance received for U.S. Appl. No. 17/222,568, mailed on Apr. 24, 2025, 2 pages.

Decision to Grant received for European Patent Application No. 23214955.9, mailed on Apr. 10, 2025, 4 pages.

Notice of Allowance received for U.S. Appl. No. 17/971,407, mailed on Apr. 16, 2025, 7 pages.

Office Action received for European Patent Application No. 22785826.3, mailed on Aug. 1, 2024, 7 pages.

Office Action received for Japanese Patent Application No. 2023-200980, mailed on Aug. 2, 2024, 8 pages (4 pages of English Translation and 4 pages of Official Copy).

Invitation to Pay Search Fees received for European Patent Application No. 22723512.4, mailed on Nov. 11, 2024, 3 pages.

Notice of Allowance received for U.S. Appl. No. 18/595,238, mailed on Nov. 20, 2024, 9 pages.

Applicant-Initiated Interview Summary received for U.S. Appl. No. 17/949,042, mailed on Apr. 2, 2025, 2 pages.

Applicant-Initiated Interview Summary received for U.S. Appl. No. 17/971,407, mailed on Apr. 1, 2025, 2 pages.

Notice of Allowance received for U.S. Appl. No. 17/222,568, mailed on Mar. 27, 2025, 15 pages.

Office Action received for Japanese Patent Application No. 2024-211628, mailed on Feb. 25, 2025, 12 pages (6 pages of English Translation and 6 pages of Official Copy).

Corrected Notice of Allowance received for U.S. Appl. No. 17/900,734, mailed on Mar. 17, 2025, 2 pages.

Non-Final Office Action received for U.S. Appl. No. 17/949,042, mailed on Mar. 13, 2025, 12 pages.

Notice of Hearing received for Indian Patent Application No. 202217048935, mailed on May 26, 2025, 3 pages.

Office Action received for Japanese Patent Application No. 2024-032427, mailed on Apr. 21, 2025, 11 pages (5 pages of English Translation and 6 pages of Official Copy).

Corrected Notice of Allowance received for U.S. Appl. No. 18/128,775, mailed on Jun. 6, 2024, 2 pages.

Notice of Acceptance received for Australian Patent Application No. 2023200021, mailed on Jul. 22, 2024, 3 pages.

Notice of Allowance received for Chinese Patent Application No. 202310865934.0, mailed on May 8, 2024, 2 pages (1 page of English Translation and 1 page of Official Copy).

Notice of Allowance received for Japanese Patent Application No. 2023-168764, mailed on Jul. 26, 2024, 4 pages (1 page of English Translation and 3 pages of Official Copy).

Notice of Allowance received for Korean Patent Application No. 10-2021-0151108, mailed on May 26, 2024, 7 pages (2 pages of English Translation and 5 pages of Official Copy).

Notice of Allowance received for Korean Patent Application No. 10-2021-0182662, mailed on Jun. 2, 2024, 6 pages (2 pages of English Translation and 4 pages of Official Copy).

Office Action received for Japanese Patent Application No. 2023-168764, mailed on May 17, 2024, 6 pages (3 pages of English Translation and 3 pages of Official Copy).

(56) References Cited

OTHER PUBLICATIONS

Non-Final Office Action received for U.S. Appl. No. 18/595,238, mailed on Sep. 26, 2024, 8 pages.
Office Action received for Chinese Patent Application No. 202311323829.0, mailed on Sep. 5, 2024, 11 pages (6 pages of English Translation and 5 pages of Official Copy).
Corrected Notice of Allowance received for U.S. Appl. No. 18/595,238, mailed on Dec. 10, 2024, 2 pages.
Intention to Grant received for European Patent Application No. 23214955.9, mailed on Dec. 3, 2024, 8 pages.
Notice of Allowance received for Chinese Patent Application No. 202311323829.0, mailed on Nov. 29, 2024, 4 pages (1 page of English Translation and 3 pages of Official Copy).
Notice of Allowance received for U.S. Appl. No. 17/222,568, mailed on Dec. 11, 2024, 14 pages.
International Preliminary Report on Patentability received for PCT Patent Application No. PCT/US2023/023766, mailed on Dec. 19, 2024, 15 pages.
Office Action received for Australian Patent Application No. 2024220018, mailed on Sep. 24, 2025, 3 pages.
Advisory Action received for U.S. Appl. No. 17/030,260, mailed on Dec. 13, 2022, 4 pages.
Advisory Action received for U.S. Appl. No. 17/222,568, mailed on Apr. 20, 2023, 5 pages.
Advisory Action received for U.S. Appl. No. 17/375,767, mailed on Jun. 29, 2023, 2 pages.
Advisory Action received for U.S. Appl. No. 17/485,086, mailed on Sep. 9, 2022, 5 pages.
Applicant-Initiated Interview Summary received for U.S. Appl. No. 17/030,256, mailed on Feb. 23, 2022, 2 pages.
Applicant-Initiated Interview Summary received for U.S. Appl. No. 17/030,256, mailed on Jun. 17, 2022, 2 pages.
Applicant-Initiated Interview Summary received for U.S. Appl. No. 17/030,257, mailed on Aug. 29, 2022, 5 pages.
Applicant-Initiated Interview Summary received for U.S. Appl. No. 17/030,257, mailed on Feb. 7, 2022, 5 pages.
Applicant-Initiated Interview Summary received for U.S. Appl. No. 17/030,257, mailed on Jan. 31, 2023, 7 pages.
Applicant-Initiated Interview Summary received for U.S. Appl. No. 17/030,259, mailed on Nov. 19, 2021, 18 pages.
Applicant-Initiated Interview Summary received for U.S. Appl. No. 17/030,260, mailed on Jan. 7, 2022, 2 pages.
Applicant-Initiated Interview Summary received for U.S. Appl. No. 17/030,260, mailed on May 5, 2022, 2 pages.
Applicant-Initiated Interview Summary received for U.S. Appl. No. 17/030,260, mailed on Nov. 29, 2022, 2 pages.
Applicant-Initiated Interview Summary received for U.S. Appl. No. 17/030,260, mailed on Oct. 11, 2022, 2 pages.
Applicant-Initiated Interview Summary received for U.S. Appl. No. 17/077,820, mailed on Oct. 6, 2022, 2 pages.
Applicant-Initiated Interview Summary received for U.S. Appl. No. 17/222,568, mailed on Aug. 25, 2023, 2 pages.
Applicant-Initiated Interview Summary received for U.S. Appl. No. 17/375,767, mailed on Apr. 13, 2023, 2 pages.
Applicant-Initiated Interview Summary received for U.S. Appl. No. 17/375,767, mailed on Dec. 22, 2023, 2 pages.
Applicant-Initiated Interview Summary received for U.S. Appl. No. 17/375,767, mailed on Feb. 2, 2023, 2 pages.
Applicant-Initiated Interview Summary received for U.S. Appl. No. 17/375,767, mailed on Jun. 26, 2023, 2 pages.
Applicant-Initiated Interview Summary received for U.S. Appl. No. 17/375,767, mailed on Oct. 27, 2022, 4 pages.
Applicant-Initiated Interview Summary received for U.S. Appl. No. 17/485,086, mailed on Apr. 26, 2022, 2 pages.
Applicant-Initiated Interview Summary received for U.S. Appl. No. 17/485,086, mailed on Dec. 23, 2022, 2 pages.
Applicant-Initiated Interview Summary received for U.S. Appl. No. 17/900,734, mailed on Nov. 20, 2023, 4 pages.
August et al., "Mobile web searching", Bell Lab Technical Journal, vol. 6, No. 2, 2002, pp. 84-98.

"Cease", Dictionary.com, Merriam-Webster, 2022, 1 page.
Certificate of Examination received for Australian Patent Application No. 2021100511, mailed on Nov. 5, 2021, 2 pages.
Corrected, Notice of Allowance received for U.S. Appl. No. 17/030,256, mailed on Nov. 9, 2022, 8 pages.
Corrected Notice of Allowance received for U.S. Appl. No. 17/030,257, mailed on Nov. 24, 2023, 2 pages.
Corrected Notice of Allowance received for U.S. Appl. No. 17/030,257, mailed on Sep. 12, 2023, 2 pages.
Corrected Notice of Allowance received for U.S. Appl. No. 17/030,259, mailed on Apr. 4, 2022, 2 pages.
Corrected Notice of Allowance received for U.S. Appl. No. 17/030,259, mailed on Jan. 5, 2022, 2 pages.
Corrected Notice of Allowance received for U.S. Appl. No. 17/077,820, mailed on Feb. 6, 2023, 2 pages.
Corrected Notice of Allowance received for U.S. Appl. No. 17/077,820, mailed on Jan. 19, 2023, 2 pages.
Corrected Notice of Allowance received for U.S. Appl. No. 17/077,820, mailed on Mar. 8, 2023, 2 pages.
Corrected Notice of Allowance received for U.S. Appl. No. 17/398,723, mailed on Nov. 15, 2023, 12 pages.
Corrected Notice of Allowance received for U.S. Appl. No. 17/484,306, mailed on Mar. 30, 2022, 4 pages.
Corrected Notice of Allowance received for U.S. Appl. No. 17/485,098, mailed on Oct. 13, 2022, 8 pages.
Corrected Notice of Allowance received for U.S. Appl. No. 18/128,775, mailed on Dec. 7, 2023, 2 pages.
Corrected Notice of Allowance received for U.S. Appl. No. 18/128,775, mailed on Jan. 8, 2024, 2 pages.
Corrected Notice of Allowance received for U.S. Appl. No. 18/128,775, mailed on Nov. 17, 2023, 2 pages.
Dahan et al., "Increasing TeraGrid User Productivity through Integration of Information and Interactive Services", IEEE, 2008, 11 pages.
Decision to Grant received for Danish Patent Application No. PA202170032, mailed on Feb. 1, 2022, 2 pages.
Decision to Grant received for Danish Patent Application No. PA202170598, mailed on Jul. 11, 2023, 1 page.
Eminagaoglu et al., "A Two-Factor Authentication System with QR Codes for Web and Mobile Applications", 2014 Fifth International Conference on Emerging Security Technologies, 2014, pp. 105-112.
Extended European Search Report received for European Patent Application No. 23165330.4, mailed on Jun. 28, 2023, 10 pages.
Final Office Action received for U.S. Appl. No. 17/030,256, mailed on Mar. 14, 2022, 20 pages.
Final Office Action received for U.S. Appl. No. 17/030,257, mailed on Dec. 8, 2022, 29 pages.
Final Office Action received for U.S. Appl. No. 17/030,260, mailed on Mar. 9, 2022, 42 pages.
Final Office Action received for U.S. Appl. No. 17/030,260, mailed on Nov. 4, 2022, 39 pages.
Final Office Action received for U.S. Appl. No. 17/222,568, mailed on Dec. 14, 2023, 92 pages.
Final Office Action received for U.S. Appl. No. 17/222,568, mailed on Feb. 8, 2023, 68 pages.
Final Office Action received for U.S. Appl. No. 17/375,767, mailed on Dec. 29, 2022, 13 pages.
Final Office Action received for U.S. Appl. No. 17/375,767, mailed on Jun. 1, 2023, 15 pages.
Final Office Action received for U.S. Appl. No. 17/485,086, mailed on May 4, 2022, 21 pages.
Final Office Action received for U.S. Appl. No. 17/900,734, mailed on Jan. 19, 2024, 11 pages.
Intention to Grant received for Danish Patent Application No. PA202170032, mailed on Oct. 6, 2021, 2 pages.
Intention to Grant received for Danish Patent Application No. PA202170598, mailed on Apr. 24, 2023, 2 pages.
Intention to Grant received for Danish Patent Application No. PA202170598, mailed on Jan. 16, 2023, 2 pages.
International Preliminary Report on Patentability received for PCT Patent Application No. PCT/US2021/015123, mailed on Aug. 11, 2022, 14 pages.

(56) References Cited

OTHER PUBLICATIONS

International Preliminary Report on Patentability received for PCT Patent Application No. PCT/US2021/033051, mailed on Dec. 8, 2022, 14 pages.
International Preliminary Report on Patentability received for PCT Patent Application No. PCT/US2021/057325, mailed on May 19, 2023, 8 pages.
International Preliminary Report on Patentability received for PCT Patent Application No. PCT/US2022/025365, mailed on Nov. 2, 2023, 11 pages.
International Preliminary Report on Patentability received for PCT Patent Application No. PCT/US2022/030567, mailed on Dec. 21, 2023, 18 pages.
International Search Report and Written Opinion received for PCT Patent Application No. PCT/US2021/015123, mailed on Aug. 9, 2021, 20 pages.
International Search Report and Written Opinion received for PCT Patent Application No. PCT/US2021/033051, mailed on Oct. 29, 2021, 20 pages.
International Search Report and Written Opinion received for PCT Patent Application No. PCT/US2021/057325, mailed on Jan. 5, 2022, 14 pages.
International Search Report and Written Opinion received for PCT Patent Application No. PCT/US2022/025365, mailed on Sep. 27, 2022, 16 pages.
International Search Report and Written Opinion received for PCT Patent Application No. PCT/US2022/030567, mailed on Dec. 9, 2022, 24 pages.
International Search Report and Written Opinion received for PCT Patent Application No. PCT/US2022/042978, mailed on Nov. 29, 2022, 15 pages.
International Search Report and Written Opinion received for PCT Patent Application No. PCT/US2023/023766, mailed on Nov. 7, 2023, 20 pages.
Invitation to Pay Additional Fees and Partial International Search Report received for PCT Patent Application No. PCT/US2022/030567, mailed on Sep. 13, 2022, 13 pages.
Invitation to Pay Additional Fees and Partial International Search Report received for PCT Patent Application No. PCT/US2023/023766, mailed on Sep. 14, 2023, 14 pages.
Invitation to Pay Additional Fees received for PCT Patent Application No. PCT/US2021/015123, mailed on Jun. 16, 2021, 12 pages.
Invitation to Pay Additional Fees received for PCT Patent Application No. PCT/US2021/033051, mailed on Aug. 26, 2021, 10 pages.
Invitation to Pay Additional Fees received for PCT Patent Application No. PCT/US2022/025365, mailed on Aug. 4, 2022, 9 pages.
Juan, "Everything you can do with Wechat QR codes in 2019", Available online at: https://qpsoftware.net/blog/wechat-qr-code, Jul. 1, 2019, 13 pages.
Kormann et al., "Risks of the Passport Single Signon Protocol", IEEE Computer Networks, Jul. 2000, 12 pages.
Linelovers, "4 ways to add someone to your Line friends list", Available online at: http://line-lovers-world.com/2016/10/23/%E3%80%90line-app%E3%80%914-ways-to-add-someone-to-your-line-friends-list/, Oct. 23, 2016, 14 pages.
Lurey C., "Keeper fortifies industry best security architecture with integrated two-factor codes", Online available at: < URL: https://www.keepersecurity.com/blog/2019/08/29/keeper-fortifies-industry-best-securityarchitecture-with-integrated-two-factor-codes/>, Aug. 29, 2019, 8 pages.
Mack Brandon, "How Do Snapchat's Snapcodes Work?", Available online at: https://blackatlascreative.com/blog/how-do-snapchats-snapcodes-work/. Nov. 10, 2015, 10 pages.
"Meet Your Model 3", Available Online at: https://www.tesla.com/support/meet-your-tesla/model-3#keys, 2021, 3 pages.
Non-Final Office Action received for U.S. Appl. No. 17/030,256, mailed on Jan. 18, 2022, 20 pages.

Non-Final Office Action received for U.S. Appl. No. 17/030,257, mailed on Dec. 24, 2021, 24 pages.
Non-Final Office Action received for U.S. Appl. No. 17/030,257, mailed on Jun. 20, 2022, 27 pages.
Non-Final Office Action received for U.S. Appl. No. 17/030,259, mailed on Aug. 19, 2021, 20 pages.
Non-Final Office Action received for U.S. Appl. No. 17/030,260, mailed on Jul. 8, 2022, 36 pages.
Non-Final Office Action received for U.S. Appl. No. 17/030,260, mailed on Oct. 6, 2021, 43 pages.
Non-Final Office Action received for U.S. Appl. No. 17/077,820, mailed on Aug. 31, 2022, 10 pages.
Non-Final Office Action received for U.S. Appl. No. 17/222,568, mailed on May 25, 2023, 72 pages.
Non-Final Office Action received for U.S. Appl. No. 17/222,568, mailed on Sep. 16, 2022, 32 pages.
Non-Final Office Action received for U.S. Appl. No. 17/375,767, mailed on Aug. 31, 2023, 16 pages.
Non-Final Office Action received for U.S. Appl. No. 17/375,767, mailed on Feb. 16, 2023, 12 pages.
Non-Final Office Action received for U.S. Appl. No. 17/375,767, mailed on Nov. 28, 2023, 16 pages.
Non-Final Office Action received for U.S. Appl. No. 17/375,767, mailed on Sep. 29, 2022, 10 pages.
Non-Final Office Action received for U.S. Appl. No. 17/485,086, mailed on Jan. 24, 2022, 19 pages.
Non-Final Office Action received for U.S. Appl. No. 17/485,086, mailed on Nov. 14, 2022, 22 pages.
Non-Final Office Action received for U.S. Appl. No. 17/900,734, mailed on Oct. 24, 2022, 12 pages.
Notice of Acceptance received for Austrailan Patent Application No. 2021213717, mailed on Sep. 21, 2022, 3 pages.
Notice of Acceptance received for Austrailan Patent Application No. 2022235545, mailed on Jun. 27, 2023, 3 pages.
Notice of Allowance received for Chinese Patent Application No. 202310033917.0, mailed on Nov. 26, 2023, 2 pages.
Notice of Allowance received for Japanese Patent Application No. 2022-520133, mailed on Jan. 27, 2023, 4 pages.
Notice of Allowance received for Japanese Patent Application No. 2022-573404, mailed on Dec. 11, 2023, 4 pages.
Notice of Allowance received for Japanese Patent Application No. 2023-028792, mailed on Jun. 26, 2023, 4 pages.
Notice of Allowance received for Korean Patent Application No. 10-2022-0003867, mailed on Oct. 21, 2022, 7 pages.
Notice of Allowance received for Korean Patent Application No. 10-2022-7045895, mailed on Apr. 19, 2023, 7 pages.
Notice of Allowance received for Korean Patent Application No. 10-2023-7010480, mailed on Nov. 28, 2023, 7 pages.
Notice of Allowance received for U.S. Appl. No. 17/030,256, mailed on Jul. 20, 2022, 9 pages.
Notice of Allowance received for U.S. Appl. No. 17/030,257, mailed on Jul. 26, 2023, 14 pages.
Notice of Allowance received for U.S. Appl. No. 17/030,259, mailed on Dec. 14, 2021, 8 pages.
Notice of Allowance received for U.S. Appl. No. 17/030,260, mailed on Aug. 7, 2023, 11 pages.
Notice of Allowance received for U.S. Appl. No. 17/030,260, mailed on Jun. 28, 2023, 11 pages.
Notice of Allowance received for U.S. Appl. No. 17/030,260, mailed on May 3, 2023, 14 pages.
Notice of Allowance received for U.S. Appl. No. 17/077,820, mailed on Jan. 6, 2023, 11 pages.
Notice of Allowance received for U.S. Appl. No. 17/180,509, mailed on Apr. 28, 2021, 16 pages.
Notice of Allowance received for U.S. Appl. No. 17/180,509, mailed on Aug. 23, 2021, 14 pages.
Notice of Allowance received for U.S. Appl. No. 17/375,767, mailed on Feb. 20, 2024, 6 pages.
Notice of Allowance received for U.S. Appl. No. 17/398,723, mailed on Feb. 23, 2023, 17 pages.
Notice of Allowance received for U.S. Appl. No. 17/398,723, mailed on Jun. 15, 2023, 15 pages.

(56)　　　　References Cited

OTHER PUBLICATIONS

Notice of Allowance received for U.S. Appl. No. 17/398,723, mailed on Oct. 26, 2023, 15 pages.
Notice of Allowance received for U.S. Appl. No. 17/484,306, mailed on Nov. 26, 2021, 9 pages.
Notice of Allowance received for U.S. Appl. No. 17/485,086, mailed on Jan. 30, 2023, 9 pages.
Notice of Allowance received for U.S. Appl. No. 17/485,098, mailed on Aug. 5, 2022, 12 pages.
Notice of Allowance received for U.S. Appl. No. 18/128,775, mailed on Nov. 2, 2023, 10 pages.
Office Action received for Australian Patent Application No. 2021100511, mailed on May 26, 2021, 5 pages.
Office Action received for Australian Patent Application No. 2021100511, mailed on Sep. 2, 2021, 3 pages.
Office Action received for Australian Patent Application No. 2021102823, mailed on Aug. 24, 2021, 8 pages.
Office Action received for Australian Patent Application No. 2021102823, mailed on Feb. 22, 2022, 5 pages.
Office Action received for Australian Patent Application No. 2021102823, mailed on Nov. 24, 2021, 7 pages.
Office Action received for Australian Patent Application No. 2021203367, mailed on May 23, 2022, 5 pages.
Office Action received for Australian Patent Application No. 2021213717, mailed on Feb. 10, 2022, 4 pages.
Office Action received for Australian Patent Application No. 2021213717, mailed on Jun. 17, 2022, 4 pages.
Office Action received for Australian Patent Application No. 2022235545, mailed on May 11, 2023, 3 pages.
Office Action received for Australian Patent Application No. 2023200021, mailed on Nov. 1, 2023, 3 pages.
Office Action received for Chinese Patent Application No. 202310033917.0, mailed on Jun. 28, 2023, 19 pages.
Office Action received for Danish Patent Application No. PA202170032, mailed on May 7, 2021, 7 pages.
Office Action received for Danish Patent Application No. PA202170598, mailed on Sep. 7, 2022, 4 pages.
Office Action received for Danish Patent Application No. PA202270438, mailed on Jul. 10, 2023, 4 pages.
Office Action received for European Patent Application No. 21707473.1, mailed on May 4, 2023, 5 pages.
Office Action received for European Patent Application No. 21707473.1, mailed on Oct. 27, 2023, 5 pages.
Office Action received for European Patent Application No. 21707473.1, mailed on Oct. 31, 2022, 7 pages.
Office Action received for European Patent Application No. 21731662.9, mailed on Oct. 12, 2023, 8 pages.
Office Action received for Japanese Patent Application No. 2022-520133, mailed on Oct. 17, 2022, 4 pages.
Office Action received for Japanese Patent Application No. 2022-573404, mailed on Jul. 3, 2023, 12 pages.
Office Action received for Japanese Patent Application No. 2023-528157, mailed on Dec. 8, 2023, 4 pages.
Office Action received for Korean Patent Application No. 10-2021-0151108, mailed on Jan. 13, 2023, 10 pages.
Office Action received for Korean Patent Application No. 10-2021-0151108, mailed on Sep. 21, 2023, 12 pages.
Office Action received for Korean Patent Application No. 10-2021-0182662, mailed on Oct. 26, 2023, 13 pages.
Office Action received for Korean Patent Application No. 10-2021-7037387, mailed on Oct. 12, 2023, 14 pages.
Office Action received for Korean Patent Application No. 10-2022-0003867, mailed on May 17, 2022, 19 pages.
Office Action received for Korean Patent Application No. 10-2023-7010480, mailed on Jul. 20, 2023, 14 pages.
Office Action received for Korean Patent Application No. 10-2023-7033718, mailed on Dec. 4, 2023, 5 pages.
Search Report and Opinion received for Danish Patent Application No. PA202170598, mailed on Feb. 15, 2022, 11 pages.

Search Report received for Danish Patent Application No. PA202270438, mailed on Dec. 5, 2022, 9 pages.
Sibila Alex, "Tesla App Full Walkthrough (Mar. 2020)", Available Online at: https://www.youtube.com/watch?v=RHMWPj...RXLU, Mar. 16, 2020, 3 pages.
"Use your iPhone or Apple Watch as a car key", Available Online at: https://support.apple.com/en-us/HT211234, Mar. 16, 2021, 5 pages.
"Volvo On Call app: Operating remote start of the car", Available Online at: https://www.volvocars.com/en-ca/support/topics/volvo-on-call/app/volvo-on-call-app-operating-remote-start-of-the-car-2, Nov. 5, 2020, 4 pages.
Advisory Action received for U.S. Appl. No. 17/900,734, mailed on Mar. 21, 2024, 5 pages.
Applicant-Initiated Interview Summary received for U.S. Appl. No. 17/900,734, mailed on Feb. 22, 2024, 3 pages.
Extended European Search Report received for European Patent Application No. 23200887.0, mailed on Mar. 26, 2024, 9 pages.
Extended European Search Report received for European Patent Application No. 23214955.9, mailed on Feb. 22, 2024, 10 pages.
Intention to Grant received for European Patent Application No. 21731662.9, mailed on May 3, 2024, 9 pages.
International Preliminary Report on Patentability received for PCT Patent Application No. PCT/US2022/042978, mailed on Apr. 4, 2024, 12 pages.
Notice of Allowance received for Japanese Patent Application No. 2023-528157, mailed on Feb. 5, 2024, 4 pages (1 page of English Translation and 3 pages of Official Copy).
Notice of Allowance received for Korean Patent Application No. 10-2021-7037387, mailed on Jan. 31, 2024, 7 pages (2 pages of English Translation and 5 pages of Official Copy).
Notice of Allowance received for Korean Patent Application No. 10-2023-7033718, mailed on Apr. 18, 2024, 7 pages (2 pages of English Translation and 5 pages of Official Copy).
Notice of Allowance received for U.S. Appl. No. 17/398,723, mailed on Jan. 30, 2024, 15 pages.
Notice of Allowance received for U.S. Appl. No. 18/128,775, mailed on Feb. 28, 2024, 11 pages.
Office Action received for Australian Patent Application No. 2023200021, mailed on Apr. 24, 2024, 4 pages.
Office Action received for Australian Patent Application No. 2023200021, mailed on Feb. 1, 2024, 4 pages.
Office Action received for Chinese Patent Application No. 202180005556.8, mailed on Feb. 8, 2024, 16 pages (9 pages of English Translation and 7 pages of Official Copy).
Office Action received for Chinese Patent Application No. 202310865934.0, mailed on Jan. 16, 2024, 12 pages (6 pages of English Translation and 6 pages of Official Copy).
Office Action received for European Patent Application No. 22732745.9, mailed on Apr. 10, 2024, 7 pages.
Office Action received for European Patent Application No. 23165330.4, mailed on Mar. 18, 2024, 4 pages.
Office Action received for Japanese Patent Application No. 2023-168764, mailed on Feb. 5, 2024, 5 pages (2 pages of English Translation and 3 pages of Official Copy).
Office Action received for Japanese Patent Application No. 2023-200980, mailed on Apr. 22, 2024, 8 pages (4 pages of English Translation and 4 pages of Official Copy).
Summons to Attend Oral Proceedings received for European Patent Application No. 21707473.1, mailed on Mar. 22, 2024, 9 pages.
Applicant-Initiated Interview Summary received for U.S. Appl. No. 17/951,818, mailed on Nov. 4, 2024, 5 pages.
Applicant-Initiated Interview Summary received for U.S. Appl. No. 18/595,238, mailed on Oct. 25, 2024, 2 pages.
Notice of Allowance received for Japanese Patent Application No. 2023-200980, mailed on Nov. 5, 2024, 4 pages (1 page of English Translation and 3 pages of Official Copy).
Office Action received for Indian Patent Application No. 202217048935, mailed on Oct. 29, 2024, 9 pages.
Extended European Search Report received for European Patent Application No. 25175055.0, mailed on Jul. 17, 2025, 9 pages.
Intention to Grant received for European Patent Application No. 23165330.4, mailed on Jul. 17, 2025, 7 pages.

(56) References Cited

OTHER PUBLICATIONS

Notice of Allowance received for Japanese Patent Application No. 2024-211628, mailed on Jul. 4, 2025, 4 pages (1 page of English Translation and 3 pages of Official Copy).

Office Action received for Chinese Patent Application No. 202410869730.9, mailed on May 28, 2025, 11 pages (6 pages of English Translation and 5 pages of Official Copy).

Intention to Grant received for European Patent Application No. 23200887.0, mailed on Jan. 7, 2025, 8 pages.

Non-Final Office Action received for U.S. Appl. No. 17/900,734, mailed on Jan. 16, 2025, 7 pages.

Office Action received for European Patent Application No. 22785826. 3, mailed on Jan. 9, 2025, 9 pages.

Result of Consultation received for European Patent Application No. 22732745.9, mailed on Jan. 15, 2025, 13 pages.

Applicant-Initiated Interview Summary received for U.S. Appl. No. 17/951,818, mailed on Jun. 30, 2025, 4 pages.

Corrected Notice of Allowance received for U.S. Appl. No. 17/971,407, mailed on Jun. 17, 2025, 2 pages.

Notice of Allowance received for U.S. Appl. No. 17/949,042, mailed on Jul. 1, 2025, 6 pages.

Office Action received for European Patent Application No. 22723512. 4, mailed on Jun. 18, 2025, 5 pages.

Applicant-Initiated Interview Summary received for U.S. Appl. No. 17/951,818, mailed on Oct. 14, 2025, 4 pages.

Intention to Grant received for European Patent Application No. 22785826.3, mailed on Oct. 2, 2025, 9 pages.

Notice of Allowance received for Chinese Patent Application No. 202410869730.9, mailed on Sep. 29, 2025, 4 pages (1 page of English Translation and 3 pages of Official Copy).

Notice of Allowance received for Korean Patent Application No. 10-2024-0100836, mailed on Oct. 14, 2024, 7 pages (2 pages of English Translation and 5 pages of Official Copy).

Notice of Allowance received for U.S. Appl. No. 18/404,058, mailed on Oct. 9, 2024, 12 pages.

Applicant-Initiated Interview Summary received for U.S. Appl. No. 17/951,818, mailed on Mar. 3, 2025, 5 pages.

Corrected Notice of Allowance received for U.S. Appl. No. 17/900,734, mailed on Mar. 10, 2025, 3 pages.

Emilio Di Paolom. , "CES 2021: Wearable Device with Biometric Authentication", Available online at: https://www.eetimes.eu/ces-2021-wearable-device-with-biometric-authentication/ , EE Times Europe, Jan. 11, 2021, 6 pages.

Non-Final Office Action received for U.S. Appl. No. 17/971,407, mailed on Feb. 27, 2025, 9 pages.

Notice of Allowance received for U.S. Appl. No. 17/900,734, mailed on Feb. 26, 2025, 8 pages.

Decision to Grant received for European Patent Application No. 22785826.3, mailed on Dec. 18, 2025, 2 pages.

Notice of Allowance received for Chinese Patent Application No. 202280028985.1, mailed on Dec. 10, 2025, 5 pages (1 page of English Translation and 4 pages of Official Copy).

Decision to Grant received for European Patent Application No. 23165330.4, mailed on Nov. 20, 2025, 2 pages.

Decision to Refuse received for Japanese Patent Application No. 2024-032427, mailed on Oct. 10, 2025, 18 pages (8 pages of English Translation and 10 pages of Official Copy).

Extended European Search Report received for European Patent Application No. 25176097.1, mailed on Nov. 18, 2025, 5 pages.

Intention to Grant received for European Patent Application No. 22723512.4, mailed on Dec. 12, 2025, 9 pages.

International Search Report and Written Opinion received for PCT Patent Application No. PCT/US2025/029289, mailed on Nov. 12, 2025, 20 pages.

Invitation to Pay Additional Fees and Partial International Search Report received for PCT Patent Application No. PCT/US2025/029289, mailed on Sep. 22, 2025, 16 pages.

Office Action received for Chinese Patent Application No. 202510359797.2, mailed on Sep. 22, 2025, 14 pages (7 pages of English Translation and 7 pages of Official Copy).

Office Action received for European Patent Application No. 21707473. 1, mailed on Oct. 23, 2025, 6 pages.

Office Action received for Korean Patent Application No. 10-2024-0114771, mailed on Sep. 29, 2025, 5 pages (2 pages of English Translation and 3 pages of Official Copy).

Result of Consultation received for European Patent Application No. 22723512.4, mailed on Nov. 26, 2025, 5 pages.

Intention to Grant received for European Patent Application No. 22723512.4, mailed on Feb. 20, 2026, 9 pages.

\* cited by examiner

Portable Multifunction Device 100

210

212

206

208

Speaker 111

Optical Sensor 164

Proximity Sensor 166

200

210 is SIM card slot
212 is headphone jack

208

202

Touch Screen 112

Contact Intensity Sensor(s) 165

Tactile Output Generator(s) 167

203

Microphone 113

Home 204

Accelerometer(s) 168

External Port 124

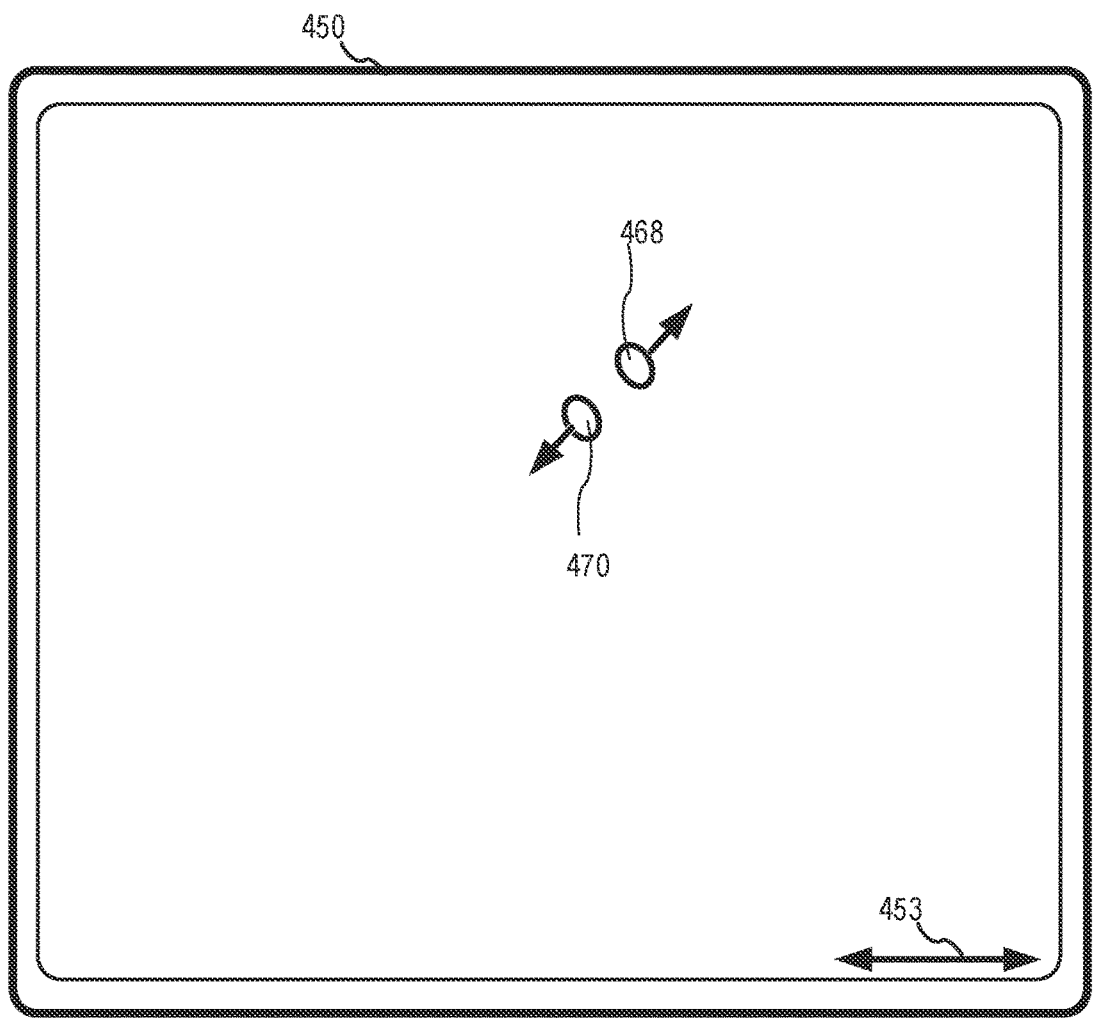
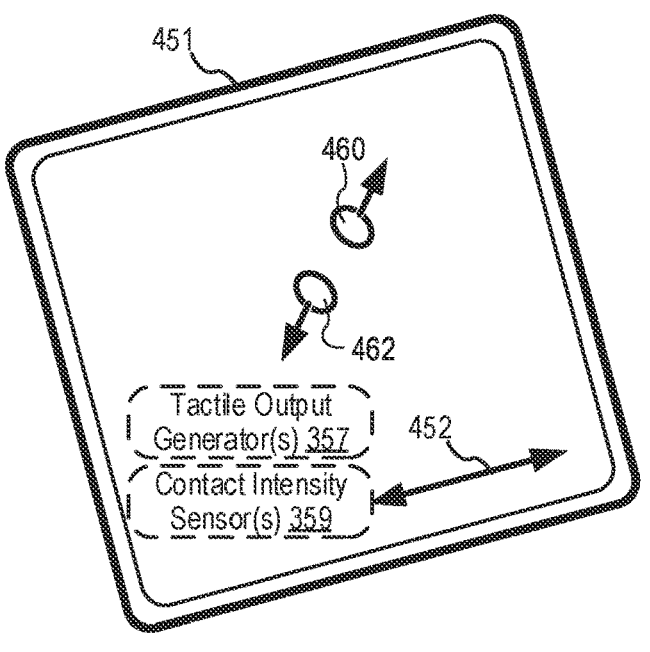
*FIG. 4B*

Figure 7A:
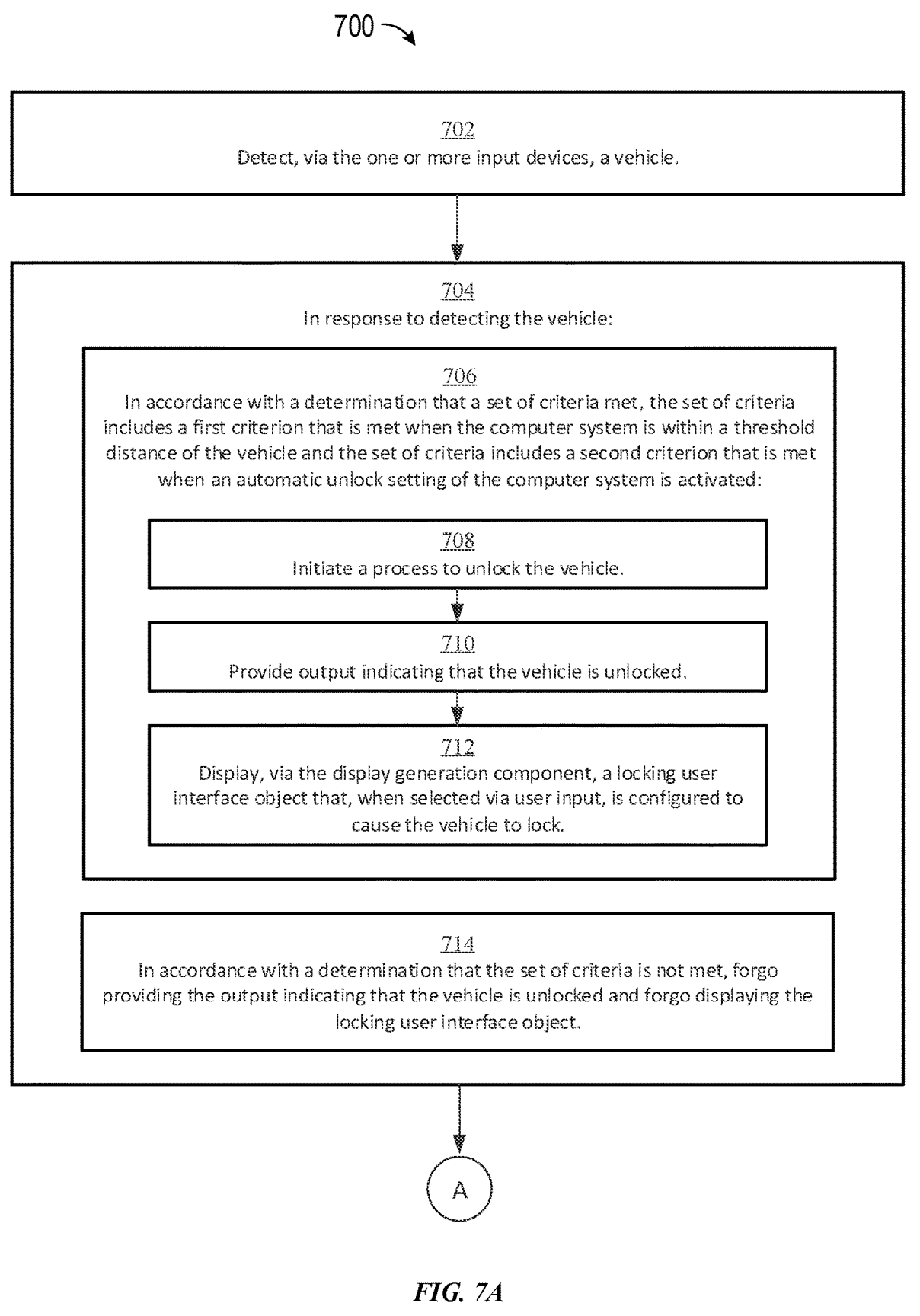

700 ⟍

702
Detect, via the one or more input devices, a vehicle.

704
In response to detecting the vehicle:

706
In accordance with a determination that a set of criteria met, the set of criteria includes a first criterion that is met when the computer system is within a threshold distance of the vehicle and the set of criteria includes a second criterion that is met when an automatic unlock setting of the computer system is activated:

708
Initiate a process to unlock the vehicle.

710
Provide output indicating that the vehicle is unlocked.

712
Display, via the display generation component, a locking user interface object that, when selected via user input, is configured to cause the vehicle to lock.

714
In accordance with a determination that the set of criteria is not met, forgo providing the output indicating that the vehicle is unlocked and forgo displaying the locking user interface object.

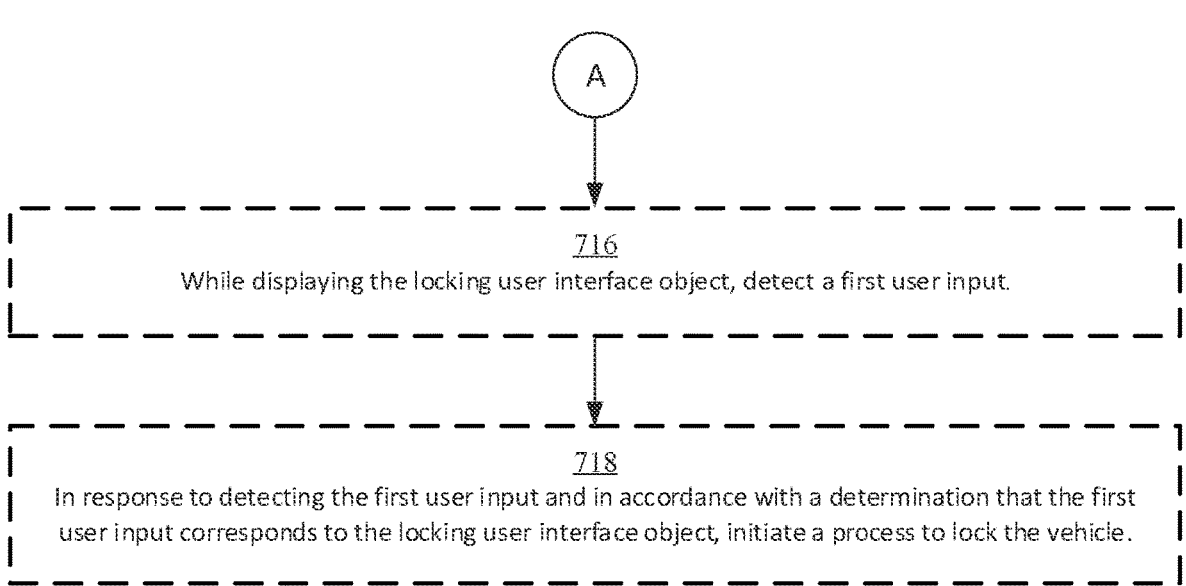

800

802
Detect a user input corresponding to an input device of the one or more input devices.

804
In response to detecting the user input, display, via the display generation component, an accounts user interface that includes:

806
In accordance with a determination that a set of criteria met, the set of criteria includes a criterion that is met when the computer system is within a threshold distance of a vehicle, display a first user interface object corresponding to a first secure credential at a first position, the first secure credential is configured to provide authorization to use one or more functions of the vehicle.

808
In accordance with a determination that the set of criteria is not met, display a second user interface object, different from the first user interface object, corresponding to a second secure credential at the first position, the second secure credential is different from the first secure credential.

810
After displaying the first user interface object corresponding to the first secure credential at the first position, display, via the display generation component, a plurality of control user interface objects, where a respective control user interface object of the plurality of control user interface objects is configured to, when selected via user input corresponding to the respective control user interface object, cause the vehicle to perform a respective function.

812
While displaying first user interface object corresponding to the first secure credential at the first position, display, via the display generation component, the second user interface object corresponding to the second secure credential at a second position, different from the first position, the second secure credential is not authorized for use when the second user interface object is displayed at the second position.

814
Detect that the computer system is within a second threshold distance of the vehicle, the second threshold distance is less than the threshold distance.

816
In response to detecting that the computer system is within the second threshold distance of the vehicle, initiate a process to unlock the vehicle.

*FIG. 8B*

USER INTERFACES FOR AN ELECTRONIC KEY

CROSS-REFERENCE TO RELATED APPLICATIONS

This application is a continuation of U.S. patent application Ser. No. 17/375,767, filed Jul. 14, 2021, entitled "USER INTERFACES FOR AN ELECTRONIC KEY," which claims benefit to U.S. Provisional Application No. 63/176, 805, filed Apr. 19, 2021, entitled "USER INTERFACES FOR AN ELECTRONIC KEY," the contents of each of which are hereby incorporated by reference in their entirety.

FIELD

The present disclosure relates generally to computer user interfaces, and more specifically to techniques for managing and using an electronic key for controlling aspects of a vehicle.

BACKGROUND

Vehicles have locks, such as door and trunk locks, that secure access to parts of the vehicle. Vehicles can perform various functions, such as locking/unlocking such locks, turning the vehicle on/off, and starting/stopping vehicle HVAC systems.

BRIEF SUMMARY

Some techniques for managing electronic keys using electronic devices, however, are generally cumbersome and inefficient. For example, some existing techniques use a complex and time-consuming user interface, which may include multiple key presses or keystrokes. Some existing techniques require users to provide multiple inputs and/or to take multiple actions to access and control aspects of a vehicle. Existing techniques require more time than necessary, wasting user time and device energy. This latter consideration is particularly important in battery-operated devices.

Accordingly, the present technique provides electronic devices with faster, more efficient methods and interfaces for managing and using an electronic key. Such methods and interfaces optionally complement or replace other methods for managing and using an electronic key. Such methods and interfaces reduce the cognitive burden on a user and produce a more efficient human-machine interface. Such methods and interfaces also reduce an amount of user inputs required to access and use various secure credentials based on a location of the electronic device. For battery-operated computing devices, such methods and interfaces conserve power and increase the time between battery charges.

In accordance with some embodiments, a method performed at a computer system that is in communication with a display generation component and one or more input devices is described. The method comprises: detecting, via the one or more input devices, a vehicle; in response to detecting the vehicle: in accordance with a determination that a set of criteria is met, wherein the set of criteria includes a first criterion that is met when the computer system is within a threshold distance of the vehicle and the set of criteria includes a second criterion that is met when an automatic unlock setting of the computer system is activated: initiating a process to unlock the vehicle; providing output indicating that the vehicle is unlocked; and displaying, via the display generation component, a locking user interface object that, when selected via user input, is configured to cause the vehicle to lock; and in accordance with a determination that the set of criteria is not met, forgoing providing output indicating that the vehicle is unlocked and forgoing displaying the locking user interface object.

In accordance with some embodiments, a non-transitory computer-readable storage medium storing one or more programs configured to be executed by one or more processors of a computer system that is in communication with a display generation component and one or more input devices is described. The one or more programs include instructions for: detecting, via the one or more input devices, a vehicle; in response to detecting the vehicle: in accordance with a determination that a set of criteria is met, wherein the set of criteria includes a first criterion that is met when the computer system is within a threshold distance of the vehicle and the set of criteria includes a second criterion that is met when an automatic unlock setting of the computer system is activated: initiating a process to unlock the vehicle; providing output indicating that the vehicle is unlocked; and displaying, via the display generation component, a locking user interface object that, when selected via user input, is configured to cause the vehicle to lock; and in accordance with a determination that the set of criteria is not met, forgoing providing output indicating that the vehicle is unlocked and forgoing displaying the locking user interface object.

In accordance with some embodiments, a transitory computer-readable storage medium storing one or more programs configured to be executed by one or more processors of a computer system that is in communication with a display generation component and one or more input devices is described. The one or more programs include instructions for: detecting, via the one or more input devices, a vehicle; in response to detecting the vehicle: in accordance with a determination that a set of criteria is met, wherein the set of criteria includes a first criterion that is met when the computer system is within a threshold distance of the vehicle and the set of criteria includes a second criterion that is met when an automatic unlock setting of the computer system is activated: initiating a process to unlock the vehicle; providing output indicating that the vehicle is unlocked; and displaying, via the display generation component, a locking user interface object that, when selected via user input, is configured to cause the vehicle to lock; and in accordance with a determination that the set of criteria is not met, forgoing providing output indicating that the vehicle is unlocked and forgoing displaying the locking user interface object.

In accordance with some embodiments, a computer system comprising a display generation component, one or more input devices, one or more processors, and memory storing one or more programs configured to be executed by the one or more processors is described. The one or more programs include instructions for: detecting, via the one or more input devices, a vehicle; in response to detecting the vehicle: in accordance with a determination that a set of criteria is met, wherein the set of criteria includes a first criterion that is met when the computer system is within a threshold distance of the vehicle and the set of criteria includes a second criterion that is met when an automatic unlock setting of the computer system is activated: initiating a process to unlock the vehicle; providing output indicating that the vehicle is unlocked; and displaying, via the display generation component, a locking user interface object that, when selected via user input, is configured to cause the vehicle to lock; and in accordance with a determination that the set of criteria is not met, forgoing providing output indicating that the vehicle is unlocked and forgoing displaying the locking user interface object.

In accordance with some embodiments, a computer system is described. The computer system comprises: a display generation component, one or more input devices, means for detecting, via the one or more input devices, a vehicle; and means for, in response to detecting the vehicle: in accordance with a determination that a set of criteria is met, wherein the set of criteria includes a first criterion that is met when the computer system is within a threshold distance of the vehicle and the set of criteria includes a second criterion that is met when an automatic unlock setting of the computer system is activated: initiating a process to unlock the vehicle; providing output indicating that the vehicle is unlocked; and displaying, via the display generation component, a locking user interface object that, when selected via user input, is configured to cause the vehicle to lock; and in accordance with a determination that the set of criteria is not met, forgoing providing output indicating that the vehicle is unlocked and forgoing displaying the locking user interface object.

In accordance with some embodiments, a method performed at a computer system that is in communication with a display generation component and one or more input devices is described. The method comprises: detecting a user input corresponding to an input device of the one or more input devices; in response to detecting the user input, displaying, via the display generation component, an accounts user interface that includes: in accordance with a determination that a set of criteria is met, wherein the set of criteria includes a criterion that is met when the computer system is within a threshold distance of a vehicle, displaying a first user interface object corresponding to a first secure credential at a first position, wherein the first secure credential is configured to provide authorization to use one or more functions of the vehicle; and in accordance with a determination that the set of criteria is not met, displaying a second user interface object, different from the first user interface object, corresponding to a second secure credential at the first position, wherein the second secure credential is different from the first secure credential.

In accordance with some embodiments, a non-transitory computer-readable storage medium storing one or more programs configured to be executed by one or more processors of a computer system that is in communication with a display generation component and one or more input devices is described. The one or more programs include instructions for: detecting a user input corresponding to an input device of the one or more input devices; in response to detecting the user input, displaying, via the display generation component, an accounts user interface that includes: in accordance with a determination that a set of criteria is met, wherein the set of criteria includes a criterion that is met when the computer system is within a threshold distance of a vehicle, displaying a first user interface object corresponding to a first secure credential at a first position, wherein the first secure credential is configured to provide authorization to use one or more functions of the vehicle; and in accordance with a determination that the set of criteria is not met, displaying a second user interface object, different from the first user interface object, corresponding to a second secure credential at the first position, wherein the second secure credential is different from the first secure credential.

In accordance with some embodiments, a transitory computer-readable storage medium storing one or more programs configured to be executed by one or more processors of a computer system that is in communication with a display generation component and one or more input devices is described. The one or more programs include instructions for: detecting a user input corresponding to an input device of the one or more input devices; in response to detecting the user input, displaying, via the display generation component, an accounts user interface that includes: in accordance with a determination that a set of criteria is met, wherein the set of criteria includes a criterion that is met when the computer system is within a threshold distance of a vehicle, displaying a first user interface object corresponding to a first secure credential at a first position, wherein the first secure credential is configured to provide authorization to use one or more functions of the vehicle; and in accordance with a determination that the set of criteria is not met, displaying a second user interface object, different from the first user interface object, corresponding to a second secure credential at the first position, wherein the second secure credential is different from the first secure credential.

In accordance with some embodiments, a computer system comprising a display generation component, one or more input devices, one or more processors, and memory storing one or more programs configured to be executed by the one or more processors is described. The one or more programs include instructions for: detecting a user input corresponding to an input device of the one or more input devices; in response to detecting the user input, displaying, via the display generation component, an accounts user interface that includes: in accordance with a determination that a set of criteria is met, wherein the set of criteria includes a criterion that is met when the computer system is within a threshold distance of a vehicle, displaying a first user interface object corresponding to a first secure credential at a first position, wherein the first secure credential is configured to provide authorization to use one or more functions of the vehicle; and in accordance with a determination that the set of criteria is not met, displaying a second user interface object, different from the first user interface object, corresponding to a second secure credential at the first position, wherein the second secure credential is different from the first secure credential.

In accordance with some embodiments, a computer system is described. The computer system comprises: a display generation component, one or more input devices, means for detecting a user input corresponding to an input device of the one or more input devices; and means for, in response to detecting the user input, displaying, via the display generation component, an accounts user interface that includes: in accordance with a determination that a set of criteria is met, wherein the set of criteria includes a criterion that is met when the computer system is within a threshold distance of a vehicle, displaying a first user interface object corresponding to a first secure credential at a first position, wherein the first secure credential is configured to provide authorization to use one or more functions of the vehicle; and in accordance with a determination that the set of criteria is not met, displaying a second user interface object, different from the first user interface object, corresponding to a second secure credential at the first position, wherein the second secure credential is different from the first secure credential.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for managing and using an electronic key, thereby increasing the effectiveness, efficiency, and user satisfaction with such devices. Such methods and interfaces may complement or replace other methods for managing and using an electronic key.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIGS. 7A-7B are a flow diagram illustrating an exemplary process for using an electronic key, in accordance with some embodiments.

FIGS. 8A-8B are a flow diagram illustrating an exemplary process for managing and using an electronic key, in accordance with some embodiments.

DESCRIPTION OF EMBODIMENTS

Figure 1A:
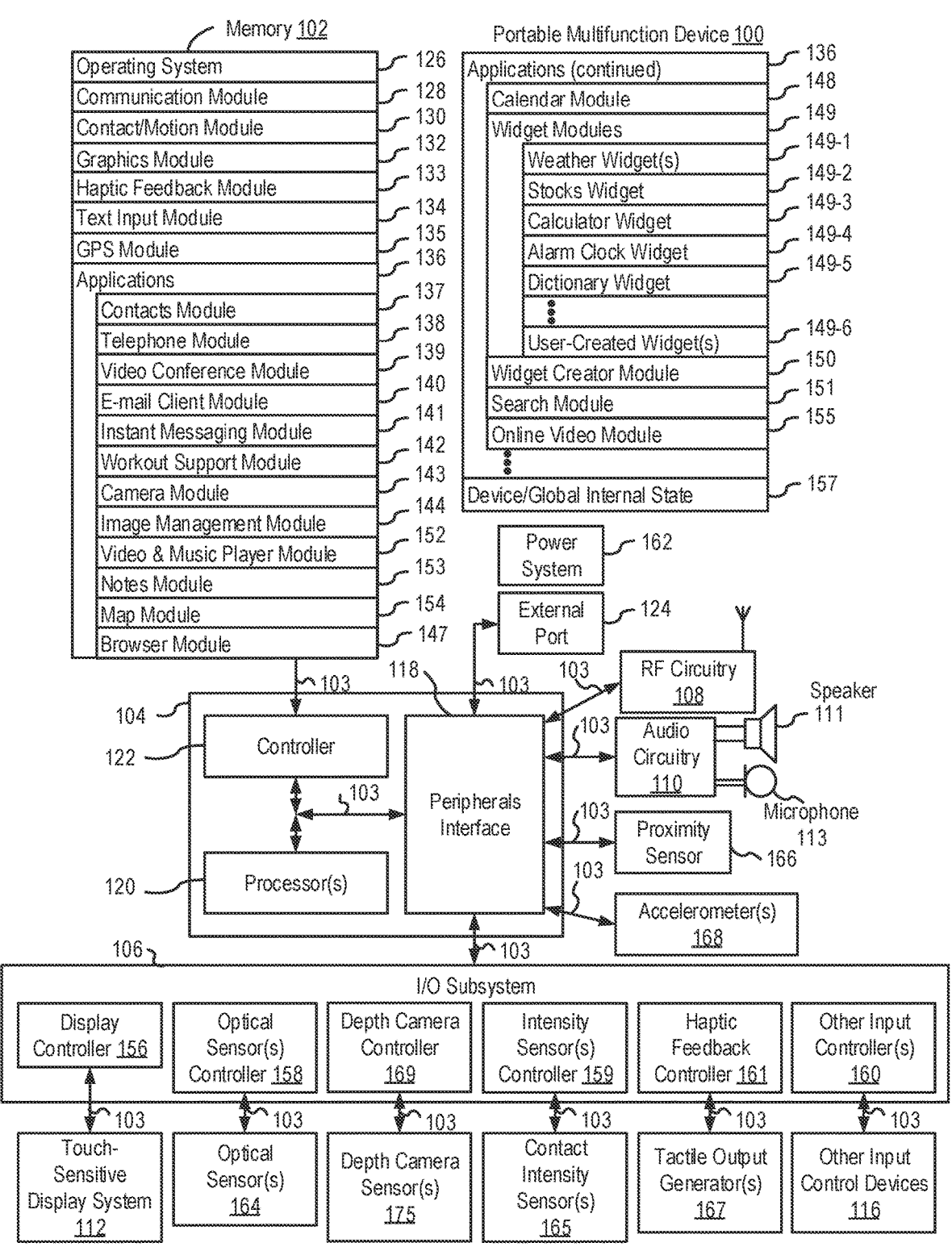
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for managing and using an electronic key. For example, there is a need for electronic devices that provide an output and/or notification indicating that an electronic key has been activated and/or used based on a location of the electronic device. These notifications can quickly inform a user about an event related to the electronic key and/or vehicle and encourage the user to take action, e.g., by providing an interface for accessing actions that can be taken. As another example, there is a need for electronic devices that provide quick access to an electronic key when the electronic device is positioned within a location where the electronic key is likely to be used. Such techniques can reduce the cognitive burden on a user who utilizes an electronic key, thereby enhancing productivity. Further, such techniques can reduce processor and battery power otherwise wasted on redundant user inputs.

Below, FIGS. 1A-1B, 2, 3, 4A-4B, and 5A-5B provide a description of exemplary devices for performing the techniques for managing event notifications. FIGS. 6A-6P illustrate exemplary user interfaces for managing and using a secure credential. FIGS. 7A-7B are a flow diagram illustrating methods of using a secure credential in accordance with some embodiments. FIGS. 8A-8B are a flow diagram illustrating methods of managing and using a secure credential in accordance with some embodiments. The user interfaces in FIGS. 6A-6P are used to illustrate the processes described below, including the processes in FIGS. 7A-7B and FIGS. 8A-8B.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touch-pads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures) as input. In some embodiments, the one or more input devices are integrated with the computer system. In some embodiments, the one or more input devices are separate from the computer system.

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6)

U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem

106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. patent Publication No. 20050190059, "Acceleration-based Theft Detection System for Portable Electronic Devices," and U.S. patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
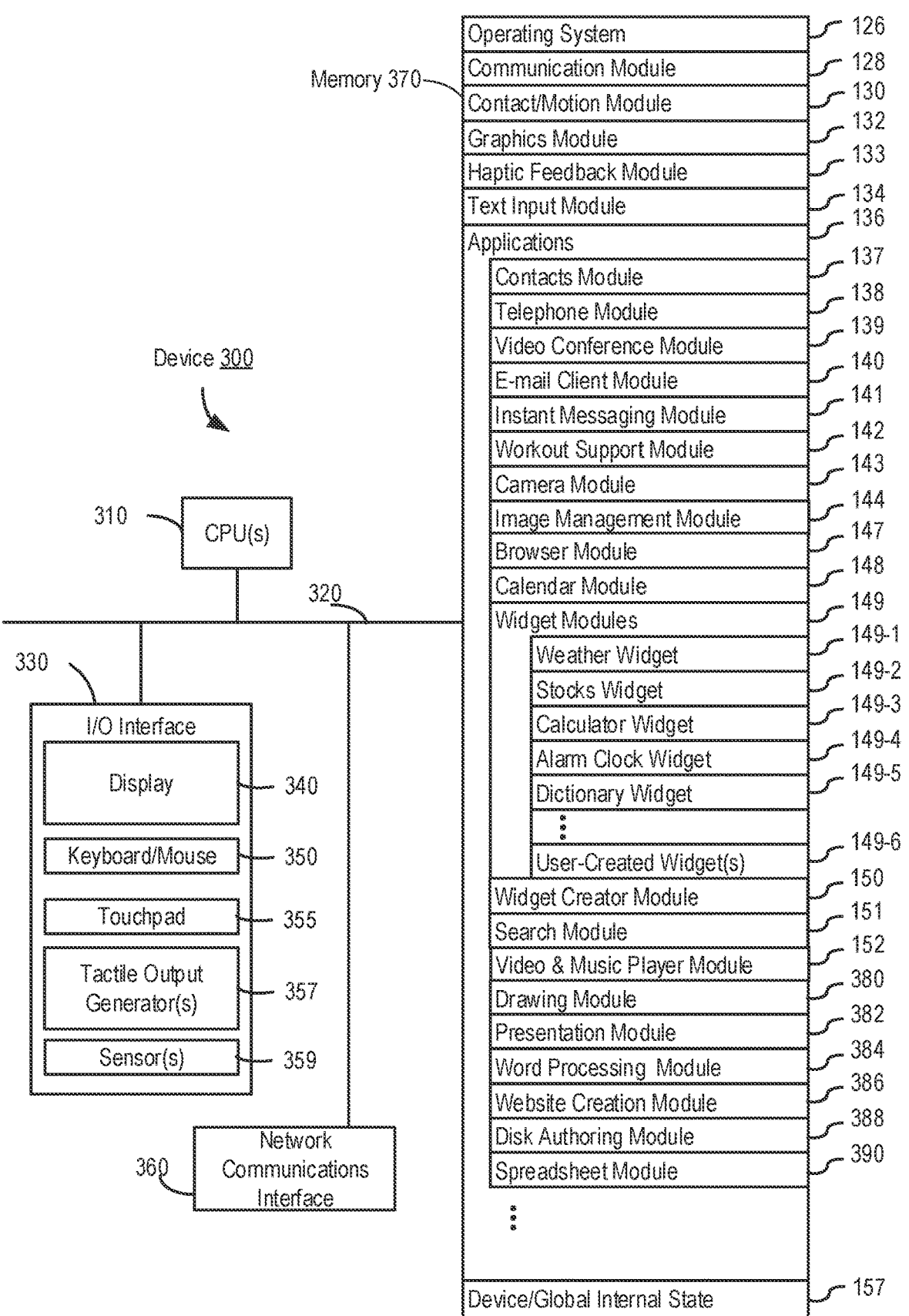
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:

Contacts module 137 (sometimes called an address book or contact list);
Telephone module 138;
Video conference module 139;
E-mail client module 140;
Instant messaging (IM) module 141;
Workout support module 142;
Camera module 143 for still and/or video images;
Image management module 144;
Video player module;
Music player module;
Browser module 147;
Calendar module 148;
Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;
Search module 151;
Video and music player module 152, which merges video player module and music player module;
Notes module 153;
Map module 154; and/or
Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
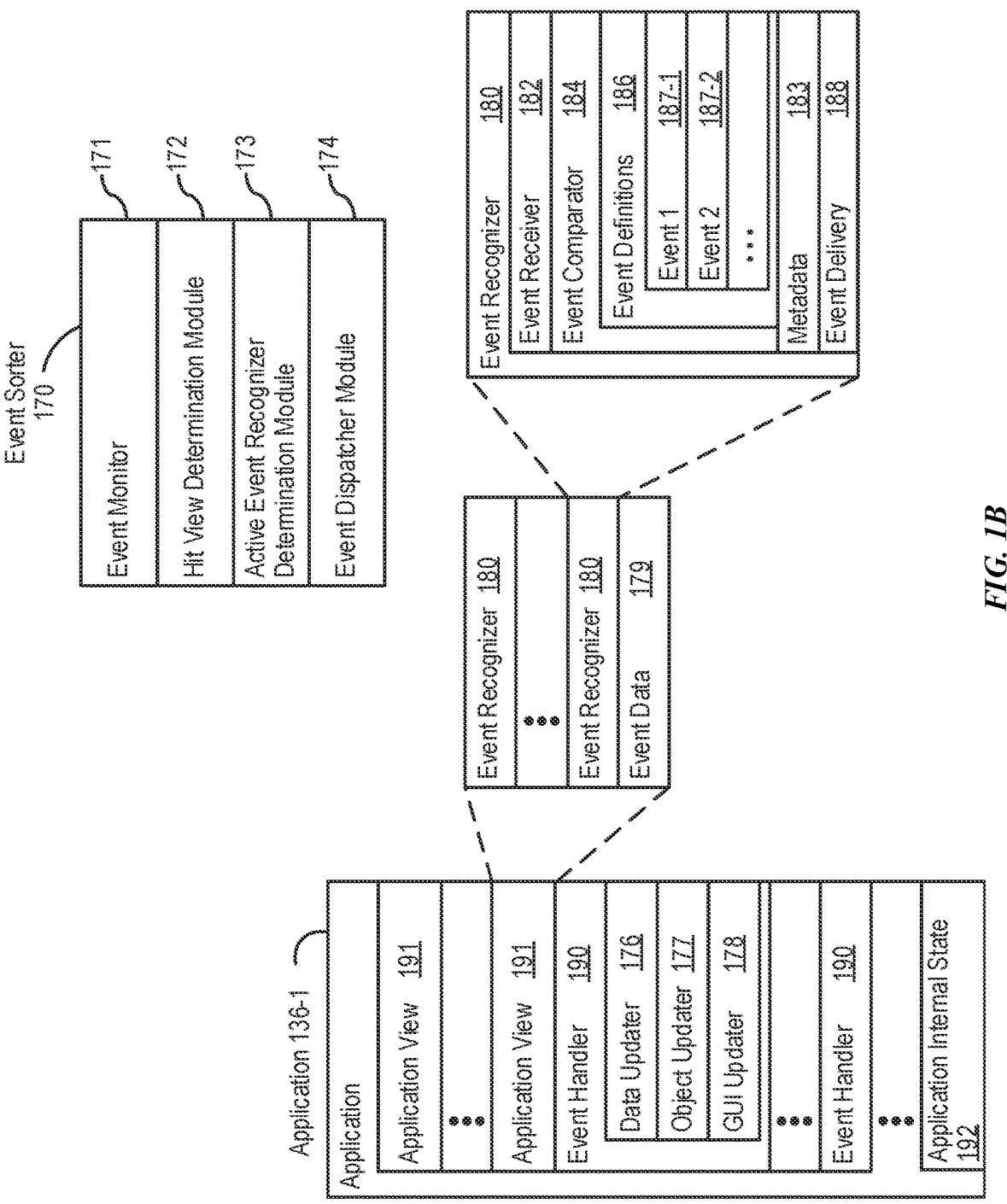
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler.

Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
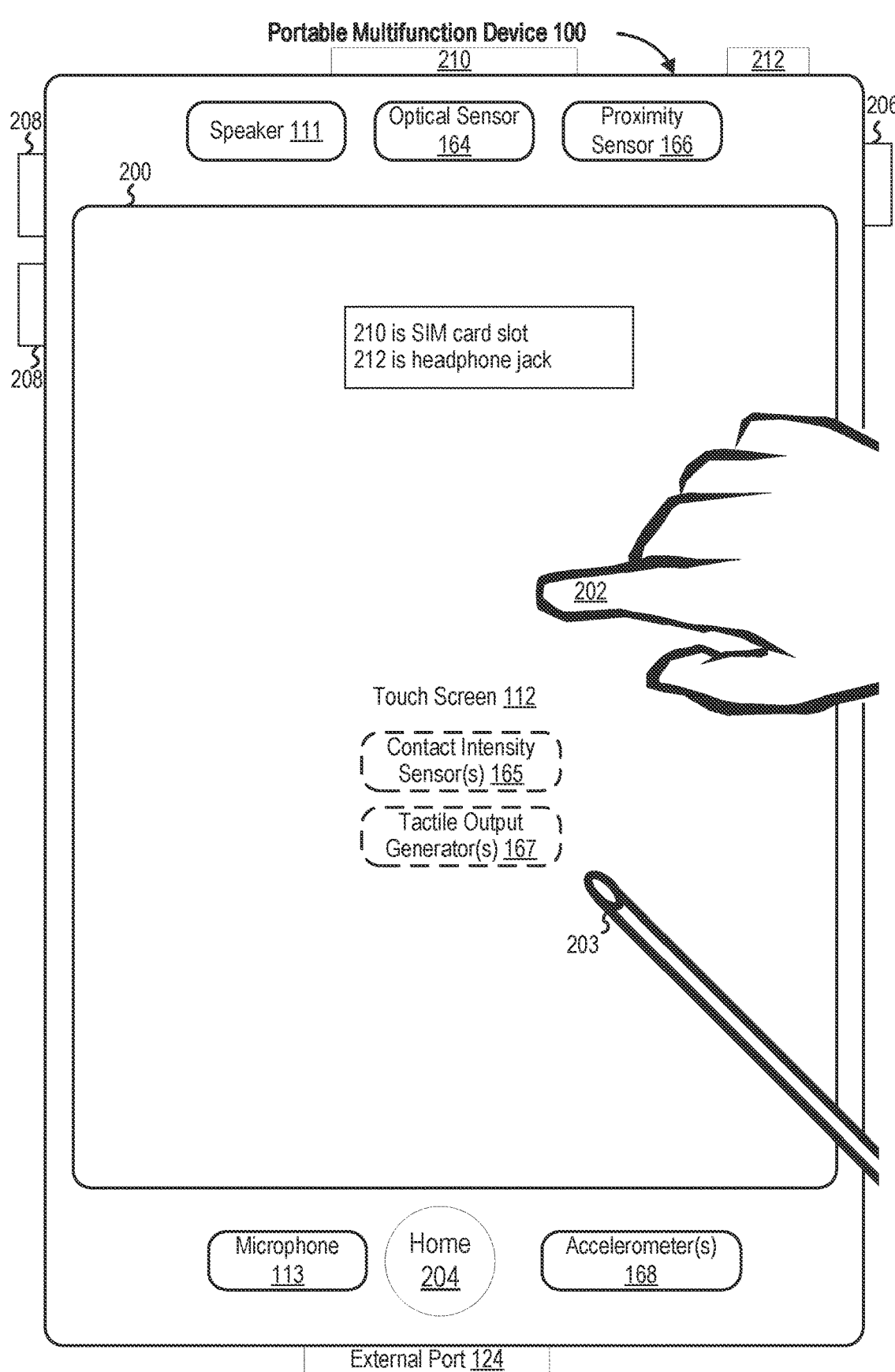
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
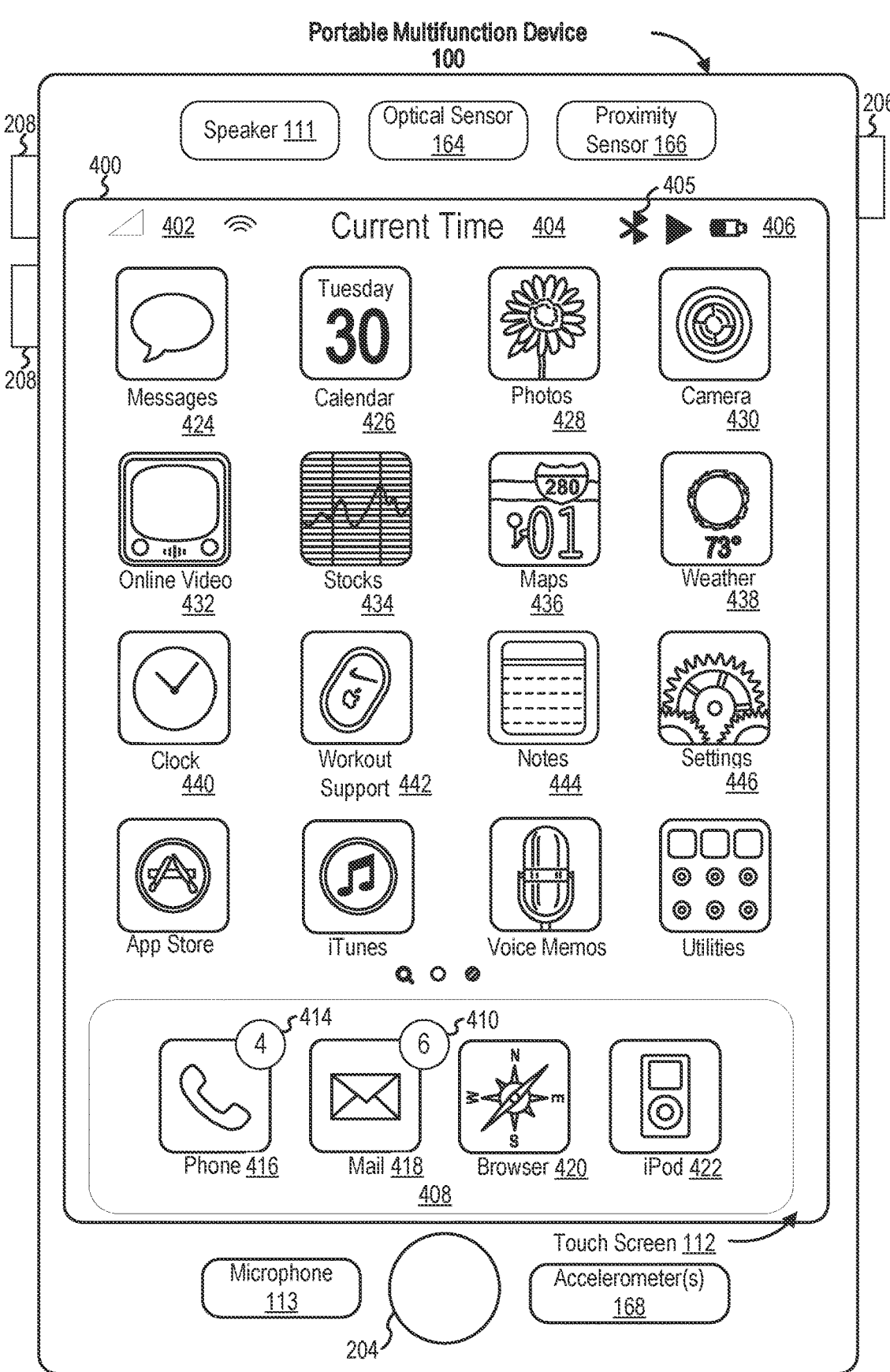
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;

Time 404;

Bluetooth indicator 405;

Battery status indicator 406;

Tray 408 with icons for frequently used applications, such as:

Icon 416 for telephone module 138, labeled "Phone," which optionally includes an indicator 414 of the number of missed calls or voicemail messages;

Icon 418 for e-mail client module 140, labeled "Mail," which optionally includes an indicator 410 of the number of unread e-mails;

Icon 420 for browser module 147, labeled "Browser;" and

Icon 422 for video and music player module 152, also referred to as iPod (trademark of Apple Inc.) module 152, labeled "iPod;" and Icons for other applications, such as:

Icon 424 for IM module 141, labeled "Messages;"

Icon 426 for calendar module 148, labeled "Calendar;"

Icon 428 for image management module 144, labeled "Photos;"

Icon 430 for camera module 143, labeled "Camera;"

Icon 432 for online video module 155, labeled "Online Video;"

Icon 434 for stocks widget 149-2, labeled "Stocks;"

Icon 436 for map module 154, labeled "Maps;"

Icon 438 for weather widget 149-1, labeled "Weather;"

Icon 440 for alarm clock widget 149-4, labeled "Clock;"

Icon 442 for workout support module 142, labeled "Workout Support;"

Icon 444 for notes module 153, labeled "Notes;" and

Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
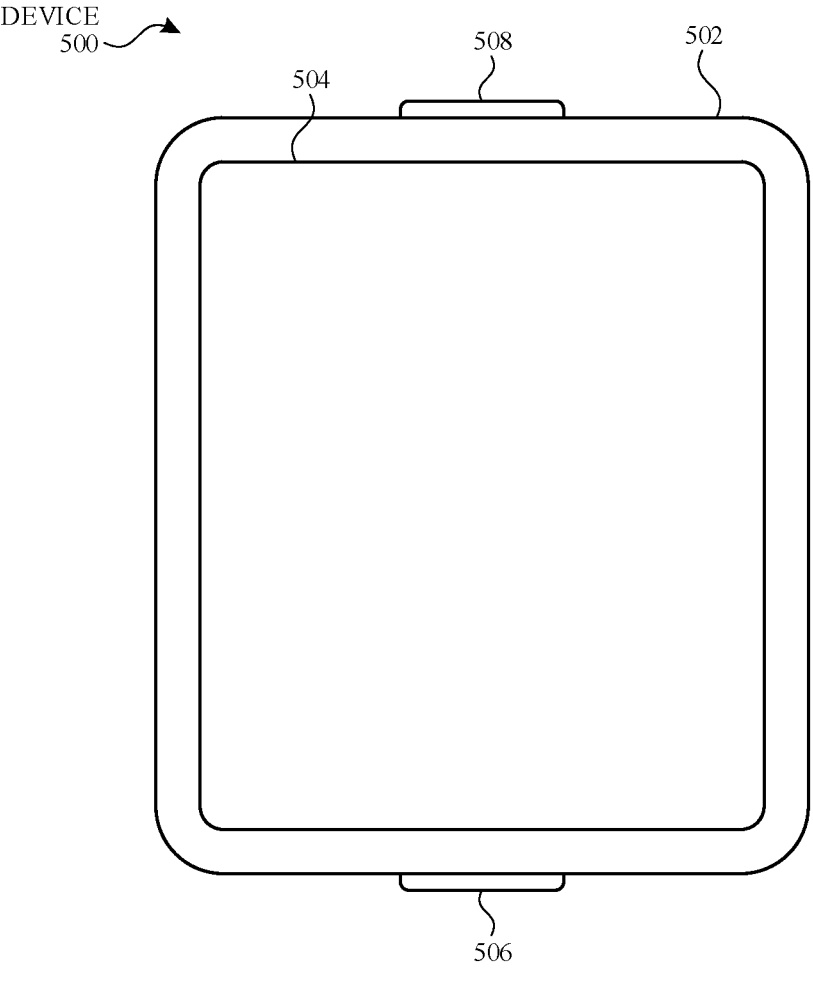
FIG. 5A illustrates a personal electronic device in accordance with some embodiments.
Figure 6A:
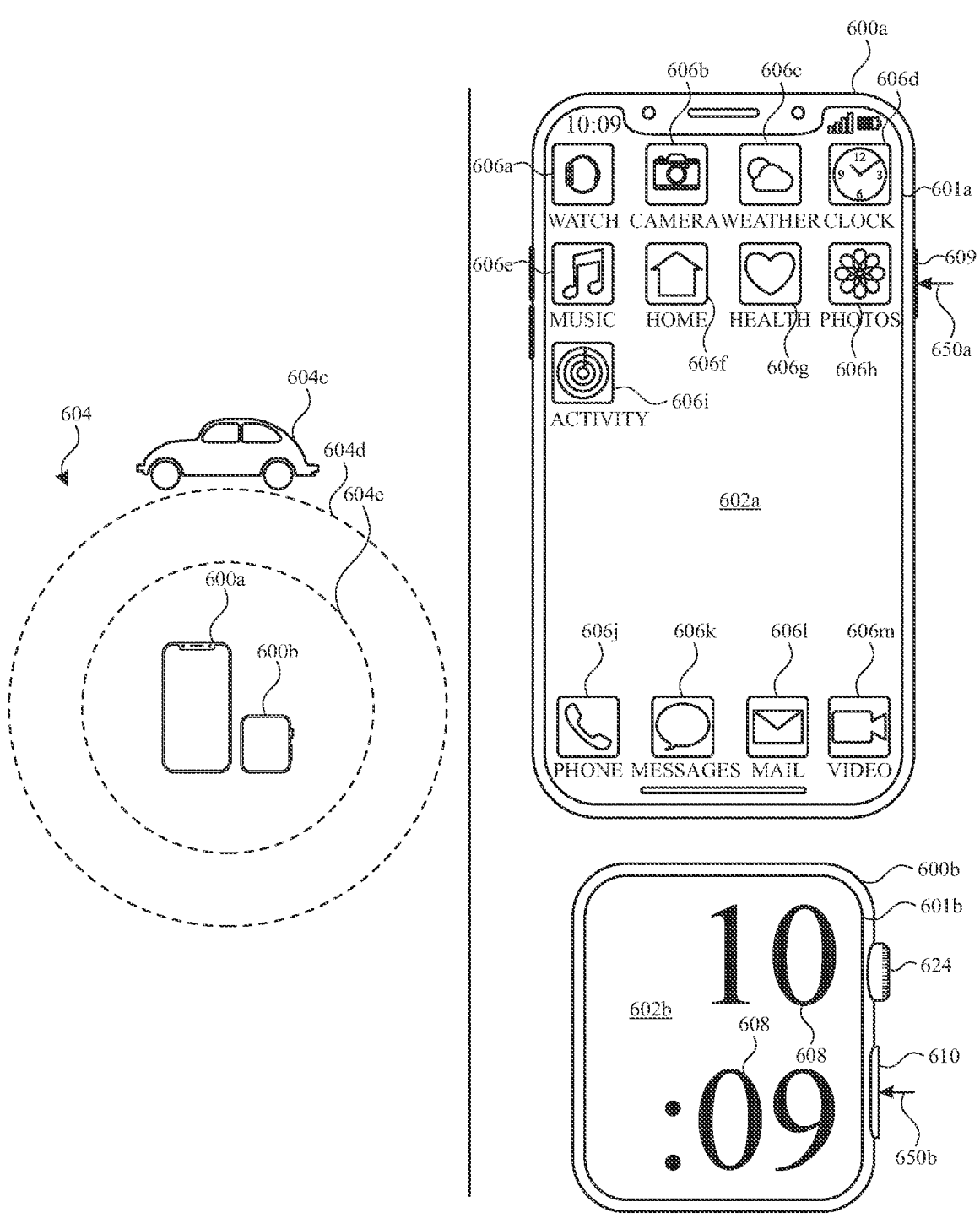
FIGS. 6A-6P illustrate exemplary user interfaces for managing and using an electronic key, in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
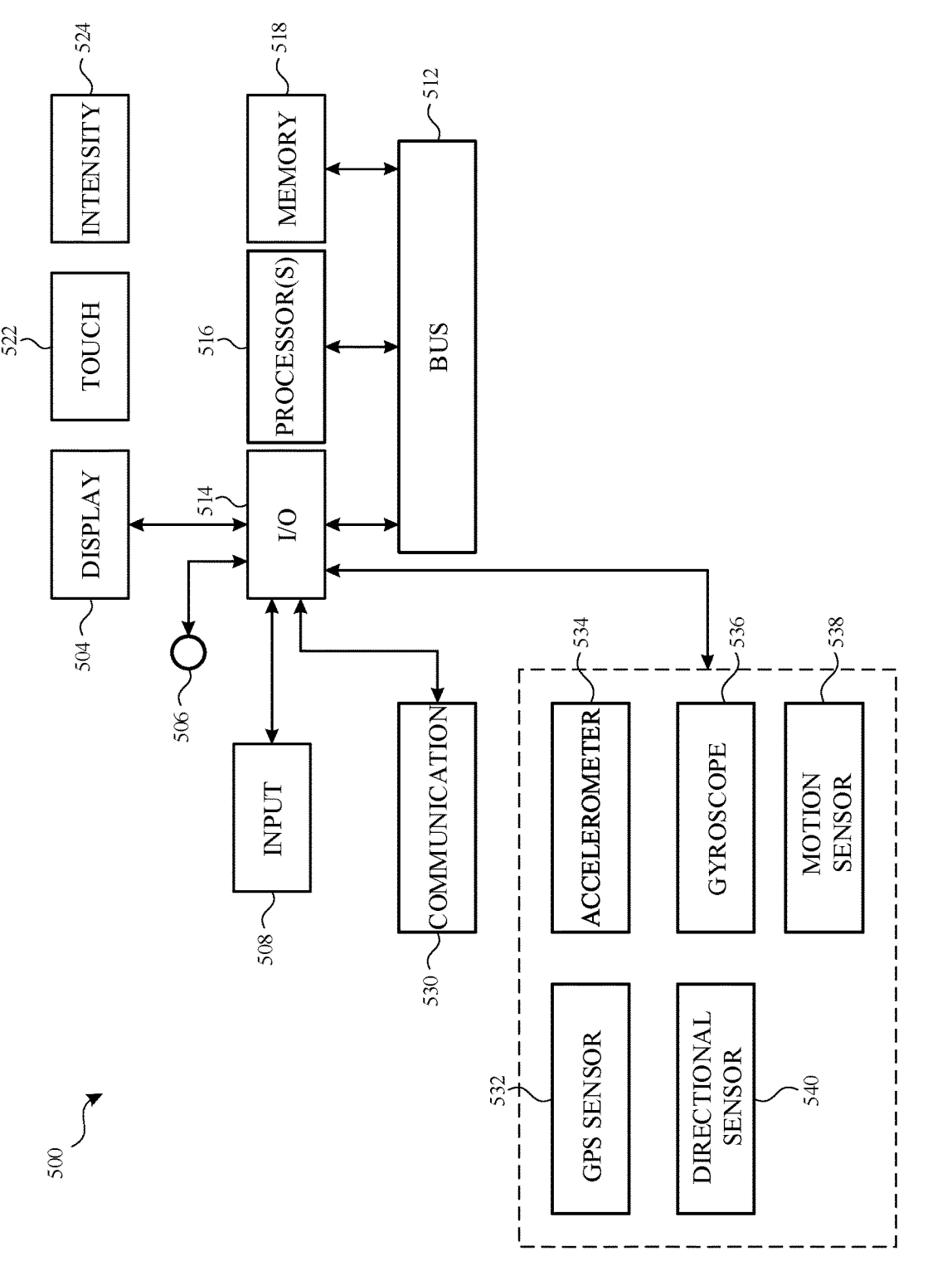
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700 and 800 (FIGS. 7A-7B and FIGS. 8A-8B). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

Attention is now directed towards embodiments of user interfaces ("UI") and associated processes that are implemented on an electronic device, such as portable multifunction device 100, device 300, or device 500.

FIGS. 6A-6P illustrate exemplary user interfaces for managing and using a secure credential, e.g., an electronic key associated with a vehicle, in accordance with some embodiments. The user interfaces in these figures are used to illustrate the processes described below, including the processes in FIGS. 7A-7B and FIGS. 8A-8B.

FIGS. 6A-6P illustrate exemplary arrangements of first electronic device 600a, second electronic device 600b, and an external device, such as vehicle 604c (e.g., a computer system of the vehicle) and user interfaces of first electronic device 600a and second electronic device 600b. At FIGS. 6A-6P, arrangement 604 is provided for a more complete understanding, but is not part of the user interfaces displayed via first electronic device 600a and/or second electronic device 600b. Arrangement 604 illustrates the positioning of first electronic device 600a, second electronic device 600b, vehicle 604c that is configured to be in communication with first electronic device 600a and/or second electronic device 600b, first distance indicator 604d (e.g., first threshold distance indicator and/or first distance range 604d), and second distance indicator 604e (e.g., second threshold distance indicator and/or second distance range 604e).

First distance indicator 604d indicates a first distance range (e.g., distances extending from first electronic device 600a and/or second electronic device 600b) between first electronic device 600a and/or second electronic device 600b and an external device, such as vehicle 604c. While within the first distance range, first electronic device 600a and/or second electronic device 600*b* communicate with the external device via a short-range communication connection (e.g., Bluetooth, Wi-Fi, and/or Zigbee). In some embodiments, first distance indicator 604*d* is indicative of distances that are less than a distance required to establish the short-range communication connection between first electronic device 600*a* and the external device and/or between second electronic device 600*b* and the external device. Second distance indicator 604*e* indicates a second distance range (e.g., distances extending from first electronic device 600*a* and/or second electronic device 600*b*) that is less than the first distance range. The second distance range includes distances between first electronic device 600*a* and the external device and/or distances between second electronic device 600*b* and the external device that enable first electronic device 600*a* and/or second electronic device 600*b* to cause the external device to perform a particular function (e.g., lock and/or unlock the vehicle). The first distance range and the second distance range can be non-uniform, can be affected by numerous variables (e.g., wireless interference, air humidity, or the like), and can include points in space in three dimensions, all of which are intended to be within the scope of this disclosure. Thus, the graphical representations of first distance indicator 604*d* and second distance indicator 604*e* are merely exemplary. Furthermore, the figures are not necessarily to scale and are included merely as a visual aid. Thus, the size and scale of features depicted in the figures are not intended as a limitation on a distance required to be in close proximity or to satisfy a proximity condition.

FIG. 6A illustrates first electronic device 600*a* displaying, via display 601*a*, first user interface 602*a*, such as a home screen user interface. In addition, second electronic device 600*b* displays, via display 601*b*, first user interface 602*b*, such as a watch face user interface that optionally includes display of the current time. In some embodiments, first electronic device 600*a* and second electronic device 600*b* are in communication with one another. For instance, first electronic device 600*a* and second electronic device 600*b* are paired to and/or connected to one another, such that first electronic device 600*a* and second electronic device 600*b* send and receive data communications to and from one another. In some embodiments, first electronic device 600*a* and second electronic device 600*b* are not paired to and/or otherwise in communication with one another, such that first electronic device 600*a* and second electronic device 600*b* function and/or operate independent of one another.

At FIG. 6A, vehicle 604*c* is outside of (e.g., at a distance farther from first electronic device 600*a* and second electronic device 600*b* than) both first distance range 604*d* and second distance range 604*e*. As set forth in detail below, first electronic device 600*a* and/or second electronic device 600*b* can display relevant user interfaces, such as user interfaces that indicate one or more statuses of the vehicle and/or include an active secure credential (e.g., an electronic key for the vehicle and/or an electronic transaction card), and/or cause the vehicle to perform various functions based on a position of first electronic device 600*a* and/or second electronic device 600*b* with respect to the vehicle (e.g., whether vehicle 604*c* is positioned within first distance range 604*d* and/or second distance range 604*e* from first electronic device 600*a* and/or second electronic device 600*b*). First user interface 602*a* of first electronic device 600*a* is a home screen user interface that includes one or more application user interface objects 606*a*-606*m*. In addition, first user interface 602*b* of second electronic device 600*b* is a watch face user interface that includes an indication of time 608

(e.g., a digital indication of time). Throughout FIGS. 6A-6P, corresponding (or similar) user interfaces are shown for each of first electronic device 600*a* and second electronic device 600*b* for ease of explanation. The techniques described do not require that both first electronic device 600*a* and second electronic device 600*b* be present or for a user to interact with both of them.

Figure 6B:
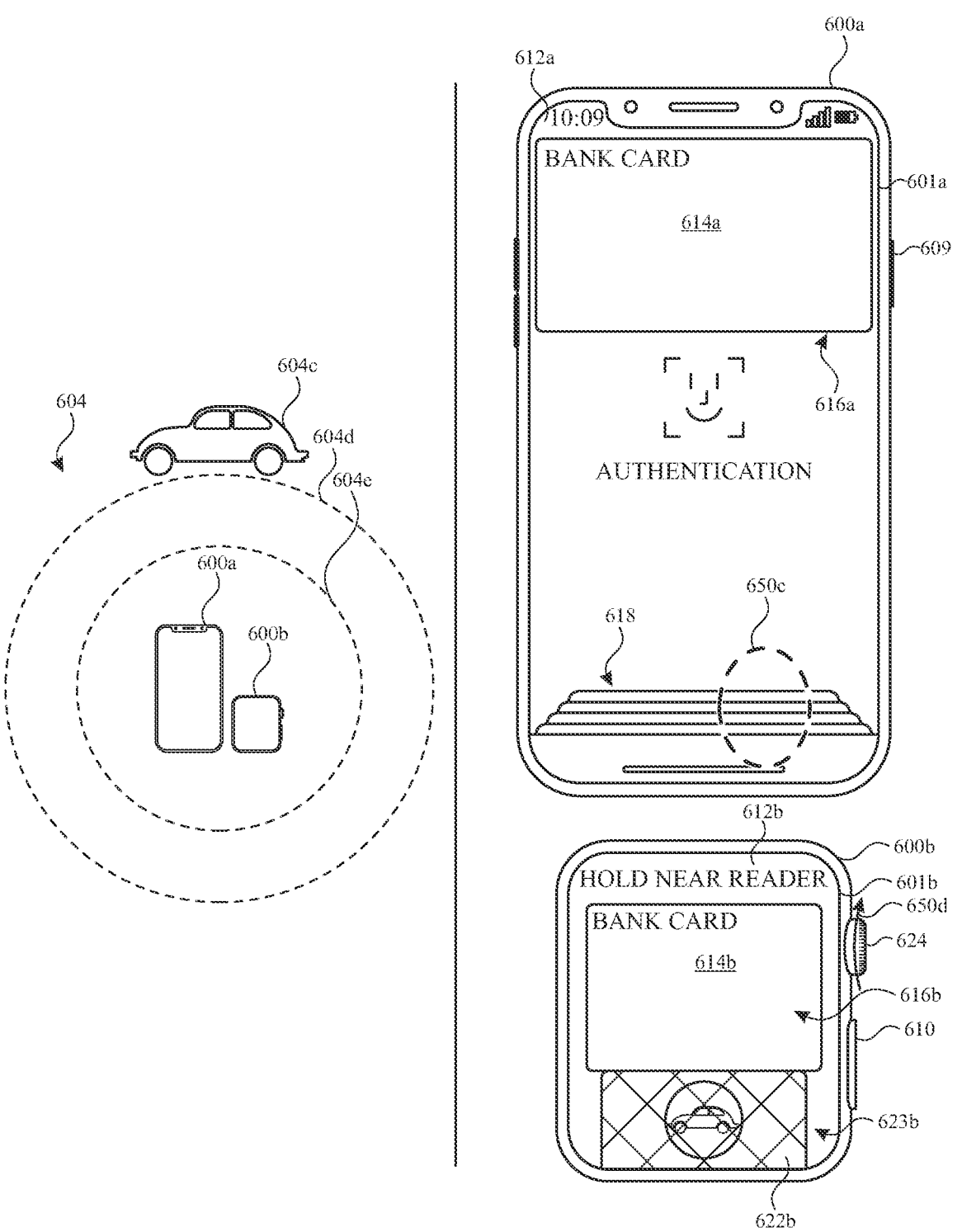

At FIG. 6A, first electronic device 600*a* detects user input 650*a*, such as a double press gesture on button 609 (e.g., a physical, depressible button incorporated into a housing of first electronic device 600*a*) of first electronic device 600*a*. Second electronic device 600*b* detects user input 650*b*, such as a double press gesture on button 610 (e.g., a physical, depressible button incorporated into a housing of second electronic device 600*b*) of second electronic device 600*b*. In response to detecting user input 650*a*, first electronic device 600*a* displays first accounts user interface 612*a*, as shown at FIG. 6B. Similarly, in response to detecting user input 650*b*, second electronic device 600*b* displays first accounts user interface 612*b*, as shown at FIG. 6B. First accounts user interface 612*a* and/or first accounts user interface 612*b* can display user interface objects corresponding to secure credentials (e.g., a transaction card (e.g., a payment card and/or a gift card), a pass (e.g., a boarding pass and/or a transportation account card), and/or an electronic key (e.g., a vehicle key, a house key, and/or another virtual key)) to a user.

At FIG. 6B, vehicle 604*c* remains positioned outside of first distance range 604*d* and second distance range 604*e* with respect to first electronic device 600*a* and second electronic device 600*b*. Accordingly, first electronic device 600*a* and second electronic device 600*b* are not within range of vehicle 604*c* to communicate with vehicle 604*c* (e.g., within range to cause vehicle 604*c* to perform one or more functions in response to user input).

At FIG. 6B, first accounts user interface 612*a* illustrates first user interface object 614*a* at first position 616*a*. First user interface object 614*a* corresponds to a first secure that is a transaction card (e.g., a payment card and/or a gift card). As set forth below, first accounts user interface 612*a* displays a user interface object (e.g., second user interface object 622*a*) at first position 616*a* that corresponds to a secure credential that is an electronic key (e.g., a vehicle key, a house key, and/or another virtual key) when first electronic device 600*a* is within a threshold distance of a physical lock to which the virtual key corresponds. In this case, first user interface object 614*a* is not associated with the electronic key associated with the physical lock for vehicle 604*c* because the vehicle is positioned outside of first distance range 604*d* with respect to first electronic device 600*a*.

At FIG. 6B, first electronic device 600*a* displays first user interface object 614*a* at first position 616*a* on first accounts user interface 612*a* in response to detecting user input 650*a*. While displayed at first position 616*a*, the first secure credential associated with first user interface object 614*a* is active and/or enabled for use (e.g., after receiving user authentication, such as via a passcode/password input and/or face recognition). In other words, while displayed at first position 616*a* on first accounts user interface 612*a*, the first secure credential can be used to complete a transaction by positioning first electronic device 600*a* near a reader (e.g., a near-field communication reader and/or a reader configured to receive data from first electronic device to complete the transaction). First accounts user interface 612 also includes stack 618 (e.g., a stack of user interface objects) corresponding to secure credentials that are different from the first secure credential. At FIG. 6B, stack 618 includes a plurality of user interface objects that overlap with one another, such that none of the user interface objects of the plurality of user interface objects of stack 618 are fully displayed on display 601a of first electronic device 600a (e.g., first user interface object 614a corresponds to a default secure credential of first electronic device 600a, and thus, first electronic device 600a does not display a user interface object at second position 623a, as described below). As set forth below with reference to FIG. 6C, in response to detecting user input 650c corresponding to selection of stack 618, first electronic device 600a expands stack 618 to display user interface objects 620 corresponding to respective secure credentials.

In addition, as shown in FIG. 6B, second electronic device 600b displays first accounts user interface 612b that includes first user interface object 614b at first position 616b. First user interface object 614b also corresponds to the first secure credential that is the transaction card (e.g., a payment card and/or a gift card). As set forth below, first accounts user interface 612b displays a user interface object (e.g., second user interface object 622b) at first position 616b that corresponds to a secure credential that is an electronic key (e.g., a vehicle key, a house key, and/or another virtual key) when second electronic device 600b is within a threshold distance of the physical lock to which the virtual key corresponds. In this case, first user interface object 614b is not associated with the electronic key associated with the physical lock for vehicle 604c because the vehicle is positioned outside of first distance range 604d with respect to second electronic device 600b.

At FIG. 6B, second electronic device 600b displays first user interface object 614b at first position 616b on first accounts user interface 612b in response to detecting user input 650b. While displayed at first position 616b, the first secure credential associated with first user interface object 614b is active and/or enabled for use (e.g., based on a previous authentication received at second electronic device 600b). In other words, while displayed at first position 616b on first accounts user interface 612b, the first secure credential can be used to complete a transaction by positioning second electronic device 600b near a reader (e.g., a near-field communication reader and/or a reader configured to receive data from first electronic device to complete the transaction).

Further, first accounts user interface 612b includes second user interface object 622b at second position 623b. Second user interface object 622b corresponds to a second secure credential that is a vehicle key (e.g., a virtual key that enables first electronic device 600a and/or second electronic device 600b to cause vehicle 604c associated with the vehicle key to perform one or more functions). At FIG. 6B, second user interface object 622b is displayed with an inactive appearance, such as reduced brightness and/or a gray color scheme, to indicate that the second secure credential associated with second user interface object 622b is inactive and/or not enabled for use. In some embodiments, the second secure credential associated with second user interface object 622b is activated and/or enabled for use in response to detecting user input corresponding to second user interface object 622b and/or user input corresponding to moving second user interface object 622b into first position 616b (e.g., a swipe gesture on display 601b and/or a rotational input on rotatable input mechanism 624). In some embodiments, the second secure credential associated with second user interface object 622b is inactive and/or not enabled for use even when second user interface object is in first position 616b and/or selected via user input when vehicle 604c associated with the second secure credential is not within first distance range 604d of second electronic device 600b.

Figure 6C:
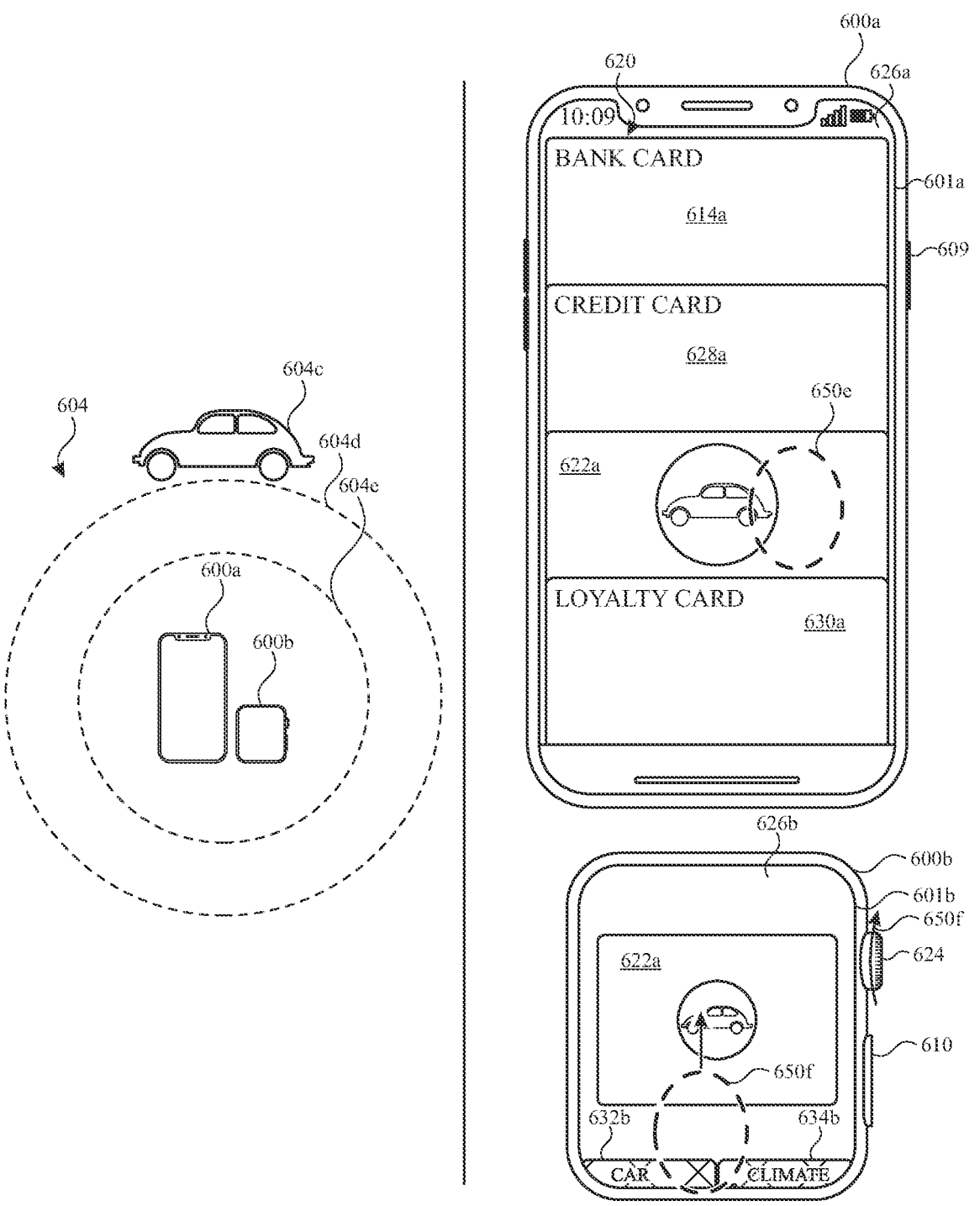

At FIG. 6B, first electronic device 600a detects user input 650c (e.g., a tap gesture) corresponding to selection of stack 618. In response to detecting user input 650c, first electronic device 600a displays second accounts user interface 626a including user interface objects 620, as shown at FIG. 6C. Similarly, second electronic device 600b detects user input 650d (e.g., a rotational input) corresponding to rotatable input mechanism 624. In response to detecting user input 650d, second electronic device 600b displays second accounts user interface 626b, as shown at FIG. 6C.

At FIG. 6C, vehicle 604c remains positioned outside of first distance range 604d and second distance range 604e with respect to first electronic device 600a and second electronic device 600b. In some embodiments, first electronic device 600a displays second accounts user interface 626a and second electronic device 600b displays second accounts user interface 626b.

At FIG. 6C, second accounts user interface 626a includes first user interface object 614a, second user interface object 622a, third user interface object 628a, and fourth user interface object 630a. Second user interface object 622a, third user interface object 628a, and fourth user interface object 630a correspond to user interface objects of the plurality of user interface objects included in stack 618. In some embodiments, second accounts user interface 626a includes more user interface objects than can be displayed on the electronic device at once, e.g., more than four user interface objects, such that first electronic device 600a displays additional user interface objects on second accounts user interface 626a in response to detecting user input (e.g., a swipe gesture).

Second accounts user interface 626b corresponds to the second secure credential (e.g., an electronic vehicle key) and displays second user interface object 622b. In addition, second accounts user interface 626b includes at least a portion of first control user interface object 632b and second control user interface object 634b. First control user interface object 632b corresponds to a first function of vehicle 604c and second control user interface object 634b corresponds to a second function (e.g., a different function than the first function) of vehicle 604c. As set forth below, second electronic device 600b causes (when enabled for use) (e.g., by transmitting an instruction to) vehicle 604c to perform the first function in response to detecting user input selecting first control user interface object 632b and causes (when enabled for use) vehicle 604c to perform the second function in response to detecting user input selecting second control user interface object 634b. However, because vehicle 604c is outside of first distance range 604d and second distance range 604e, first control user interface object 632b and second control user interface object 634b are displayed with an inactive appearance, such as reduced brightness and/or a gray color scheme, to indicate that first control user interface object 632b and second control user interface object 634b are inactive and/or not enabled for use. In other words, a user of second electronic device 600b is not able to control the first function and/or the second function of vehicle 604c when vehicle 604c is positioned at a distance farther than the first distance range 604d from second electronic device 600b.

Figure 6D:
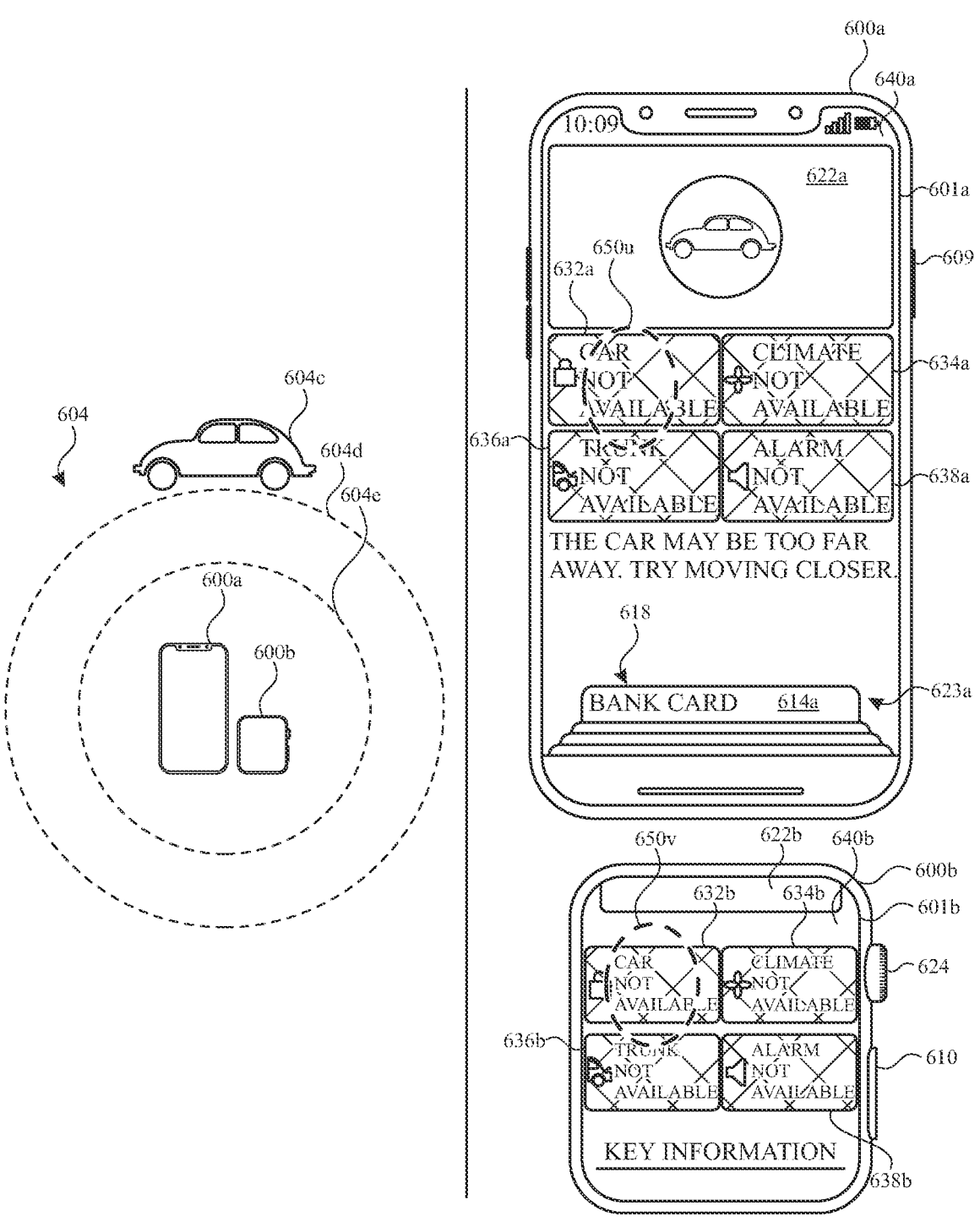

At FIG. 6C, first electronic device 600a detects user input 650e (e.g., a tap gesture) corresponding to second user interface object 622a. In response to detecting user input 650e, first electronic device 600a displays third accounts user interface 640a, as shown at FIG. 6D. In addition, second electronic device 600b detects user input 650f (e.g., a swipe gesture and/or a rotational input on rotatable input mechanism 624). In response to detecting user input 650f, second electronic device 600b displays third accounts user interface 640b, as shown at FIG. 6D.

At FIG. 6D, arrangement 604 illustrates that vehicle 604c remains positioned at a distance farther than both first distance range 604d and second distance range 604e from both first electronic device 600a and second electronic device 600b.

At FIG. 6D, third accounts user interface 640a includes second user interface object 622a, first control user interface object 632a, second control user interface object 634a, third control user interface object 636a, and fourth control user interface object 638a. First control user interface object 632a corresponds to a lock/unlock function of vehicle 604c. As such, when vehicle 604c is within first distance range 604d of first electronic device 600a, first electronic device 600a is configured to cause vehicle 604c to lock and/or unlock one or more locks on the doors of vehicle 604c in response to detecting user input corresponding to first control user interface object 632a. Second control user interface object 634a corresponds to a climate function of vehicle 604c. Thus, when vehicle 604c is within first distance range 604d of first electronic device 600a, first electronic device 600a is configured to cause vehicle 604c to activate and/or deactivate (e.g., turn on and/or turn off) a climate system of vehicle 604c (e.g., an air conditioning system and/or a heating system that adjust a temperature within one or more interior compartments of the vehicle). Third control user interface object 636a corresponds to a trunk function of vehicle 604c. When vehicle 604c is within first distance range 604d of first electronic device 600a, first electronic device 600a is configured to cause a trunk and/or hatch of vehicle 604c to open and/or close. Further, fourth control user interface object 638a corresponds to an alarm function of vehicle 604c. When vehicle 604c is within first distance range 604d of first electronic device 600a, first electronic device 600a is configured to turn on and/or turn off an alarm system (e.g., an audio alarm system and/or a lighting alarm system) of vehicle 604c.

In some embodiments, control user interface objects 632a, 634a, 636a, and 638a correspond to other functions of vehicle 604c. Additionally or alternatively, third accounts user interface 640a and/or third accounts user interface 640b optionally includes more control user interface objects or less control user interface objects depending on functions of the particular vehicle that are able to be controlled remotely via first electronic device 600a and/or second electronic device 600b. For instance, as set forth below, third accounts user interface 640a and/or third accounts user interface 640b optionally includes an engine function that turns on and/or turns off an engine and/or motor of vehicle 604c.

At FIG. 6D, control user interface objects 632a, 634a, 636a, and 638a include an inactive appearance, such as reduced brightness and/or a gray color scheme, to indicate that the control user interface objects 632a, 634a, 636a, and 638a are inactive and/or not enabled for use.

In other words, a user of first electronic device 600a is not able to control the lock/unlock function, the climate function, the trunk function, and/or the alarm function of vehicle 604c when vehicle 604c is positioned at a distance farther than first distance range 604d from first electronic device 600a. As shown by arrangement 604, vehicle 604c is positioned at a distance beyond first distance range 604d from first electronic device 600a, and thus, each of the functions associated with control user interface objects 632a, 634a, 636a, and/or 638a are not able to be initiated via first electronic device 600a. In addition, control user interface objects 632a, 634a, 636a, and 638a include a visual indication ("Not Available") that the respective functions of control user interface objects 632a, 634a, 636a, and 638a cannot be controlled via first electronic device 600a (e.g., because vehicle 604c is not positioned within first distance range 604d of first electronic device 600a).

At FIG. 6D, first electronic device 600a detects user input 650u (e.g., a tap gesture) corresponding to first control user interface object 632a. When first electronic device 600a is outside of first distance range 604d from vehicle 604c and in response to detecting user input 650u, first electronic device 600a does not cause vehicle 604c to perform the lock/unlock function. In some embodiments, first electronic device 600a displays an animation of first control user interface object 632a in response to detecting user input 650u when first electronic device 600a is outside of first distance range 604d from vehicle 604c. The animation can include a change in size, a change in location, a change in shape, a change in color, a change in brightness, and/or a change in blur applied to first user interface object 632a in response to detecting user input 650u (and when first electronic device 600a is outside of first distance range 604d from vehicle 604c).

Further, at FIG. 6D, second electronic device 600b displays third accounts user interface 640b, which includes first control user interface object 632b, second control user interface object 634b, third control user interface object 636b, and fourth control user interface object 638b. As set forth above, first control user interface object 632b corresponds to the lock/unlock function of vehicle 604c, second control user interface object 634b corresponds to the climate function of vehicle 604c, third control user interface object 636b corresponds to the trunk function of vehicle 604c, and fourth control user interface object 638b corresponds to the alarm function of vehicle 604c.

Because vehicle 604c is positioned farther than first distance range 604d from second electronic device 600b, second electronic device 600b is does not cause the vehicle to perform the corresponding functions of control user interface objects 632b, 634b, 636b, and 638b when they are activated (e.g., selected). As such, control user interface objects 632b, 634b, 636b, and 638b include an inactive appearance, such as reduced brightness and/or a gray color scheme, to indicate that the control user interface objects 632b, 634b, 636b, and 638b are inactive and/or not enabled for use. In other words, a user of second electronic device 600b is not able to control the lock/unlock function, the climate function, the trunk function, and/or the alarm function of vehicle 604c when vehicle 604c is positioned at a distance farther than first distance range 604d from second electronic device 600b. In addition, control user interface objects 632b, 634b, 636b, and 638b include a visual indication ("Not Available") that the respective functions of control user interface objects 632b, 634b, 636b, and 638b cannot be controlled via second electronic device 600b (e.g., because vehicle 604c is not positioned within first distance range 604d from second electronic device 600b).

At FIG. 6D, second electronic device 600b detects user input 650v (e.g., a tap gesture) corresponding to first control user interface object 632b. When second electronic device 600b is outside of first distance range 604d from vehicle 604c and in response to detecting user input 650v, second electronic device 600b does not cause vehicle 604c to perform the lock/unlock function. In some embodiments, second electronic device 600b displays an animation of first control user interface object 632b in response to detecting user input 650v when second electronic device 600b is outside of first distance range 604d of vehicle 604c. The animation can include a change in size, a change in location, a change in shape, a change in color, a change in brightness, and/or a change in blur applied to first user interface object 632b in response to detecting user input 650v (and when second electronic device 600b is outside of the first distance range of the vehicle).

Figure 6E:
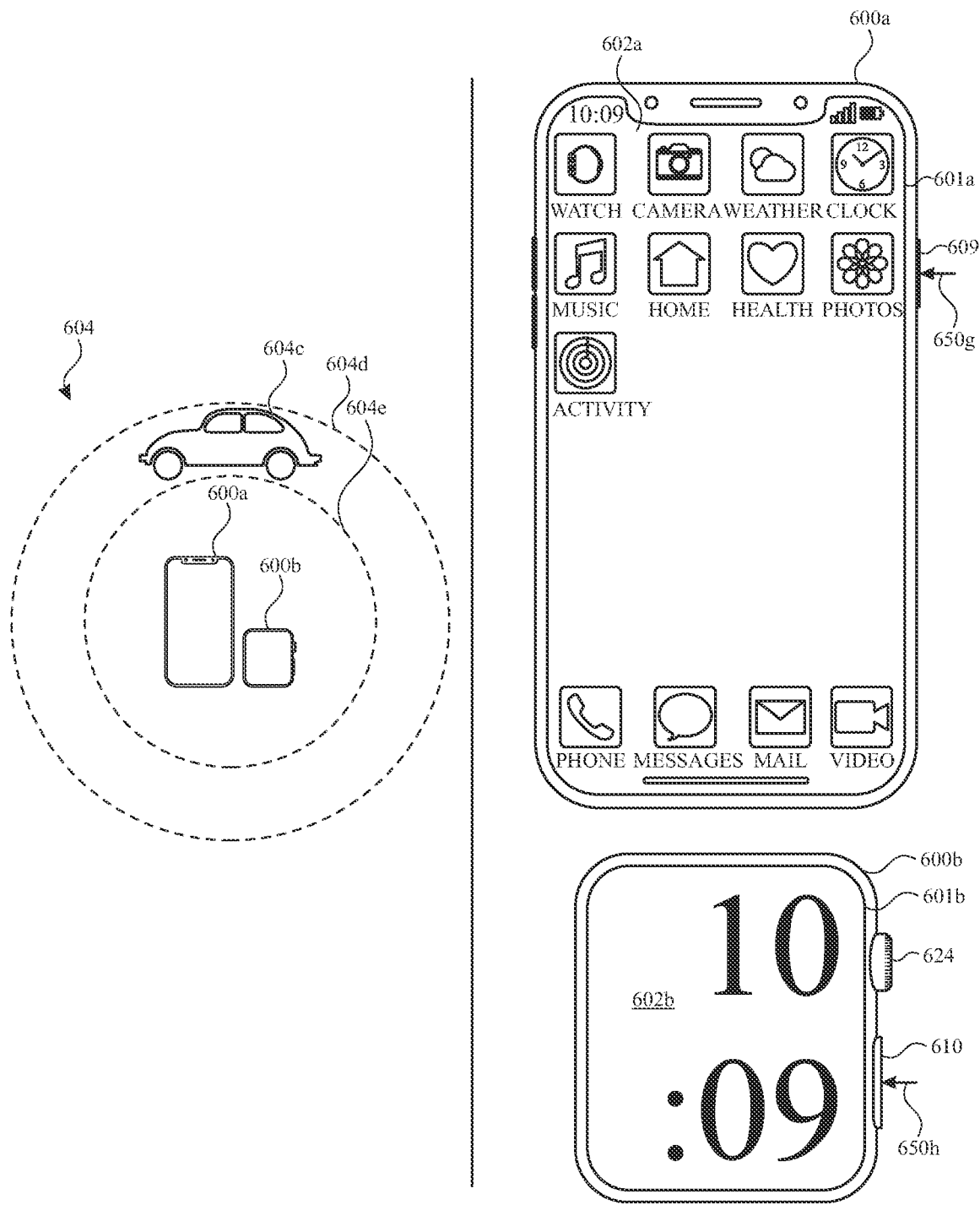

As illustrated in FIG. 6E, when vehicle 604c is positioned within first distance range 604d of first electronic device 600a and/or second electronic device 600b, first electronic device 600a and/or second electronic device 600b are in communication with vehicle 604c. As such, first electronic device 600a and/or second electronic device 600b can cause vehicle 604c to perform various functions in response to detecting user inputs when vehicle 604c is positioned within the first distance range 604d from first electronic device 600a and/or second electronic device 600b.

At FIG. 6E, arrangement 604 illustrates that first electronic device 600a and second electronic device 600b closer to vehicle 604c (e.g., a user of first electronic device 600a and second electronic device 600b has walked and/or moved toward vehicle 604c). As such, vehicle 604c is within first distance range 604d of first electronic device 600a and second electronic device 600b. However, first electronic device 600a and second electronic device 600b are still positioned farther away from vehicle 604c than second distance range 604e.

Similar to FIG. 6A, at FIG. 6E, first electronic device 600a displays, via display 601a, first user interface 602a, such as a home screen user interface. In addition, second electronic device 600b displays, via display 601b, first user interface 602b, such as a watch face user interface.

Figure 6F:
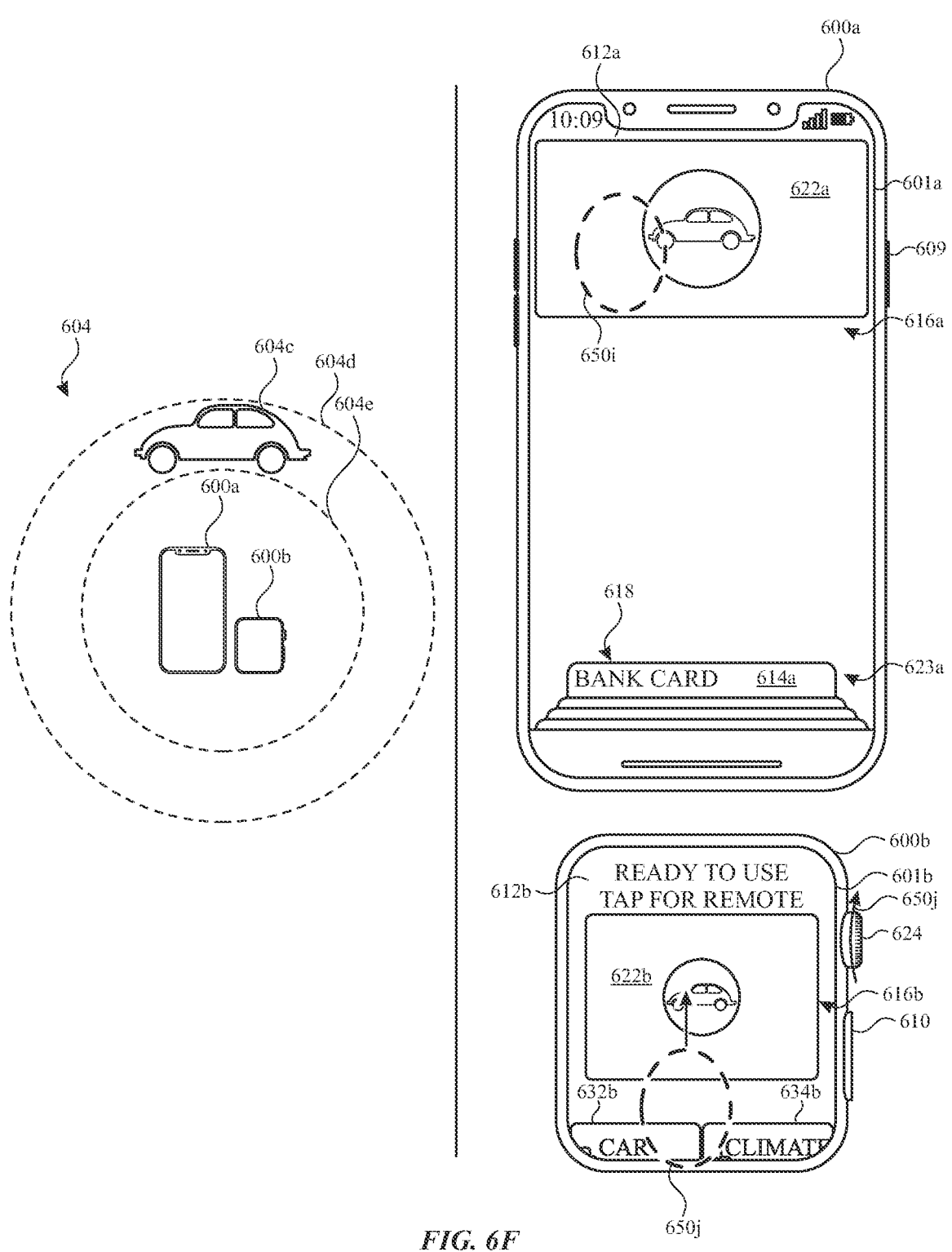

At FIG. 6E, first electronic device 600a detects user input 650g (e.g., same as user input 650a), such as a double press gesture on button 609 (e.g., a physical, depressible button incorporated into a housing of first electronic device 600a) of first electronic device 600a. In response to detecting user input 650g, first electronic device 600a displays first accounts user interface 612a, as shown at FIG. 6F. Second electronic device 600b detects user input 650h (e.g., same as user input 650b), such as a double press gesture on button 610 (e.g., a physical, depressible button incorporated into a housing of second electronic device 600b) of second electronic device 600b. Similarly, in response to detecting user input 650h, second electronic device displays first accounts user interface 612b, as shown at FIG. 6F.

At FIG. 6F, first electronic device 600a and second electronic device 600b are both within first distance range 604d from vehicle 604c. Accordingly, in response to detecting user input 650g, first electronic device 600a displays second user interface object 622a at first position 616a on first accounts user interface 612a (e.g., instead of displaying first user interface object 614a at first position 616a), where second user interface object 622a corresponds to the second secure credential that is the electronic key associated with vehicle 604c. When second user interface object 622a is in first position 616a on first accounts user interface 612a, the second secure credential is authorized and/or enabled for use (and the first secure credential is not authorized and/or enabled for use). As set forth below, first electronic device 600a is configured to cause vehicle 604c to perform various functions in response to user input at electronic device 600a and/or in response to the user moving first electronic device 600a closer to vehicle 604c (e.g., within second distance range 604e).

At FIG. 6F, first electronic device 600a displays first user interface object 614a at second position 623a of first accounts user interface 612a. Second position 623a of first accounts user interface 612a is part of and/or adjacent to stack 618. However, when in second position 623a of first accounts user interface 612a, first user interface object 614a is at least partially visible and/or identifiable from other user interface objects that are part of stack 618 (e.g., more of first user interface object 614 is shown as compared to other objects in stack 618). As such, second position 623a is a shortcut position that enables a user to quickly access the respective secure credential corresponding to the user interface object displayed at second position 623a. When first user interface object 614a is displayed at second position 623a, the first secure credential corresponding to first user interface object 614a is not activated and/or enabled for use. First electronic device 600a activates and/or enables the first secure credential for use in response to detecting user input corresponding to first user interface object 614a while displayed at second position 623a. In some embodiments, first electronic device 600a displays a user interface object corresponding to a default and/or a primary secure credential in second position 623a when second user interface object 622a is displayed at first position 616a. The default and/or primary secure credential can be user defined (e.g., selected via user input as the default and/or primary secure credential), an earliest secure credential for which first electronic device 600a has been authorized to use, a most frequent secure credential used by first electronic device 600a, and/or a most recent secure credential used by first electronic device 600a. In some embodiments, first electronic device 600a does not display a user interface object at second position 623a (e.g., when no default secure credential has been defined and/or selected and/or when the default secure credential is displayed at first position 616a).

As set forth above, at FIG. 6F, second electronic device 600b is positioned so that vehicle 604c is within first distance range 604d from second electronic device 600b. Accordingly, in response to detecting user input 650h, second electronic device 600b displays second user interface object 622b at first position 616b on first accounts user interface 612b (e.g., instead of displaying first user interface object 614b at first position 616b), where second user interface object 622b corresponds to the second secure credential that is the electronic key associated with vehicle 604c. In some embodiments, second electronic device 600b also displays first user interface object 614b at a second position (e.g., second position 623b illustrated at FIG. 6B) on first accounts user interface 612b in response to detecting user input 650h. At FIG. 6F, second electronic device 600b forgoes displaying first user interface object 614b and displays second user interface object 622b, as well as portions of first control user interface object 632b and second control user interface object 632c.

Figure 6G:
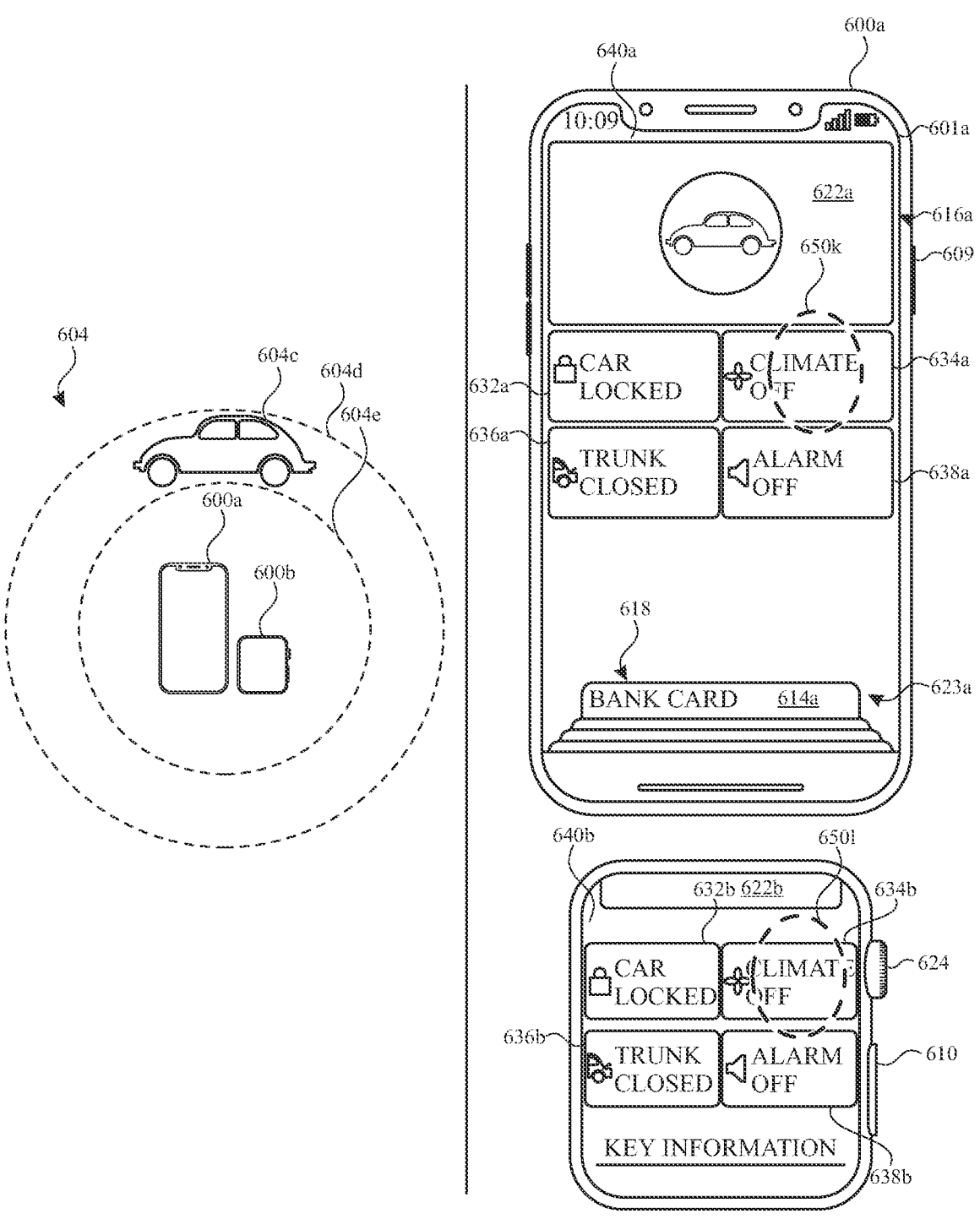

At FIG. 6F, first electronic device 600a detects user input 650i (e.g., a tap gesture) corresponding to selection of second user interface object 622a. In response to detecting user input 650i, first electronic device 600a displays third accounts user interface 640a, as shown at FIG. 6G. In addition, second electronic device 600b detects user input 650j (e.g., a swipe gesture and/or a rotational input) while second user interface object 622b is displayed at first position 616b on first accounts user interface 612b. In response to detecting user input 650j, second electronic device 600b displays third accounts user interface 640b, as shown at FIG. 6G.

At FIG. 6G, first electronic device 600*a* displays third accounts user interface 640*a*, which includes first control user interface object 632*a*, second control user interface object 634*a*, third control user interface object 636*a*, and fourth control user interface object 638*a*. Although third accounts user interface 640*a* includes four control user interface objects, in some implementations fewer or more control user interface objects can be displayed. In some implementations, there may be more control user interface objects than can be displayed on a user interface at one time. In those implementations, a user may navigate (e.g., swipe or scroll) to determine the control with which they want to interact. In addition, arrangement 604 illustrates that first electronic device 600*a* remains at a position where vehicle 604*c* is within first distance range 604*d* from first electronic device 600*a*. Accordingly, control user interface objects (e.g., first control user interface object 632*a*, second control user interface object 634*a*, third control user interface object 636*a*, and fourth control user interface object 638*a*) are each displayed with an active appearance, such as at a full brightness level and/or with a non-gray color scheme. As such, first electronic device 600*a* displays control user interface objects (e.g., 632*a*, 634*a*, 636*a*, and 638*a*) with an appearance that indicates that the control user interface objects (e.g., 632*a*, 634*a*, 636*a*, and 638*a*) are active and, when selected via user input, cause the vehicle to perform a corresponding function. Further, first electronic device 600*a* displays control user interface objects (e.g., 632*a*, 634*a*, 636*a*, and 638*a*) with visual status indicators (e.g., "Locked," "Off," and/or "Closed") indicating the status of each respective function of control user interface objects (e.g., 632*a*, 634*a*, 636*a*, and 638*a*). Displaying the visual status indicators further indicates to a user of first electronic device 600*a* that control user interface objects (e.g., 632*a*, 634*a*, 636*a*, and 638*a*), when selected, cause vehicle 604*c* to perform the respective function.

In some embodiments, first electronic device 600*a* displays third accounts user interface 640*a* in response to detecting user input 650*g*. In other words, first electronic device 600*a* displays second user interface object 622*a*, as well as control user interface objects 632*a*, 634*a*, 636*a*, and 638*a*, without requiring the user to select second user interface object 622*a* while displaying first accounts user interface 612*a*.

At FIG. 6G, first electronic device 600*a* maintains display of first user interface object 614*a* at second position 623*a* on third accounts user interface 640*a*. Accordingly, first user interface object 614*a* can be quickly selected by a user to activate and/or enable the first secure credential for use. In some embodiments, first user interface object 614*a* is displayed at second position 623*a* on third accounts user interface 640*a* in accordance with first electronic device 600*a* being within a predefined distance of vehicle 604*c* (and, optionally, in response to user input 650*g*). For instance, first electronic device 600*a* can display first user interface object 614*a* at second position 623*a* when first electronic device 600*a* detects that it is positioned at a distance from the vehicle that indicates that first electronic device 600*a* is within an interior compartment of vehicle 604*c* (e.g., a distance between first electronic device 600*a* and vehicle 604*c* that is within second distance range 604*e* and/or a distance between first electronic device 600*a* and vehicle 604*c* that is shorter than second distance range 604*e*). As such, first user interface object 614*a* is displayed at second position 623*a* to enable a user to quickly access and/or use the first secure credential associated with first user interface object 614*a* while the user is within vehicle

604*c* (e.g., the user is at an establishment that includes a drive-through for completing a transaction).

At FIG. 6G, second electronic device 600*b* also displays first control user interface object 632*b*, second control user interface object 634*b*, third control user interface object 636*b*, and fourth control user interface object 638*b* with the active appearance, such as at a full brightness level and/or with a non-gray color scheme. Although third accounts user interface 640*b* includes four control user interface objects, in some implementations fewer or more control user interface objects can be displayed. In some implementations, there may be more control user interface objects than can be displayed on a user interface at one time. In those implementations, a user may navigate (e.g., swipe or scroll) to determine the control with which they want to interact. At FIG. 6G, second electronic device 600*b* displays control user interface objects (e.g., 632*b*, 634*b*, 636*b*, and 638*b*) with an appearance that indicates that the control user interface objects (e.g., 632*b*, 634*b*, 636*b*, and 638*b*) are active and, when selected via user input, cause the vehicle to perform a corresponding function. Further, second electronic device 600*b* displays control user interface objects (e.g., 632*b*, 634*b*, 636*b*, and 638*b*) with visual status indicators (e.g., "Locked," "Off," and/or "Closed") indicating the status of each respective function of control user interface objects (e.g., 632*b*, 634*b*, 636*b*, and 638*b*). Displaying the visual status indicators further indicates to a user of second electronic device 600*b* that control user interface objects (e.g., 632*b*, 634*b*, 636*b*, and 638*b*) can be selected to cause vehicle 604*c* to perform the respective function.

Figure 6H:
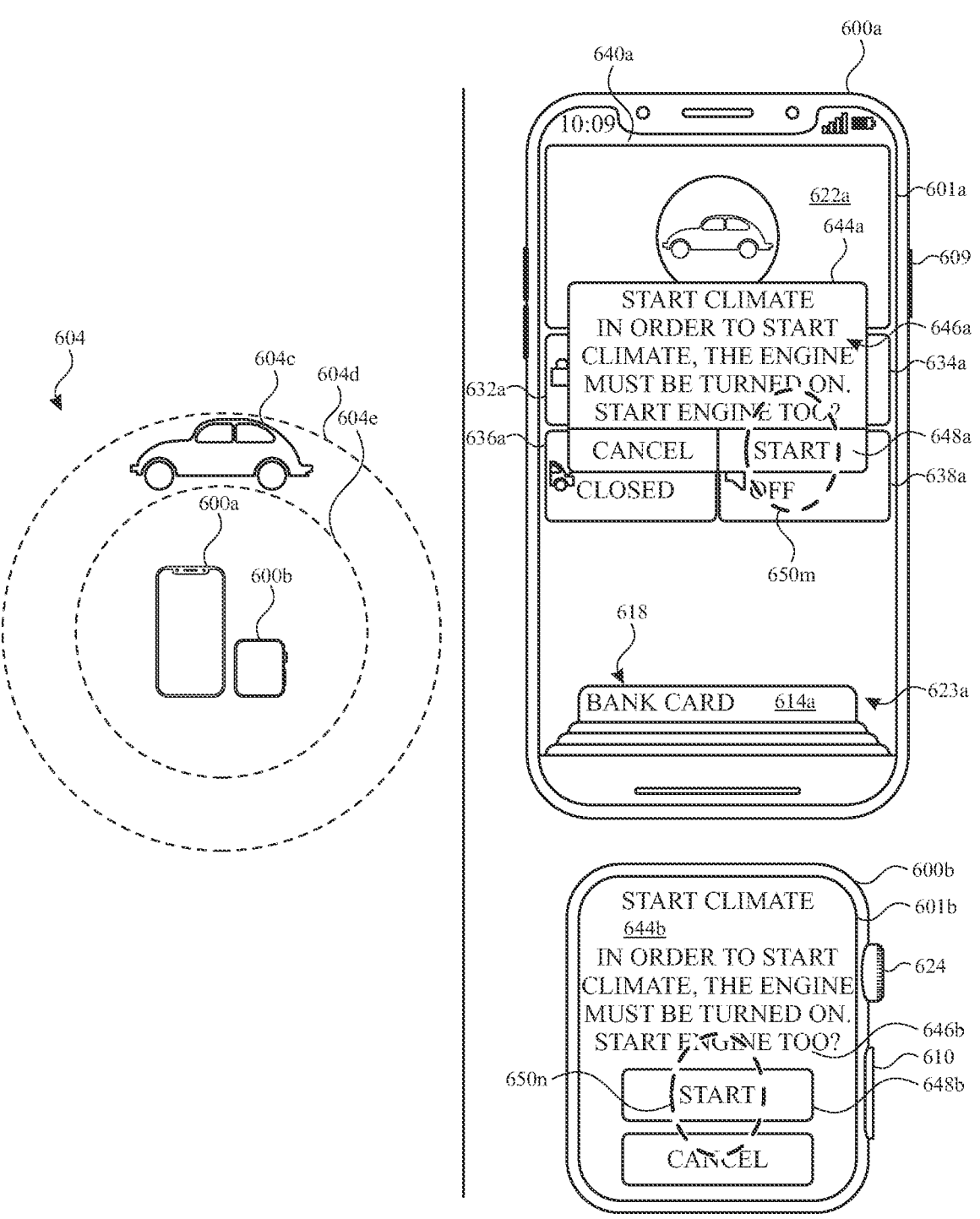
Figure 6I:
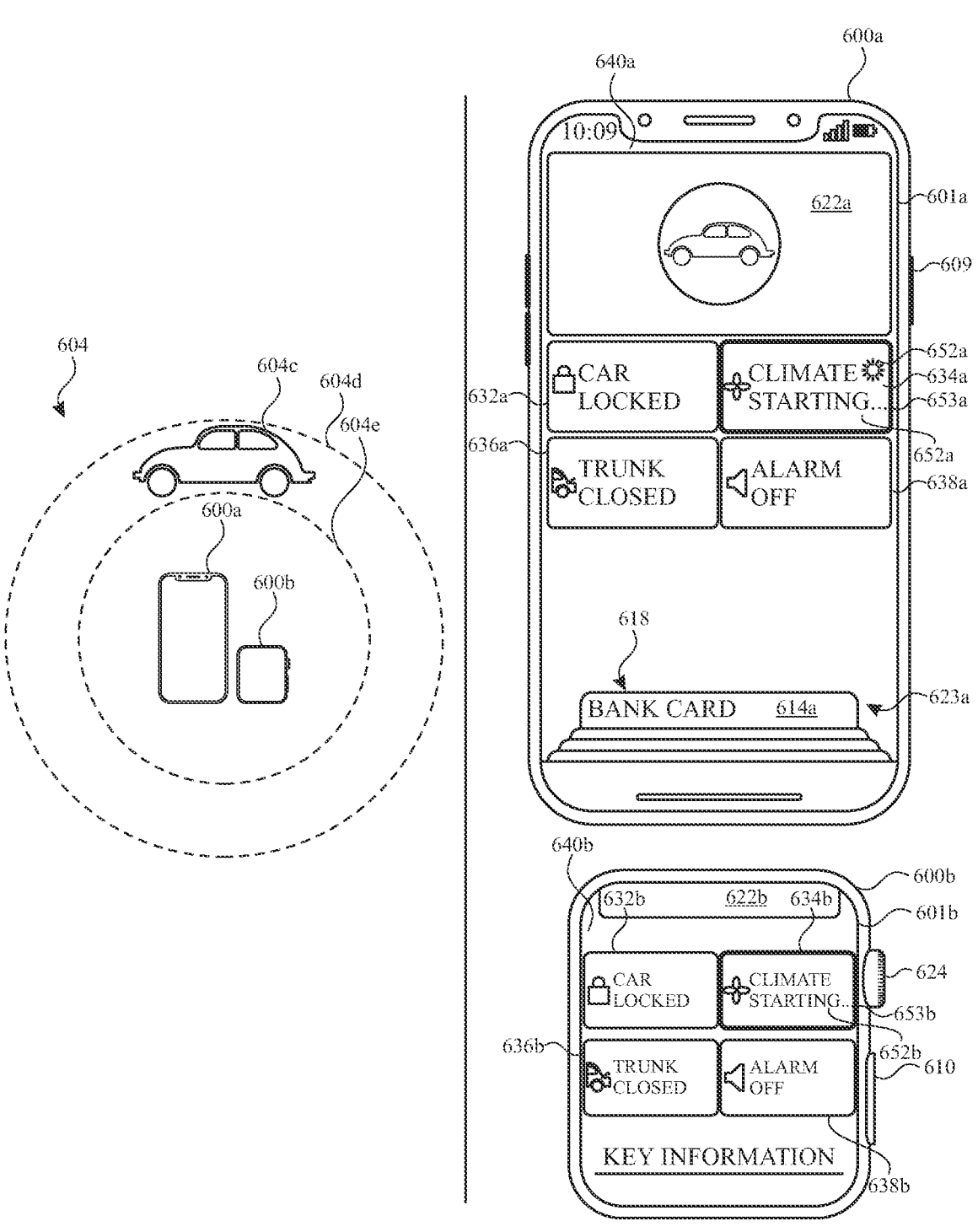
Figure 6J:
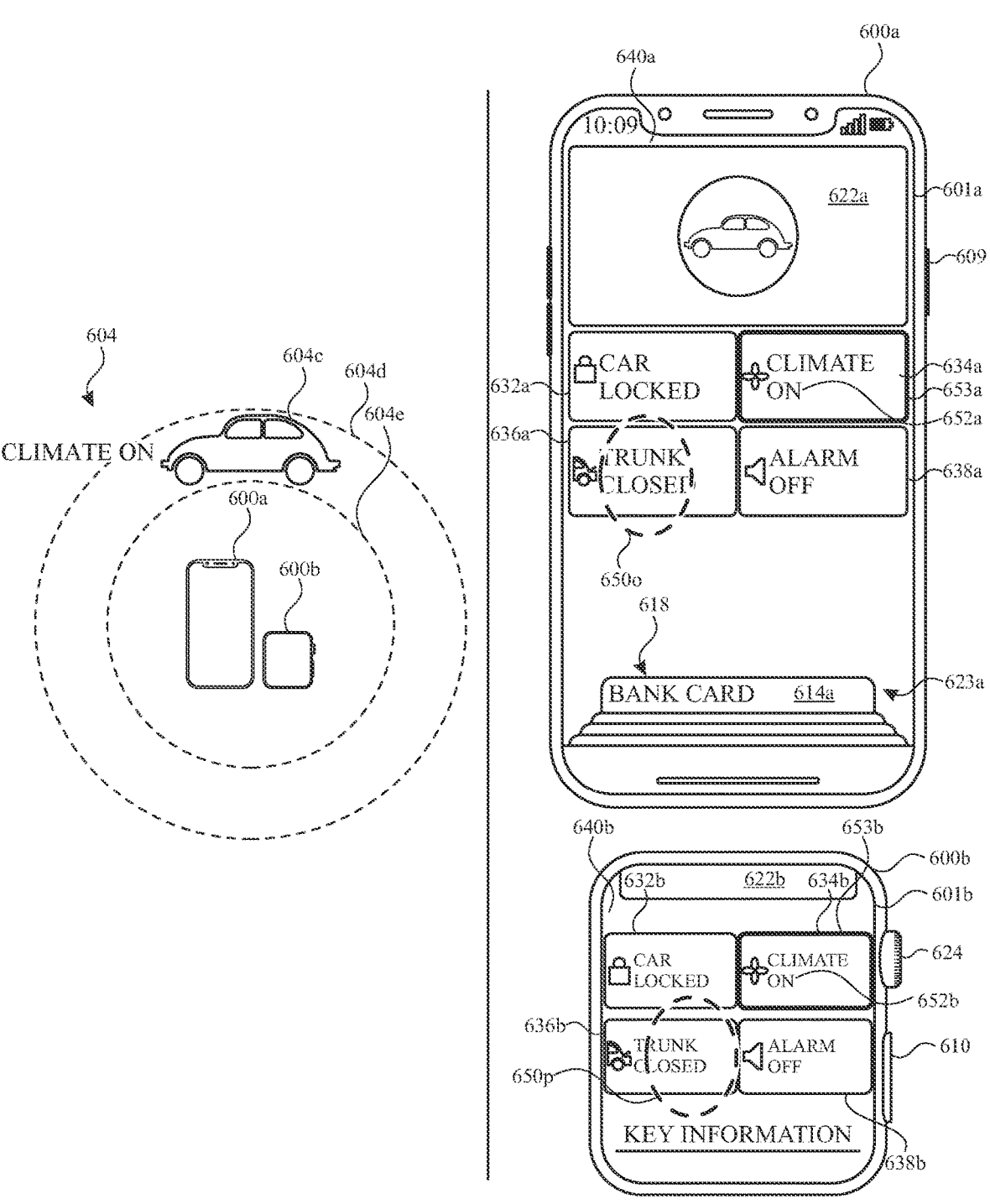

At FIG. 6G, first electronic device 600*a* detects user input 650*k* (e.g., a tap gesture) corresponding to selection of second control user interface object 634*b*. Similarly, second electronic device 600*b* detects user input 650*l* (e.g., a tap gesture) corresponding to selection of second control user interface object 634*b*. In response to detecting user input 650*k*, first electronic device 600*a* initiates a process to cause vehicle 604*c* to perform the climate function (e.g., transmitting instructions to perform the climate function), as shown at FIGS. 6H-6J. Similarly, in response to detecting user input 650*l*, second electronic device 600*b* initiates a process to cause vehicle 604*c* to perform the climate function (e.g., transmitting instructions to perform the climate function), as shown at FIGS. 6H-6J.

At FIG. 6H, first electronic device 600*a* displays notification 644*a* overlaid on third accounts user interface 640*a* in response to detecting user input 650*k*. Notification 644*a* includes indicator 646*a* indicating that initiating the process to cause vehicle 604*c* to perform the climate function also causes vehicle 604*c* to turn on an engine and/or motor of vehicle 604*c*. In some embodiments, vehicle 604*c* is a gas-powered vehicle (e.g., a vehicle that includes an engine and/or motor that uses gas as a fuel) with a climate system that is powered by the engine and/or motor of the gas-powered vehicle. In such embodiments, the engine and/or motor of the vehicle is turned on to initiate the climate function (e.g., the engine and/or motor is turned on to power the climate system of the vehicle). Thus, first electronic device 600*a* displays notification 644*a* (e.g., in accordance with a determination that the vehicle is a gas-powered vehicle) to inform a user of first electronic device 600*a* that the engine and/or motor of vehicle 604*c* will be turned on to activate the climate function. Notification 644*a* acts as confirmation that the user of first electronic device 600*a* recognizes that the engine and/or motor of vehicle 604*c* will be activated to initiate the climate function of vehicle 604*c*. In some instances, vehicle 604*c* is in a location, such as an enclosed garage, where turning on the engine and/or motor of vehicle 604*c* is not suitable. Thus, notification 644*a* enables the user of first electronic device 600*a* to confirm that the engine and/or motor of vehicle 604*c* should be turned on before first electronic device 600*a* causes vehicle 604*c* to activate the climate function. In some embodiments, such as when vehicle 604*c* is not a gas-powered vehicle (e.g., vehicle 604*c* is an electric vehicle and/or a hybrid electric vehicle), first electronic device 600*a* forgoes displaying notification 644*a* and causes vehicle 604*c* to initiate the climate function (e.g., without requesting and/or detecting a confirmation user input).

Similarly, at FIG. 6H, second electronic device 600*b* displays notification 644*b* (e.g., a full screen notification on display 601*b*) in response to detecting user input 650*l* (and, optionally, in accordance with a determination that vehicle 604*c* is a gas-powered vehicle). Notification 644*b* also includes indicator 646*b* indicating that initiating the process to cause vehicle 640*c* to perform the climate function causes the engine and/or motor of vehicle 604*c* to be turned on. As such, both first electronic device 600*a* and second electronic device 600*b* display notification 644*a* and 644*b*, respectively, in order to confirm that vehicle 604*c* is in a suitable location for turning on the engine and/or motor of vehicle 604*c*. In some embodiments, such as when vehicle 604*c* is not a gas-powered vehicle (e.g., vehicle 604*c* is an electric vehicle and/or a hybrid electric vehicle), second electronic device 600*b* forgoes displaying notification 644*b* and causes vehicle 604*c* to initiate the climate function (e.g., without requesting and/or detecting confirmation user input).

At FIG. 6H, first electronic device 600*a* displays notification 644*a* without causing vehicle 604*c* to initiate the climate function. Similarly, second electronic device 600*b* displays notification 644*b* without causing vehicle 604*c* to initiate the climate function. As such, first electronic device 600*a* and second electronic device 600*b* do not cause vehicle 604*c* to initiate the climate function (and turn on the engine and/or motor of vehicle 604*c*) until receiving user input confirming that the engine and/or motor of vehicle 604*c* should be turned on (e.g., confirmation that vehicle 604*c* is in a suitable location to turn on the engine and/or motor). Thus, at FIG. 6H, first electronic device 600*a* detects user input 650*m* (e.g., a tap gesture) corresponding to selection of confirmation user interface object 648*a* of notification 644*a*. Second electronic device 600*b* detects user input 650*n* (e.g., a tap gesture) corresponding to selection of confirmation user interface object 648*b* of notification 644*b*. In response to detecting user input 650*m*, first electronic device 600*a* causes vehicle 604*c* (e.g., sends data and/or one or more transmissions to a computer system of vehicle 604*c*) to initiate the climate function, as shown at FIG. 6I. In response to detecting user input 650*n*, second electronic device 600*b* causes vehicle 604*c* (e.g., sends data and/or one or more transmissions to a computer system of vehicle 604*c*) to initiate the climate function, as shown at FIG. 6I.

At FIG. 6I, first electronic device 600*a* displays third accounts user interface 640*a* and updates second control user interface object 634*a* (e.g., updates an appearance and/or a status indicator of second control user interface object 634*a*) to indicate that the climate function has been initiated. For instance, second control user interface object 634*a* includes status indicator 652*a* (e.g., a textual indicator "Starting . . . " and/or a visual indicator that includes a ring and/or circle) indicating that the climate function of vehicle 604*c* has been initiated and/or is starting. As such, first electronic device 600*a* is in communication with vehicle 604*c* and causing (e.g., instructing) vehicle 604*c* to initiate the climate function. Further, first electronic device 600*a* displays second control user interface object 634*a* with emphasis 653*a* (e.g., a bolded and/or thick outline), which indicates that the climate function is being initiated. In some embodiments, emphasis 653*a* indicates that an engine and/or motor of vehicle 604*c* is turned on and/or is being turned on.

In addition, second electronic device 600*b* displays third accounts user interface 640*b* and updates second control user interface object 634*b* (e.g., updates an appearance and/or a status indicator of second control user interface object 634*b*) to indicate that the climate function has been initiated. For instance, second control user interface object 634*b* includes status indicator 652*b* (e.g., a textual indicator "Starting . . . ") indicating that the climate function of vehicle 604*c* has been initiated and/or is starting. As such, second electronic device 600*b* is in communication with (e.g., direct communication with and/or indirect communication with via first electronic device 600*a*) vehicle 604*c* and causing (e.g., instructing) vehicle 604*c* to initiate the climate function. Further, second electronic device 600*b* displays second control user interface object 634*b* with emphasis 653*b* (e.g., a bolded and/or thick outline), which indicates that the climate function is being initiated. In some embodiments, emphasis 653*b* indicates that an engine and/or motor of vehicle 604*c* is turned on and/or being turned on.

At FIG. 6J, first electronic device 600*a* detects (e.g., receives data and/or a communication from vehicle 604*c*) that vehicle 604*c* has initiated the climate function. Accordingly, first electronic device 600*a* updates status indicator 652*a* (e.g., "On") of second control user interface object 634*a* to indicate that vehicle 604*c* has successfully initiated the climate function. Status indicator 652*a* is updated in real-time (e.g., based on communications between vehicle 604*c* and first electronic device 600*a*) to provide an indication of the status of the climate function, which corresponds to second control user interface object 634*a*.

Further, at FIG. 6J, second electronic device 600*b* detects (e.g., receives data and/or a communication from vehicle 604*c*) that vehicle 604*c* has initiated the climate function. Accordingly, second electronic device 600*b* updates status indicator 652*b* (e.g., "On") of second control user interface object 634*b* to indicate that vehicle 604*c* has successfully initiated the climate function. Status indicator 652*b* is updated in real-time (e.g., based on communications between vehicle 604*c* and second electronic device 600*b* and/or based on communications between first electronic device 600*a* and second electronic device 600*b*) to provide an indication of the status of the climate function, which corresponds to second control user interface object 634*b*.

While FIGS. 6H-6J illustrate first electronic device 600*a* and second electronic device 600*b* causing vehicle 604*c* to initiate a climate function, as well as displaying notification 644*a* and notification 644*b*, first electronic device 600*a* and second electronic device 600*b* optionally also include a control user interface object corresponding to an engine function. When first electronic device 600*a* and second electronic device 600*b* include the control user interface object corresponding to the engine function, first electronic device 600*a* and second electronic device 600*b* cause vehicle 604*c* to turn on the engine and/or motor of vehicle 604*c* (e.g., with or without initiating the climate system of the vehicle) when the respective control user interface object is activated. In addition, first electronic device 600*a* and second electronic device 600*b* optionally display notifications (e.g., notifications that are the same and/or similar to notifications 644*a* and 644*b*, respectively) to confirm that the engine and/or motor of vehicle 604*c* should be turned on before first electronic device 600a and/or second electronic device 600b causes vehicle 604c to turn on the engine and/or motor of vehicle 604c (e.g., in accordance with a determination that vehicle 604c is a gas-powered vehicle).

Figure 6K:
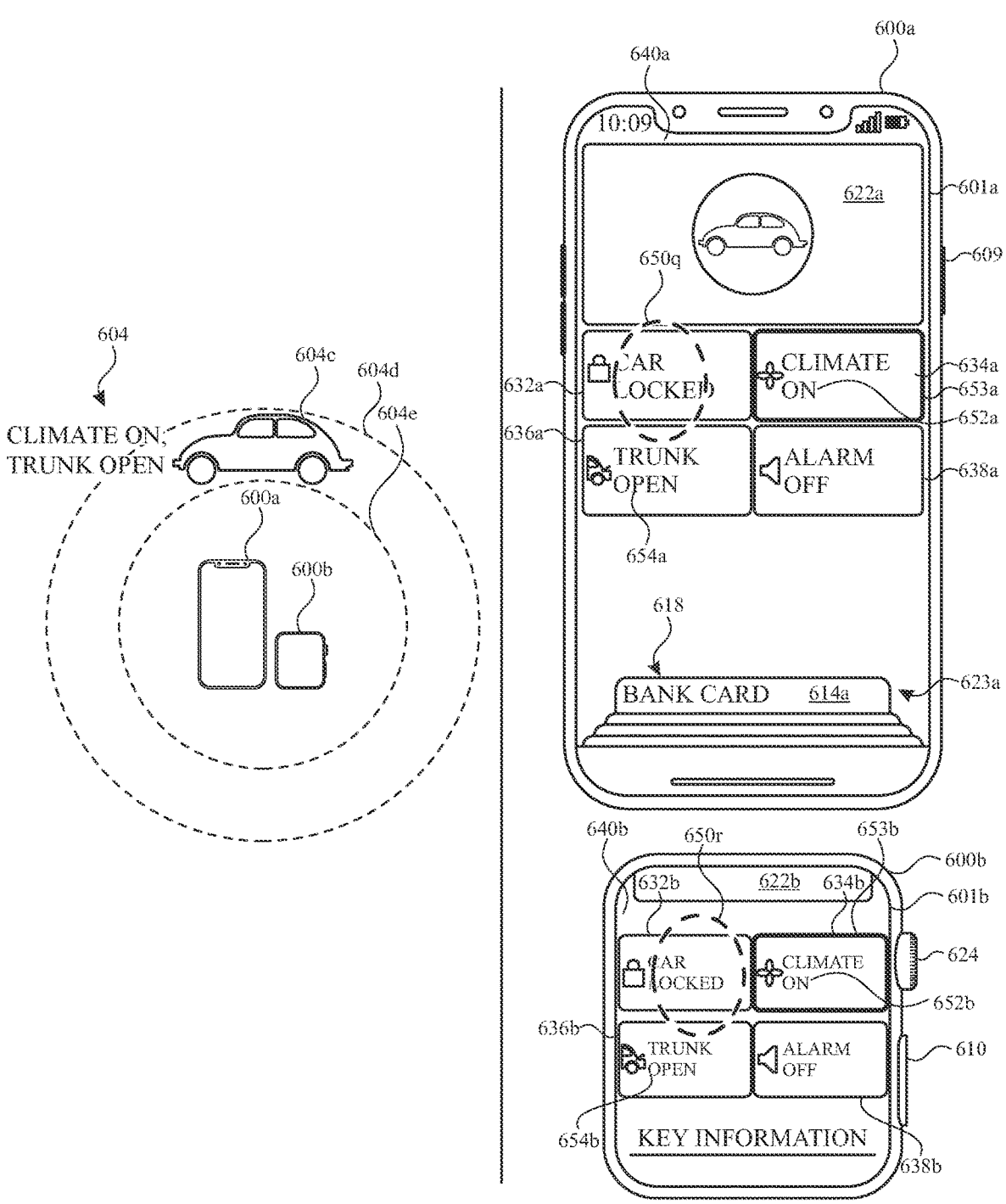

First electronic device 600a and second electronic device 600b update the statuses for each of the respective functions corresponding to the control user interface objects displayed on third accounts user interface 640a and third accounts user interface 640b, respectively, in response to detecting that a status of a respective function has changed. At FIG. 6J, first electronic device 600a detects user input 650o (e.g., a tap gesture) corresponding to selection of third control user interface object 636a and second electronic device 600b detects user input 650p (e.g., a tap gesture) corresponding to selection of third control user interface object 636b. In response to detecting user input 650o, first electronic device 600a causes vehicle 604c to open a trunk of vehicle 604c (e.g., first electronic device 600a sends data and/or one or more transmissions to a computer system that causes one or more actuators to unlatch and/or open a trunk of vehicle 604c), as shown at FIG. 6K. Similarly, in response to detecting user input 650p, second electronic device 600b causes vehicle 604c to open the trunk of vehicle 604c (e.g., second electronic device 600b (e.g., directly and/or indirectly via first electronic device 600a) sends data and/or one or more transmissions to a computer system that causes one or more actuators to unlatch and/or open a trunk of vehicle 604c), as shown at FIG. 6K.

At FIG. 6K, first electronic device 600a detects (e.g., receives data and/or a communication from vehicle 604c) that vehicle 604c has initiated the trunk function. Accordingly, first electronic device 600a updates status indicator 654a of third control user interface object 636a to indicate that vehicle 604c has successfully opened the trunk. Status indicator 654a is updated in real-time (e.g., based on communications between vehicle 604c and first electronic device 600a) to provide an indication of the status of the trunk function, which corresponds to third control user interface object 636a. As such, when first electronic device 600a is within first distance range 604d of vehicle 604c, first electronic device 600a provides status information associated with various components, devices, and/or functions of vehicle 604c. A user of first electronic device 600a can thus adjust a state of a respective component, device, and/or function via first electronic device 600a, and in some embodiments, without interacting with and/or otherwise being inside of vehicle 604c.

Further, at FIG. 6K, second electronic device 600b detects (e.g., receives data and/or a communication from vehicle 604c) that vehicle 604c has initiated the trunk function. Accordingly, second electronic device 600b updates status indicator 654b of third control user interface object 636b to indicate that vehicle 604c has successfully initiated the trunk function. Status indicator 654b is updated in real-time (e.g., based on communications between vehicle 604c and second electronic device 600b and/or based on communications between first electronic device 600a and second electronic device 600b) to provide an indication of the status of the trunk function, which corresponds to third control user interface object 636b. As such, when second electronic device 600b is within first distance range 604d of vehicle 604c, second electronic device 600b provides status information associated with various components, devices, and/or functions of vehicle 604c. A user of second electronic device 600b can thus adjust a state of a respective component, device, and/or function via second electronic device 600b, and in some embodiments, without interacting with and/or otherwise being inside of vehicle 604c.

Figure 6L:
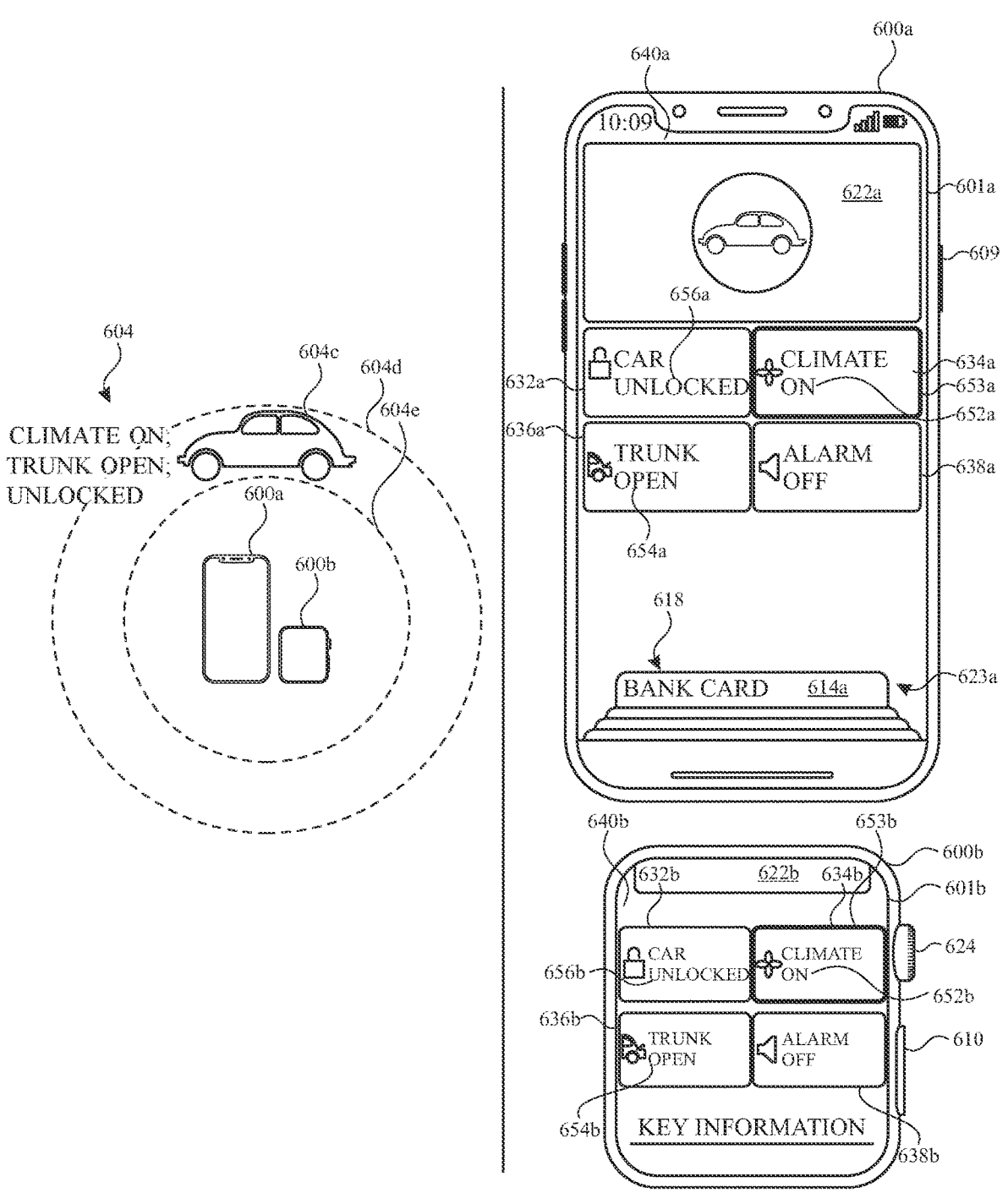

At FIG. 6K, first electronic device 600a detects user input 650q (e.g., a tap gesture) corresponding to selection of first control user interface object 632a and second electronic device 600b detects user input 650r (e.g., a tap gesture) corresponding to selection of first control user interface object 632b. In response to detecting user input 650q, first electronic device 600a causes vehicle 604c to unlock one or more doors of vehicle 604c (e.g., first electronic device 600a sends data and/or one or more transmissions to a computer system that causes one or more actuators to unlatch, unlock, and/or open one or more doors of vehicle 604c), as shown at FIG. 6L. Similarly, in response to detecting user input 650r, second electronic device 600b causes vehicle 604c to unlock the one or more doors of vehicle 604c (e.g., second electronic device 600b (e.g., directly and/or indirectly via first electronic device 600a) sends data and/or one or more transmissions to a computer system that causes one or more actuators to unlatch, unlock, and/or open one or more doors of vehicle 604c), as shown at FIG. 6L.

At FIG. 6L, first electronic device 600a updates indicator 656a of first control user interface object 632a to indicate that vehicle 604c has been unlocked. In addition, second electronic device 600b updates indicator 656b of first control user interface object 632b to indicate that vehicle 604c has been unlocked. Accordingly, when first electronic device 600a and/or second electronic device 600b are within first distance range 604d of vehicle 604c, first electronic device 600a and second electronic device 600b cause vehicle 604c to lock and/or unlock one or more doors of vehicle 604c in response to user input (e.g., user input 650q and/or user input 650r). In some embodiments, using one device (600a, 600b) to change a state of vehicle 604c (e.g., lock/unlock) causes the status of that function to change on the other device (600b, 600a). As set forth below, first electronic device 600a and/or second electronic device 600b can also be utilized to unlock vehicle 604c automatically (e.g., without user input directed to display 601a, display 601b, and/or rotatable input mechanism 624) when first electronic device 600a and/or second electronic device 600b are positioned within second distance range 604e (e.g., a distance range that includes distances that are shorter than first distance range 604d) from vehicle 604c.

Figure 6M:
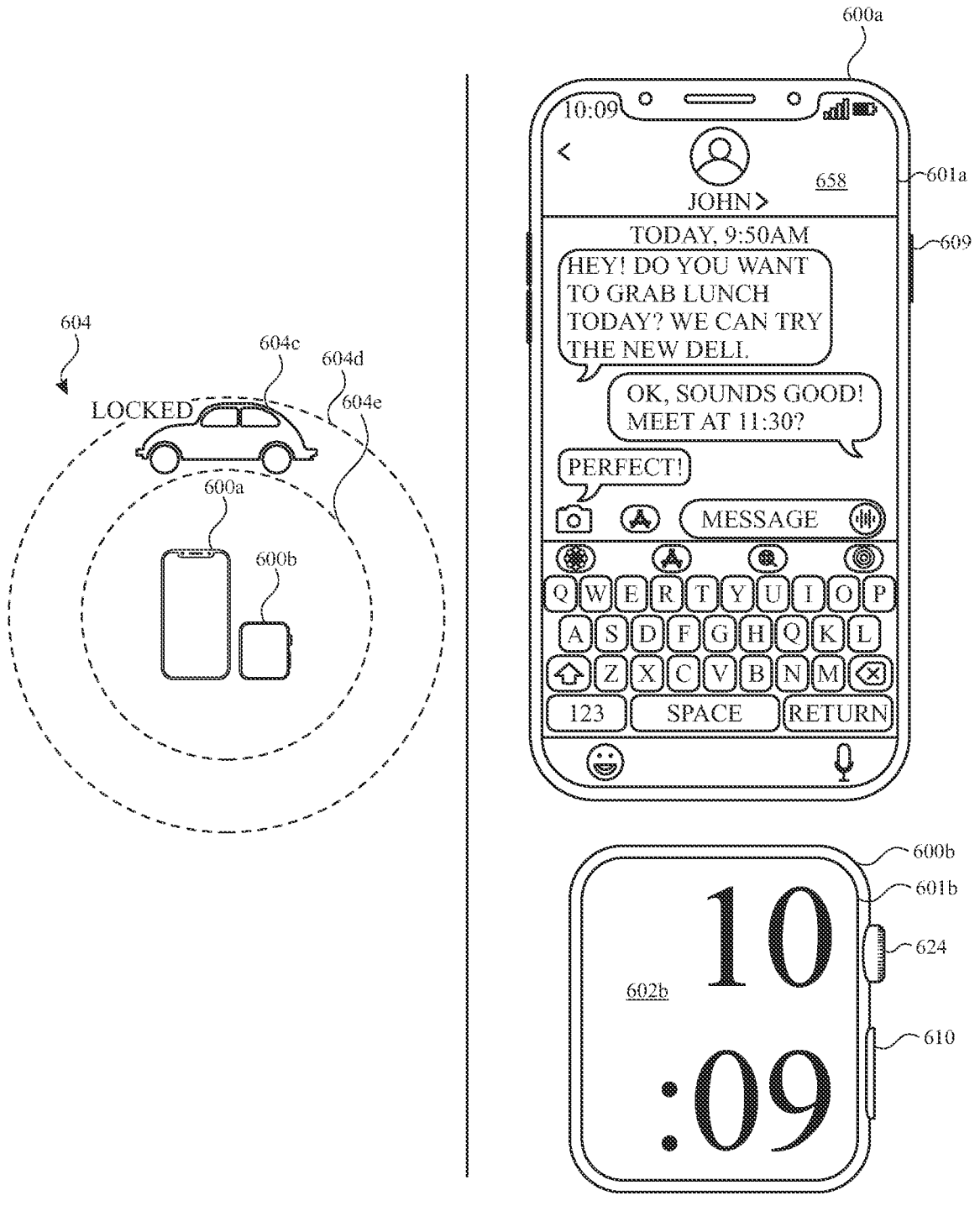

At FIG. 6M, arrangement 604 illustrates that first electronic device 600a and second electronic device 600b are within first distance range 604d of vehicle 604c. Accordingly, first electronic device 600a and second electronic device 600a are within range of vehicle 604c to communicate with vehicle 604c (e.g., cause vehicle 604c to perform one or more functions in response to user input), but first electronic device 600a and second electronic device 600b are not within sufficient range of vehicle 604c to cause vehicle 604c to perform a function without user input (e.g., cause vehicle 604c to perform a function automatically based on the distance between first electronic device 600a and/or second electronic device 600b and vehicle 604c).

At FIG. 6M, first electronic device 600a is displaying messaging user interface 658 corresponding to a messaging application of first electronic device 600a. In addition, second electronic device 600b is displaying first user interface 602b, such as a watch face user interface. While displaying messaging user interface 658, a user of first electronic device 600a moves first electronic device 600a closer to vehicle 604c (e.g., the user walks toward vehicle 604c). While displaying first user interface 602b, a user of second electronic device 600b (e.g., the same user as the user of first electronic device 600*a*) moves second electronic device 600*b* closer to vehicle 604*c* (e.g., the user walks toward vehicle 604*c*).

Figure 6N:
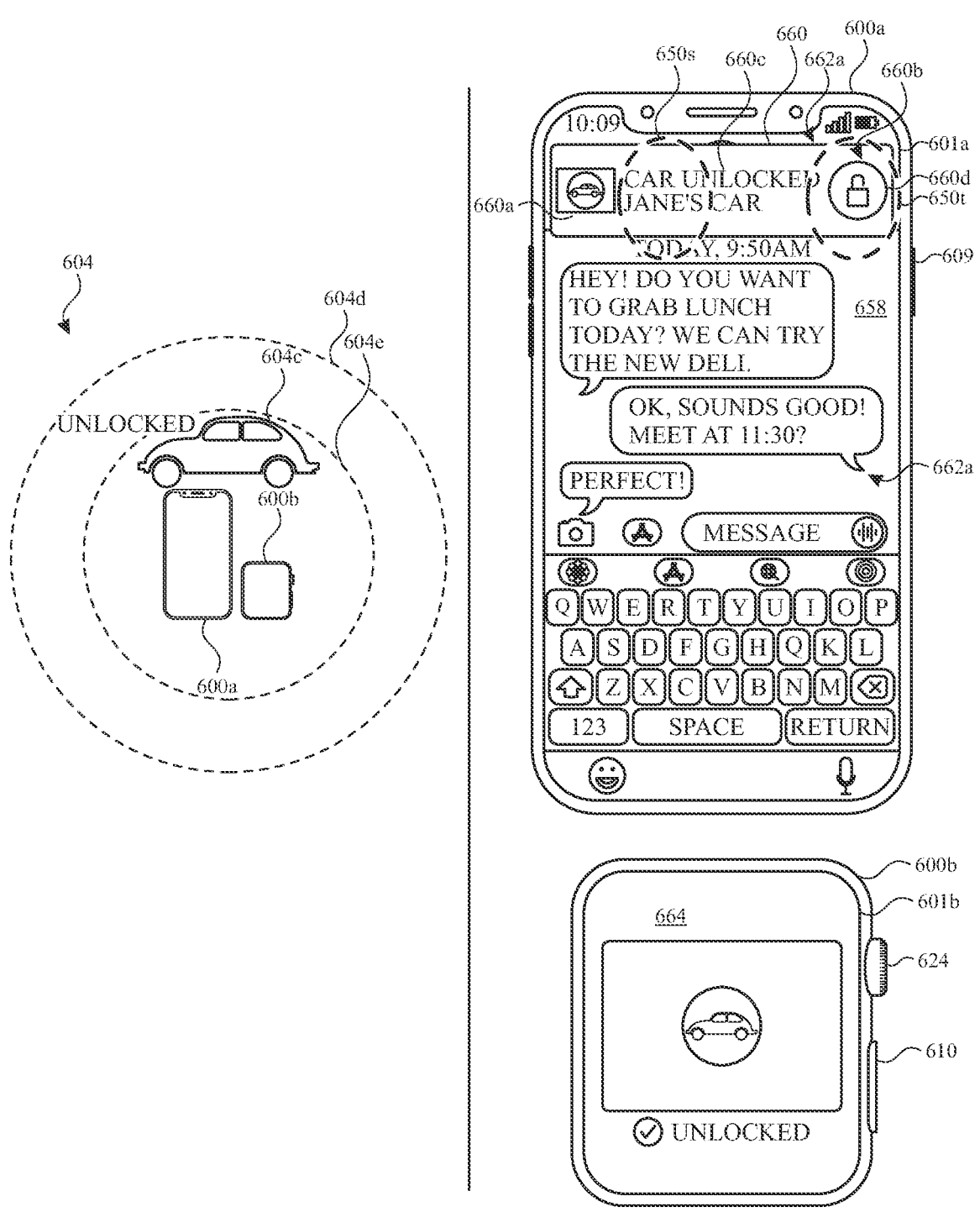
Figure 60:
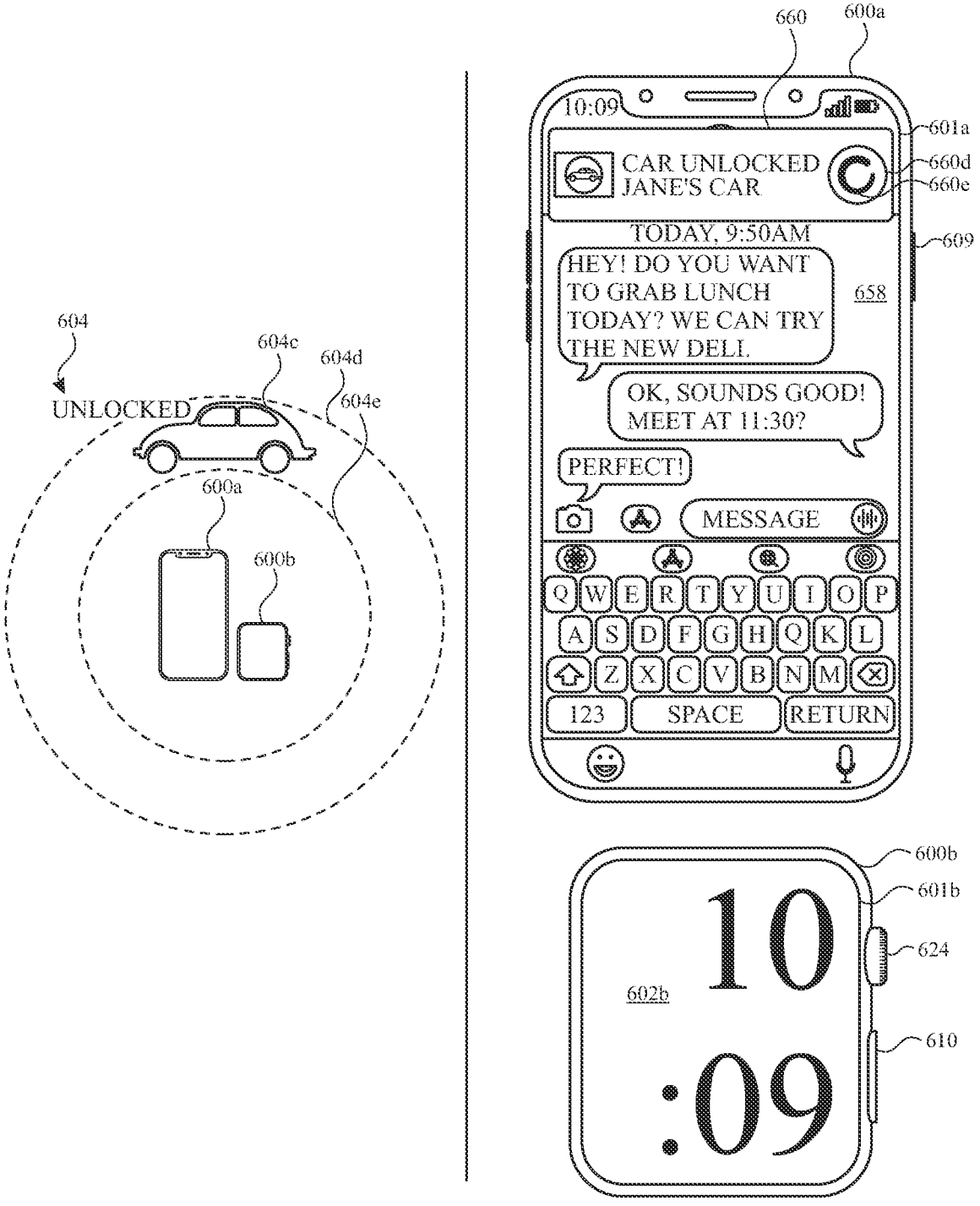
Figure 6P:
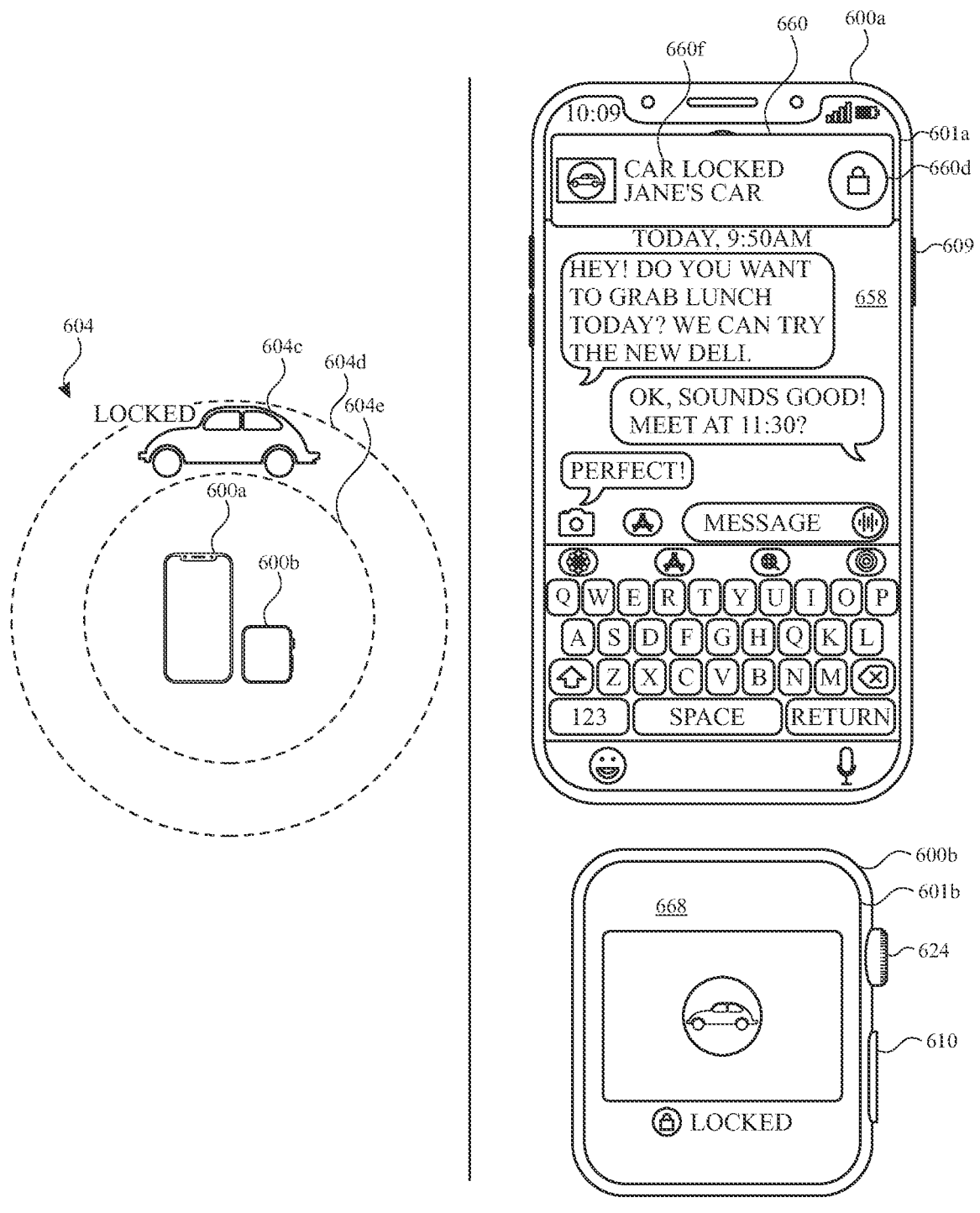

At FIG. 6N, arrangement 604 illustrates that first electronic device 600*a* and second electronic device 600*b* are within second distance range 604*e* of vehicle 604*c*. As noted above, second distance range 604*e* includes distances that are closer to vehicle 604*c* than first distance range 604*d*. As such, first electronic device 600*a* and second electronic device 600*b* are also within first distance range 604*d* of vehicle 604*c* (e.g., second distance range 604*e* overlaps with a portion of first distance range 604*d*).

At FIG. 6N, first electronic device 600*a* and second electronic device 600*b* (and, optionally, vehicle 604*c*) have an automatic unlock setting enabled. Thus, in response to detecting that first electronic device 600*a* and/or second electronic device 600*b* are within the second distance range of vehicle 604*c*, first electronic device 600*a* and/or second electronic device 600*b* (respectively) initiate a process to cause vehicle 604*c* to unlock (e.g., one or more doors of vehicle 604*c* are unlocked). In some embodiments, vehicle 604*c* detects that first electronic device 600*a* and/or second electronic device 600*b* are within second distance range 604*e* and initiates the process to unlock one or more doors of vehicle 604*c*.

While FIGS. 6N-6P relate to embodiments of first electronic device 600*a* and second electronic device 600*b* causing vehicle 604*c* to unlock in response to a determination that first electronic device 600*a* and/or second electronic device 600*b* are within second distance range 604*e*, in some embodiments, first electronic device 600*a* and/or second electronic device 600*b* can display visual indications (e.g., notifications) in response to vehicle 604*c* performing a function and/or in response to causing vehicle 604*c* to perform a function (e.g., independent of the distance/location of first electronic device 600*a* and/or second electronic device 600*b*). For instance, in some embodiments, first electronic device 600*a* and/or second electronic device 600*b* receive data (e.g., from vehicle 604*c* and/or from another external device, such as a server) indicating that vehicle 604*c* has transitioned from a first state to a second state (e.g., one or more locks of vehicle 604*c* have transitioned from locked to unlocked or vice versa, an alarm of vehicle 604*c* has transitioned from off (e.g., not sounding) to on (e.g., sounding/indicating an intrusion) or vice versa, a climate system of vehicle 604*c* has transitioned from off to on or vice versa, and/or an engine of vehicle 604*c* has transitioned from off to on or vice versa). In some embodiments, vehicle 604*c* transitions from the first state to the second state when first electronic device 600*a* and/or second electronic device are within a threshold distance of vehicle 604*c* (e.g., first distance range 604*d* and/or second distance range 604*e*). In some embodiments, vehicle 604*c* transitions from the first state to the second state based on physical interaction with a component of vehicle 604*c* (e.g., a person in vehicle 604*c* causes a device, system, and/or component of vehicle 604*c* to transition from the first state to the second state). In some embodiments, vehicle 604*c* transitions from the first state to the second state based on a schedule (e.g., climate system of vehicle 604*c* is scheduled to transition from off to on at a particular time of day, such as at a time when a user is scheduled to leave for work each day). In some embodiments, vehicle 604*c* transitions from the first state to the second state when another suitable condition is satisfied, such as detection of one or more doors of the vehicle being opened without authorization (e.g., without a physical key and/or an electronic key causing the one or more doors of the vehicle to be unlocked and/or opened).

In response to receiving the data indicating that vehicle 604*c* has transitioned from the first state to the second state, first electronic device 600*a* and/or second electronic device 600*b* display a visual indication (e.g., a notification) indicating that the vehicle 604*c* has transitioned from the first state to the second state. In some embodiments, the visual indication is a notification, such as notification 660 and/or 664 described below. In some embodiments, the visual indication displayed by first electronic device 600*a* and/or second electronic device 600*b* includes a first portion (e.g., a first portion having a user interface object) that, when selected via user input corresponding to selection of the first portion of the visual indication, causes vehicle 604*c* to transition from the second state back to the first state. In some embodiments, first electronic device 600*a* and/or second electronic device 600*b* cause vehicle 604*c* to transition from the second state to a third state (e.g., the first state and/or another predefined state) in response to detecting user input corresponding to selection of the first portion of the visual indication. As such, displaying the visual indication provides the user with an indication of vehicle 604*c* transitioning from the first state to the second state and enables the user to cause vehicle 604*c* to transition from the second state back to the first state (or another predefined state) when the transition from the first state to the second state was unintentional and/or inadvertent. Further still, in some embodiments, the visual indication includes a second portion (e.g., a second portion that does not have the user interface object) that, when selected via user input corresponding to the second portion of the visual indication, causes first electronic device 600*a* and/or second electronic device 600*b* to display third accounts user interface 640*a* and/or third accounts user interface 640*b*, respectively.

At FIG. 6N, first electronic device 600*a* displays notification 660 after detecting that first electronic device 600*a* is within second distance range 604*e* from vehicle 604*c*. In some embodiments, first electronic device 600*a* displays notification 660 in response to receiving a communication from vehicle 604*c* confirming that the one or more doors of vehicle 604*c* have been unlocked. At FIG. 6N, first electronic device 600*a* displays notification 660 at a first portion 662*a* of display 601*a* and not at a second portion 662*b* of display 601*a*. In other words, notification 660 is a push notification that occupies less than an entire display area of display 601*a*. In some embodiments, either first electronic device 600*a* or second electronic device 600*b* being within the second threshold distance of vehicle 604*c* is sufficient to cause that respective device to unlock vehicle 604*c* (or to perform another function).

Notification 660 includes first portion 660*a* and second portion 660*b*. First portion 660*a* of notification 660 includes a visual indication 660*c* (e.g., "Car Unlocked Jane's Car") indicating that vehicle 604*c* has been unlocked in response to first electronic device 600*a* being positioned within second distance range 604*e* of vehicle 604*c*. In addition, second portion 660*b* includes locking user interface object 660*d*. Locking user interface object 660*d* of notification 660 enables a user of first electronic device 600*a* to lock vehicle 604*c* (e.g., after first electronic device 600*a* caused vehicle 604*c* to unlock based on the determination that first electronic device 600*a* is positioned within second distance range 604*e* of vehicle 604*c*). For instance, in some instances, a user walks past vehicle 604*c*, thereby causing vehicle 604*c* to unlock, without intending to unlock vehicle 604*c*. Accordingly, notification 660 includes locking user interface object 660*d* to enable the user to re-lock vehicle 604*c* when the user did not intend to unlock vehicle 604*c*.

In addition, second electronic device 600*b* displays notification 664 after detecting that second electronic device 600*b* (or first electronic device 600*a*) is within second distance range 604*e* from vehicle 604*c*. In some embodiments, second electronic device 600*b* displays notification 664 in response to receiving a communication from vehicle 604*c* (e.g., directly receiving the communication or indirectly receiving the communication via first electronic device 600*a*) confirming that the one or more doors of vehicle 604*c* have been unlocked. At FIG. 6N, second electronic device 600*b* displays notification 664 on an entire display area of display 601*b*. In other words, notification 664 is a full screen notification that occupies the entire display area of display 601*b*. At FIG. 6N, notification 664 optionally does not include a locking user interface object. In some embodiments, second electronic device 600*b* is configured to cause vehicle 604*c* to lock the one or more doors of vehicle 604*c* in response to detecting user input corresponding to selection of notification 664. In some embodiments, second electronic device 600*b* displays third accounts user interface 640*b* in response to detecting user input corresponding to selection of notification 664. In some embodiments, the first electronic device 600*a* causes vehicle 604*c* to unlock, which causes notification 664 to be displayed on second electronic device 600*b* (e.g., in addition to notification 660 being displayed on first electronic device 600*a*).

At FIG. 6N, first electronic device 600*a* detects user input 650*s* (e.g., a tap gesture) corresponding to first portion 660*a* of notification 660. In response to detecting user input 650*s*, first electronic device 600*a* display third accounts user interface 640*a* (e.g., as shown at FIGS. 6G-6L). Because first electronic device 600*a* is positioned within first distance range 604*d* from vehicle 604*c*, third accounts user interface 640*a* displays control user interface objects 632*a*, 634*a*, 636*a*, and 638*a* with the active appearance, thereby indicating that first electronic device 600*a* is enabled to control the respective functions of vehicle 604*c*.

At FIG. 6N, first electronic device 600*a* detects user input 650*t* (e.g., a tap gesture) corresponding to locking user interface object 660*d* of notification 660 (e.g., second portion 660*b* of notification 660) (e.g., rather than detecting user input 650*s*). In response to detecting user input 650*t*, first electronic device 600*a* initiates a process to cause vehicle 604*c* to lock the one or more doors of the vehicle, as shown at FIG. 6O.

At FIG. 6O, arrangement 604 illustrates that first electronic device 600*a* (and/or second electronic device 600*b*) has been moved away from vehicle 604*c* and is outside of second distance range 604*e*. Even though first electronic device 600*a* is outside of second distance range 604*e* of vehicle 604*c*, first electronic device 600*a* is still within first distance range 604*d* of vehicle 604*c*, and therefore, first electronic device 600*a* communicates with vehicle 604*c*. In response to detecting user input 650*t*, first electronic device 600*a* communicates with vehicle 604*c* (e.g., sends data and/or one or more transmissions to a computer system of vehicle 604*c*) and causes vehicle 604*c* to lock the one or more doors of vehicle 604*c*. First electronic device 600*a* maintains display of notification 660 and updates an appearance of locking user interface object 660*d* to indicate that first electronic device 600*a* is causing the one or more doors of vehicle 604*c* to lock (e.g., first electronic device 600*a* is in communication with vehicle 604*c* (e.g., a computer system of vehicle 604*c*)). For instance, locking user interface object 660*d* includes status indicator 660*e* indicating that user input 650*t* was received by first electronic device 600*a* and that first electronic device 600*a* is initiating the process to lock the one or more doors of vehicle 604*c*.

In some embodiments, first electronic device 600*a* causes vehicle 604*c* to lock the one or more doors of vehicle 604*c* in response to detecting that first electronic device 600*a* is outside of second distance range 604*e* and in response to detecting that the one or more doors of vehicle 604*c* are unlocked. As such, first electronic device 600*a* optionally causes vehicle 604*c* to lock the one or more doors when a user walks away from vehicle 604*c* and without further user input.

At FIG. 6P, first electronic device 600*a* updates notification 660 in response to detecting that the one or more doors of vehicle 604*c* have been locked (e.g., in response to receiving a communication from vehicle 640*c* (e.g., a computer system of vehicle 604*c*)). For instance, first portion 660*a* of notification includes visual indication 660*f* that vehicle 604*c* has been locked. In addition, first electronic device 600*a* updates an appearance of locking user interface object 660*d* to cease displaying status indicator 660*e* and confirm that the one or more doors of vehicle 604*c* have been locked.

At FIG. 6P, second electronic device 600*b* displays notification 668 in response to detecting that the one or more doors of vehicle 604*c* have been locked (e.g., in response to receiving a communication from vehicle 604*c* (e.g., a computer system of vehicle 604*c*) and/or a communication from first electronic device 600*a*). As such, both first electronic device 600*a* and second electronic device 600*b* are configured to provide a visual indication that vehicle 604*c* has been locked in response to first electronic device 600*a* detecting user input 650*t*.

FIGS. 7A-7B are a flow diagram illustrating a method for using an electronic key using a computer system in accordance with some embodiments. Method 700 is performed at a computer system (e.g., 100, 300, 500, 600*a*, and/or 600*b*) (e.g., an electronic device; a smart device, such as a smartphone or a smartwatch; a mobile device; a wearable device) is in communication with a display generation component (e.g., 601*a* and/or 601*b*) and one or more input devices (e.g., 601*a*, 601*b*, 609, 610, and/or 624) (e.g., a short range communication transmitter and/or receiver). Some operations in method 700 are, optionally, combined, the orders of some operations are, optionally, changed, and some operations are, optionally, omitted.

As described below, method 700 provides an intuitive way for using an electronic key. The method reduces the cognitive burden on a user for using an electronic key, thereby creating a more efficient human-machine interface. For battery-operated computing devices, enabling a user to using an electronic key faster and more efficiently conserves power and increases the time between battery charges.

The computer system (e.g., 600*a*, 600*b*) detects (702), via the one or more input devices, a vehicle (e.g., 604*c*) (e.g., a vehicle that has previously been paired and/or connected to the computer system (e.g., via a short range communication connection)).

In response to detecting the vehicle (704) and in accordance with a determination that a set of criteria is met (706) (e.g., an automatic unlock setting is activated, that the computer system and the vehicle have been paired and/or previously connected to one another (e.g., via a short range communication connection), and/or that the computer system includes a predefined amount of charge (e.g., a battery powering the computer system has above a threshold amount of stored power)), the computer system initiates (708) a process to unlock the vehicle (e.g., 604*c*) (e.g., transmitting data and/or a signal to the vehicle to cause one or more locks of the vehicle to transition from a locked state to an unlocked state (e.g., via an actuator)). The set of criteria includes a first criterion that is met when the computer system is within (e.g., determines that it is within) a threshold distance (e.g., 604*e*) (e.g., 3 feet, 5 feet, a distance between the computer system and the vehicle that establishes a short range communication connection and/or verifies that the computer system is within a proximity to the vehicle that is consistent with an intent of the user to unlock the vehicle, and/or a threshold distance is less than the distance to establish communication (e.g., not sufficient to merely be in communication)) (in some embodiments, the threshold distance is based on settings of the vehicle (e.g., set by an original manufacturer of the vehicle)) of the vehicle (e.g., 604*c*) and the set of criteria includes a second criterion that is met when an automatic unlock setting of the computer system is activated (e.g., activated via a default setting of the computer system and/or activated via user input detected via the one or more input devices of the computer system) (e.g., a setting that enables the computer system to automatically unlock and/or lock the vehicle when the computer system is within the threshold distance of the vehicle without additional user input).

In response to detecting the vehicle (704) and in accordance with a determination that the set of criteria is met (706), the computer system provides (710) output (e.g., 660 and/or 664) indicating that the vehicle is unlocked (e.g., a visual notification displayed via the display generation component, such as push notification and/or a pop-up notification; an audio notification; and/or a haptic notification). In some embodiments, the notification is displayed concurrently by the computer system and one or more external computer systems that are in communication with the computer system.

In response to detecting the vehicle (704) and in accordance with a determination that the set of criteria is met (706), the computer system displays (712), via the display generation component, a locking user interface object (e.g., 660*d*) (e.g., a button and/or an affordance that includes a visual indication indicating that the locking user interface object causes the vehicle to transition from an unlocked state to a locked state) that, when selected via user input (e.g., a tap gesture), is configured to cause the vehicle to lock (e.g., cause the computer system to communicate with the vehicle and cause one or more locks of the vehicle to transition from an unlocked state to a locked state (e.g., via an actuator of the vehicle)).

In response to detecting the vehicle (704) and in accordance with a determination that the set of criteria is not met (e.g., the first criterion is not met, the second criterion is not met, the automatic unlock setting is deactivated and/or disabled, the computer system and the vehicle have not been paired and/or previously connected to one another, and/or the computer system does not include a predefined amount of charge (e.g., a battery powering the computer system has below a threshold amount of stored power)), the computer system forgoes (714) providing the output (e.g., 660 and/or 664) indicating that the vehicle is unlocked and forgoes (714) displaying the locking user interface object (e.g., 660*d*) (and, optionally, forgoing initiating the process to unlock the vehicle).

In some embodiments, the computer system (e.g., 100, 300, 500, 600*a*, and/or 600*b*) (e.g., an electronic device; a smart device, such as a smartphone or a smartwatch; a mobile device; a wearable device) is in communication with a display generation component (e.g., 601*a* and/or 601*b*) and one or more input devices (e.g., 601*a*, 601*b*, 609, 610, and/or 624) (e.g., a short range communication transmitter and/or receiver).

In some embodiments, the computer system detects, via the one or more input devices, a vehicle (e.g., 604*c*) (e.g., a vehicle that has previously been paired and/or connected to the computer system (e.g., via a short range communication connection)).

In some embodiments, in response to detecting the vehicle (e.g., 604*c*) and in accordance with a determination that a set of criteria is met (e.g., an automatic unlock setting is activated, that the computer system and the vehicle have been paired and/or previously connected to one another (e.g., via a short range communication connection), and/or that the computer system includes a predefined amount of charge (e.g., a battery powering the computer system has above a threshold amount of stored power)), the computer system initiates a process to unlock the vehicle (e.g., 604*c*) (e.g., transmitting data and/or a signal to the vehicle to cause one or more locks of the vehicle to transition from a locked state to an unlocked state (e.g., via an actuator)). The set of criteria includes a first criterion that is met when the computer system is within (e.g., determines that it is within) a threshold distance (e.g., 604*e*) (e.g., 3 feet, 5 feet, a distance between the computer system and the vehicle that establishes a short range communication connection and/or verifies that the computer system is within a proximity to the vehicle that is consistent with an intent of the user to unlock the vehicle, and/or a threshold distance that is less than the distance to establish communication (e.g., not sufficient to merely be in communication)) of the vehicle (e.g., 604*c*) and the set of criteria includes a second criterion that is met when an automatic unlock setting is activated (e.g., activated via a default setting of the computer system and/or activated via user input detected via the one or more input devices of the computer system) (e.g., a setting that enables the computer system to automatically unlock and/or lock the vehicle when the computer system is within the threshold distance of the vehicle without additional user input). In some embodiments, the threshold distance is based on settings of the vehicle (e.g., set by an original manufacturer of the vehicle).

In some embodiments, in response to detecting the vehicle (e.g., 604*c*) and in accordance with a determination that the set of criteria is not met (e.g., the automatic unlock setting is deactivated and/or disabled, the computer system and the vehicle have not been paired and/or previously connected to one another, and/or the computer system does not include a predefined amount of charge (e.g., a battery powering the computer system has below a threshold amount of stored power)), the computer system forgoes providing output (e.g., 660 and/or 664) indicating that the vehicle (e.g., 604*c*) is unlocked.

In some embodiments, after initiating the process to unlock the vehicle (e.g., 604*c*), the computer system provides the output (e.g., 660 and/or 664) indicating that the vehicle (e.g., 604*c*) is unlocked (e.g., a visual notification, such as push notification and/or a pop-up notification; an audio notification; and/or a haptic notification). In some embodiments, the output is a notification that is displayed concurrently by the computer system and one or more external computer systems that are in communication with the computer system.

In some embodiments, after initiating the process to unlock the vehicle (e.g., 604*c*), the computer system displays, via the display generation component, a locking user interface object (e.g., 660*d*) (e.g., a button and/or an affordance that includes a visual indication indicating that the locking user interface object causes the vehicle to transition from an unlocked state to a locked state) that, when selected via user input (e.g., a tap gesture), is configured to cause the vehicle (e.g., 604c) to lock (e.g., cause the computer system to communicate with the vehicle and cause one or more locks of the vehicle to transition from an unlocked state to a locked state (e.g., via an actuator of the vehicle)).

Initiating a process to unlock the vehicle in accordance with a determination that the set of criteria is met causes the vehicle to unlock without requiring further user input. In addition, displaying the locking user interface object enables a user to cause the vehicle to re-lock when the user did not intend to unlock the vehicle without requiring the user to navigate to another user interface, thereby reducing the number of inputs needed to re-lock the vehicle. Performing an operation when a set of conditions has been met without requiring further user input and reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Providing output indicating that the vehicle is unlocked provides a user with confirmation that the request has been transmitted and/or that the vehicle has been unlocked. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while the computer system displays the locking user interface object (e.g., 660d), the computer system detects (716) a first user input (e.g., 650t) (e.g., a tap gesture, such as a single tap gesture, a double tap gesture, and/or a press gesture, such as a single press gesture, a double press gesture, and/or a long press gesture). In response to detecting the first user input and in accordance with a determination that the first user input corresponds to (e.g., is on) the locking user interface object (e.g., 660d), the computer system initiates (718) a process to lock the vehicle (e.g., 604c) (e.g., transmitting data and/or a signal to the vehicle to cause one or more locks (e.g., multiple door locks) of the vehicle to transition from an unlocked state to a locked state (e.g., via an actuator)).

Initiating the process to lock the vehicle in response to detecting the first user input and in accordance with a determination that the first user input corresponds to the locking user interface object enables a user to quickly re-lock the vehicle without having to navigate to another user interface, thereby reducing the number of inputs required. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the notification (e.g., 660 and/or 664) includes a first portion (e.g., 660b) and a second portion (e.g., 660a) that is different from the first portion (e.g., 660b), and the locking user interface object (e.g., 660d) is positioned at the first portion (e.g., 660b) of the notification (e.g., a first portion of the notification that includes display of a visual indication of the locking user interface object). While the computer system displays the notification (e.g., 660 and/or 664) indicating that the vehicle is unlocked and the locking user interface object (e.g., 660d), the computer system detects a first user input (e.g., 650s) (e.g., a tap gesture, such as a single tap gesture, a double tap gesture, and/or a long press tap gesture). In response to detecting the first user input (e.g., 650s) and in accordance with a determination that the first user input corresponds to (e.g., is on) the second portion (e.g., 660a) of the notification (e.g., 660 and/or 664) (e.g., a second portion of the notification that does not include display of a visual indication and/or representation of the locking user interface object, and/or a second portion of the notification that includes the visual indication that the vehicle is unlocked and does not include the locking user interface object), the computer system displays an accounts user interface (e.g., 640a and/or 640b) (e.g., a user interface that is associated with one or more secure credentials for which the computer system has been authorized for use) that includes one or more control user interface objects (e.g., 632a, 632b, 634a, 634b, 636a, 636b, 638a, and/or 648b) associated with the vehicle (e.g., 604c) (e.g., one or more affordances and/or buttons that, when selected via user input, are configured to cause the vehicle to perform a function, such as locking and/or unlocking the vehicle, opening and/or closing a trunk of the vehicle, turning on and/or turning off an alarm of the vehicle, turning on and/or turning off an engine of the vehicle, and/or turning on and/or turning off a climate control function of the vehicle).

Displaying the accounts user interface that includes one or more control user interface objects associated with the vehicle in response to detecting the first user input enables a user to quickly access controls for causing the vehicle to perform a function without having to provide one or more additional inputs to navigate to the accounts user interface. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the computer system provides the output indicating that the vehicle is unlocked, which includes the computer system displaying, via the display generation component, a notification (e.g., 660 and/or 664) (e.g., a push notification, a pop-up notification) indicating that the vehicle is unlocked (e.g., 660c) (e.g., a textual indication and/or an image that indicates that one or more locks of the vehicle is in an unlocked state). In some embodiments, the locking user interface object is displayed as part of the notification (e.g., on a first portion of the notification).

Displaying the notification indicating that the vehicle is unlocked provides a user with visual confirmation that the vehicle has been unlocked. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the threshold distance (e.g., 604*e*) is based on the vehicle (e.g., 604*c*) (e.g., one or more predefined settings of the vehicle, the threshold distance is a distance between the computer system and the vehicle that is not based on predefined settings of the computer system, the threshold distance is defined by settings of the vehicle (e.g., stored in memory of an external computer system associated with the vehicle), the threshold distance can be different for different types of vehicles, and/or the threshold distance can be set and/or defined by a manufacturer of the vehicle). In some embodiments, the computer system responds to requests from the vehicle with authorization to unlock the vehicle (e.g., regardless of whether the first criterion is met, as long as the rest of the set of criteria is met), but the vehicle determines, based on distance between the computer system and the vehicle, whether the vehicle should be unlocked or not.

The threshold distance being based on the vehicle enables the computer system to cause the vehicle to unlock in accordance with a determination that the computer system is within a customized distance of the vehicle without requiring further user input. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the computer system is a portable electronic device (e.g., 600*a*) (e.g., a mobile phone and/or a smart phone) and/or a wearable electronic device (e.g., 600*b*) (e.g., a smart watch).

The computer system being a portable electronic device and/or a wearable electronic device enables the computer system to be easily transported so that the computer system can be moved to within the threshold distance of the vehicle to initiate the process of unlocking the vehicle without requiring further user input. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the computer system provides the output (e.g., 660 and/or 664) indicating that the vehicle is unlocked by displaying, via the display generation component, a notification (e.g., 660 and/or 664) in a first display region (e.g., 662*a*) of the display generation component (e.g., 601*a*) without displaying the notification (e.g., 660) in a second display region (e.g., 662*b*) of the display generation component (e.g., 601*a*) (e.g., displaying a push notification (e.g., a pop-up notification that is displayed in an area of the display generation component that is less than a total area of the display generation component), such as when the computer system is a portable electronic device such as a smart phone).

Displaying the notification provides improved feedback to a user that the vehicle has been unlocked. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the computer system provides the output (e.g., 660 and/or 664) indicating that the vehicle is unlocked by displaying, via the display generation component, a full screen notification (e.g., 664) (e.g., displaying a notification that is displayed in all or substantially all of the display area of the display generation component, such as when the computer system is a wearable electronic device).

Displaying the notification using a full screen notification provides improved feedback to a user that the vehicle has been unlocked by using an enlarged displayed area. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the computer system and the vehicle are in communication with one another via a short-range communication connection, such as a Bluetooth connection, a Wi-Fi connection, and/or a Zigbee connection. In some embodiments, the threshold distance between the computer system and the vehicle is a distance that is less than a distance required to establish communication between the computer system and the vehicle (e.g., a distance that is less and/or shorter than a communication that establishes the short-range communication connection between the computer system and the vehicle).

Note that details of the processes described above with respect to method 700 (e.g., FIGS. 7A-7B) are also applicable in an analogous manner to the methods described below. For example, method 800 optionally includes one or more of the characteristics of the various methods described above with reference to method 700. For example, a computer system can cause a vehicle to perform functions in response to user input when the computer system is within a first threshold distance from the vehicle and the computer system can cause the vehicle to perform one or more functions without further user input when the computer system is within a second threshold distance from the vehicle, where the second threshold distance is a shorter distance than the first threshold distance. For brevity, these details are not repeated below.

FIGS. 8A-8B are a flow diagram illustrating a method for managing and using an electronic key using an electronic device in accordance with some embodiments. Method 800 is performed at a computer system (e.g., 100, 300, 500, 600*a*, and/or 600*b*) (e.g., an electronic device; a smart device, such as a smartphone or a smartwatch; a mobile device; and/or a wearable device) is in communication with a display generation component (e.g., 601*a* and/or 601*b*) and one or more input devices (e.g., 601*a*, 601*b*, 609, 610, and/or 624) (e.g., a short range communication transmitter and/or receiver, a touch-sensitive display, such as a touch screen, one or more physical, depressible buttons, a biometric sensor (e.g., a fingerprint sensor and/or a camera), and/or a microphone configured to receive voice (audio) commands). Some operations in method 800 are, optionally, combined, the orders of some operations are, optionally, changed, and some operations are, optionally, omitted.

As described below, method 800 provides an intuitive way for managing and using an electronic key. The method reduces the cognitive burden on a user for managing and using an electronic key, thereby creating a more efficient human-machine interface. For battery-operated computing devices, enabling a user to using an electronic key faster and more efficiently conserves power and increases the time between battery charges.

The computer system (e.g., 601*a*, 601*b*) detects (802) a user input (e.g., 650*a*, 650*b*, 650*g*, and/or 650*h*) (e.g., a tap gesture, such as a single tap gesture and/or a double tap gesture, a swipe gesture, a voice command, and/or a double-press input) corresponding to an input device (e.g., 609 and/or 610) (e.g., a physical depressible button (not part of the display) incorporated into a housing of the computer system, a touch-sensitive display, a microphone, and/or a biometric sensor) of the one or more input devices.

In response to detecting the user input (e.g., 650*a*, 650*b*, 650*g*, and/or 650*h*), the computer system displays (804), via the display generation component (e.g., 601*a* and/or 601*b*), an accounts user interface (e.g., 612*a*, 612*b*, 626*a*, 626*b*, 640*a* and/or 640*b*) (e.g., a wallet user interface and/or a user interface that includes one or more user interface objects corresponding to one or more secure credentials that enable the computer system to access an account of a user associated with the computer system and/or to control one or more external devices that are in communication with the computer system (e.g., paired to and/or linked to an account of the computer system)).

In accordance with a determination that a set of criteria is met (e.g., the computer system is within a threshold distance of a vehicle, the computer system is paired to and/or previously connected to the vehicle, and/or the computer system includes a predefined amount of charge (e.g., a battery of the computer system includes more than a threshold amount of stored power)), the set of criteria including a criterion that is met when the computer system is within a threshold distance (e.g., 604*d*) of a vehicle (e.g., 604*c*) (e.g., a threshold distance that establishes a connection (e.g., a short range communication connection) between the computer system and the vehicle, a threshold distance that is less than the distance that establishes the connection), the computer system displays (806) the accounts user interface (e.g., 612*a*, 612*b*, 626*a*, 626*b*, 640*a* and/or 640*b*) including a first user interface object (e.g., 622*a* and/or 622*b*) (e.g., a button and/or affordance) corresponding to a first secure credential (e.g., data and/or information associated with an account (e.g., an account associated with (and corresponding to) an external device, such as the vehicle) for which the computer system has been granted access) at a first position (e.g., 616*a* and/or 616*b*) (e.g., a primary position, a position that causes a user interface object in the first position to be fully displayed via the display generation component when the accounts user interface is displayed, and/or a position that is above a second position, where a user interface object in the second position is not fully displayed via the display generation component when the accounts user interface is displayed). The first secure credential is configured to provide authorization to use one or more functions of the vehicle (e.g., 604*c*) (e.g., the first secure credential includes data and/or information associated with an account for controlling functions of the vehicle, such as locking and/or unlocking the vehicle, starting and/or turning off an engine of the vehicle, starting and/or turning off a climate control system of the vehicle, opening and/or closing one or more doors and/or trunks of the vehicle, and/or activating and/or disabling an alarm of the vehicle).

In accordance with a determination that the set of criteria is not met (e.g., the computer system is not within a threshold distance of the vehicle, the computer system is not paired to and/or was not previously connected to the vehicle, and/or the computer system does not include a predefined amount of charge (e.g., a battery of the computer system includes less than a threshold amount of stored power)), the computer system displays (808) the accounts user interface (e.g., 612*a*, 612*b*, 626*a*, 626*b*, 640*a* and/or 640*b*) including a second user interface object (e.g., 614*a* and/or 614*b*) (e.g., a button and/or affordance), different from the first user interface object (e.g., 622*a* and/or 622*b*), corresponding to a second secure credential (e.g., data and/or information associated with an account (e.g., an account not associated with (and not corresponding to) the vehicle, and/or an account associated with a transaction account of a user associated with the computer system) for which the computer system has been granted access) at the first position (e.g., 616*a* and/or 616*b*) (e.g., a primary position, a position that causes a user interface object in the first position to be fully displayed via the display generation component when the accounts user interface is displayed, and/or a position that is above a second position, where a user interface object in the second position is not fully displayed via the display generation component when the accounts user interface is displayed). The second secure credential is different from the first secure credential (e.g., the second secure credential includes information about a second account that is different from a first account corresponding to the first secure credential; the second secure credential corresponds to a default secure credential (e.g., a user-selected default secure credential)).

Displaying the first user interface object or the second user interface object at the first position based on the determination of whether the set of criteria is met enables a user to quickly access a relevant secure credential based on a position and/or location of the computer system, thereby reducing an amount of user inputs needed to access the relevant secure credential. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, after (e.g., while) the computer system displays the first user interface object (e.g., 622*a* and/or 622*b*) corresponding to the first secure credential at the first position (e.g., 616*a* and/or 616*b*) (and optionally, in response to detecting user input corresponding to selection of the first user interface object), the computer system displays (810), via the display generation component (e.g., 601*a* and/or 601*b*), a plurality of control user interface objects (e.g., 632*a*, 632*b*, 634*a*, 634*b*, 636*a*, 636*b*, 638*a*, and/or 638*b*) (e.g., a plurality of affordances and/or buttons displayed concurrently with the first user interface object), where a respective control user interface object of the plurality of control user interface objects is configured to, when selected via user input corresponding to the respective control user interface object (e.g., a tap gesture, such as a single tap gesture, a double tap gesture, and/or a press gesture, such as a single press gesture, a double press gesture, and/or a long press tap gesture), cause the vehicle (e.g., 604*c*) to perform a respective function (e.g., transmit data and/or a signal to the vehicle to cause the vehicle to lock and/or unlock, cause a trunk of the vehicle to open and/or close, cause an engine of the vehicle to turn on and/or turn off, cause a climate control system of the vehicle to turn on and/or turn off, and/or cause an alarm of the vehicle to turn on and/or turn off).

Displaying the plurality of control user interface objects that, when selected via user input, cause the vehicle to perform a respective function enables a user to quickly access controls that cause the vehicle to perform a desired function, thereby reducing an amount of user inputs needed to control the vehicle. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the respective function is selected from the group consisting of: a lock function (e.g., a function corresponding to control user interface object 632a and/or 632b) (e.g., locking and/or unlocking one or more doors, controls, hatches, and/or gloveboxes of the vehicle), an engine function (e.g., turning on and/or turning off one or more engines and/or motors of the vehicle), a climate function (e.g., a function corresponding to control user interface object 634a and/or 634b) (e.g., turning on, turning off, and/or adjusting operating parameters of one or more climate control systems (e.g., an air conditioning system and/or a heating system) of the vehicle), a trunk function (e.g., a function corresponding to control user interface object 636a and/or 636b) (e.g., opening and/or closing a trunk and/or hatch of the vehicle), and an alarm function (e.g., a function corresponding to control user interface object 638a and/or 638b) (e.g., turning on and/or turning off a horn and/or an alarm system (e.g., an audio alarm system and/or a lighting alarm system) of the vehicle).

Displaying the plurality of control user interface objects that, when selected via user input, cause the vehicle to perform a lock function, an engine function, a climate function, a trunk function, and/or an alarm function enables a user to quickly and simply control the vehicle without having to be located within the vehicle. Providing an ability to control different functions of a vehicle without having to be within the vehicle enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the plurality of control user interface objects (e.g., 632a, 632b, 634a, 634b, 636a, 636b, 638a, and/or 638b) includes a first control user interface object (e.g., 634a and/or 634b) corresponding to a climate function of the vehicle (e.g., 604c) (e.g., an affordance and/or button that, when selected via user input, causes one or more climate systems (e.g., an air conditioning system and/or a heating system) of the vehicle to turn on, turn off, and/or adjust their operating parameters to control a temperature within the vehicle to a predefined temperature). While the computer system displays the first control user interface object (e.g., 634a and/or 634b), the computer system detects, via the one or more input devices (e.g., 609, 610, and/or 624), a second user input (e.g., 650k and/or 650l) (e.g., a tap gesture, such as a single tap gesture). In response to detecting the second user input (e.g., 650k and/or 650l), in accordance with a determination that the second user input corresponds to selection of the first control user interface object (e.g., 634a and/or 634b), and in accordance with a determination that the vehicle (e.g., 604c) satisfies a first set of criteria (e.g., the vehicle is powered by and/or at least partially driven by a gas-powered engine and/or the vehicle utilizes a gas-powered engine to supply power to a climate control system (e.g., an air conditioning system and/or a heating system) of the vehicle), the computer system displays, via the display generation component, a notification user interface object (e.g., 644a and/or 644b) (e.g., a push notification and/or a pop-up notification including one or more visual indicators that prompt a user to confirm whether the vehicle is in an appropriate location for starting an engine of the vehicle) with a visual indication (e.g., 646a and/or 646b) (e.g., a textual indication) indicating that an engine of the vehicle (e.g., 604c) will be initiated in response to initiating the climate function.

In some embodiments, the computer system causes the climate control system of the vehicle to activate in response to detecting user input corresponding to the notification user interface object. In some embodiments, the computer system forgoes causing the climate control system of the vehicle to activate until detecting confirmation user input corresponding to the notification user interface object (e.g., a confirmation user interface object of the notification user interface object). In some embodiments, the computer system forgoes causing the climate control system of the vehicle to activate without detecting the confirmation user input and/or in response to detecting an absence of user input while displaying the notification user interface object. In some embodiments, in response to detecting the second user input and in accordance with a determination that the second user input corresponds to selection of the first control user interface object and that the vehicle does not satisfy the first set of criteria, the computer system forgoes displaying the first notification user interface object and, optionally, initiates the climate function.

Displaying the notification user interface object with the visual indication indicating that the engine of the vehicle will be initiated in response to initiating the climate function provides a confirmation that the user understands that the engine of the vehicle will be initiated and/or that the vehicle is located in a suitable area for initiating the engine. Confirming that the engine of the vehicle will be initiated and/or that the vehicle is located in a suitable area for initiating the engine enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the plurality of control user interface objects (e.g., 632a, 632b, 634a, 634b, 636a, 636b, 638a, and/or 638b) includes a second control user interface object (e.g., 634a and/or 634b) (e.g., the first control user interface object) corresponding to a climate function (e.g., an affordance and/or button that, when selected via user input, causes one or more climate systems (e.g., an air conditioning system and/or a heating system) of the vehicle to turn on, turn off, and/or adjust their operating parameters to control a temperature within the vehicle to a predefined temperature). While the computer system displays the second control user interface object (e.g., 634a and/or 634b), the computer system detects, via the one or more input devices (e.g., 609, 610, and/or 624), a second user input (e.g., 650k, 650l, 650m, and/or 650n) (e.g., a tap gesture, such as a single tap gesture). In response to detecting the second user input (e.g., 650k, 650l, 650m, and/or 650n) and in accordance with a determination that the second user input corresponds to the second control user interface object (e.g., 634a and/or 634b), the computer system causes the climate function of the vehicle (e.g., 604c) to adjust a temperature of the vehicle (e.g., 604c) (e.g., a temperature within a passenger compartment and/or a temperature of at least a portion of an interior of the vehicle) to a predefined temperature (e.g., causing the one or more climate systems (e.g., an air conditioning system and/or a heating system) of the vehicle to turn on, such that a temperature within the vehicle is heated and/or cooled to a predefined temperature (e.g., a temperature set by the user and/or a default temperature defined by settings of the vehicle)).

Causing the climate function of the vehicle to adjust the temperature of the vehicle to the predefined temperature in response to detecting the second user input enables a user to control the climate function of the vehicle without having to be physically present within the vehicle. Providing an ability to control the climate function of a vehicle without having to be within the vehicle enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the plurality of control user interface objects (e.g., 632a, 632b, 634a, 634b, 636a, 636b, 638a, and/or 638b) includes a third control user interface object (e.g., a control user interface object different from the first control user interface object and the second control user interface object) corresponding to an engine function (e.g., an affordance and/or button that, when selected via user input, causes one or more engines and/or motors of the vehicle to turn on and/or turn off). While the computer system displays the third control user interface object, the computer system detects, via the one or more input devices (e.g., 609, 610, and/or 624), a second user input (e.g., a tap gesture, such as a single tap gesture). In response to detecting the second user input, in accordance with a determination that the second user input corresponds to the third control user interface object, and in accordance with a determination that the vehicle satisfies a second set of criteria (e.g., the first set of criteria and/or the vehicle is powered by and/or at least partially driven by a gas-powered engine), the computer system displays, via the display generation component, a second notification user interface object (e.g., 644a and/or 644b) (e.g., a push notification and/or a pop-up notification including one or more visual indicators that prompt a user to confirm whether the vehicle is in an appropriate location for starting an engine of the vehicle) with a visual indication (e.g., 646a and/or 646b) (e.g., a textual indication) indicating that an engine of the vehicle (e.g., 604c) will be initiated in response to initiating the engine function.

In some embodiments, the computer system causes the engine of the vehicle to start in response to detecting user input corresponding to the notification user interface object. In some embodiments, the computer system does not cause the engine of the vehicle to start until detecting confirmation user input corresponding to the second notification user interface object (e.g., a confirmation user interface object of the second notification user interface object). In some embodiments, the computer system forgoes causing the engine of the vehicle to start without detecting the confirmation user input and/or in response to detecting an absence of user input while displaying the second notification user interface object. In some embodiments, in response to detecting the second user input and in accordance with a determination that the second input corresponds to the third control user interface object and that the vehicle does not satisfy the second set of criteria, the computer system forgoes displaying the second notification user interface object and, optionally, initiates the engine function.

Displaying the second notification user interface object with the visual indication indicating that the engine of the vehicle will be initiated in response to initiating the engine function provides a confirmation that the user understands that the engine of the vehicle will be initiated and/or that the vehicle is located in a suitable area for initiating the engine. Confirming that the engine of the vehicle will be initiated and/or that the vehicle is located in a suitable area for initiating the engine enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the plurality of control user interface objects (e.g., 632a, 632b, 634a, 634b, 636a, 636b, 638a, and/or 638b) includes a fourth control user interface object (e.g., 632a, 632b, 634a, 634b, 636a, 636b, 638a, and/or 638b) (e.g., the first control user interface object, the second control user interface object, the third control user interface object, and/or a control user interface object that is different from the first control user interface object, the second control user interface object, and the third control user interface object) having a status indicator (e.g., 652a, 652b, 653a, 653b, 654a, 654b, 656a, and/or 656b) (e.g., a visual indication of a status of a respective function of the vehicle that corresponds to the fourth control user interface object), where the status indicator (e.g., 652a, 652b, 653a, 653b, 654a, 654b, 656a, and/or 656b) is updated to indicate a status of a respective function of the vehicle (e.g., 604c) corresponding to the fourth control user interface object (e.g., 632a, 632b, 634a, 634b, 636a, 636b, 638a, and/or 638b) in real-time (e.g., the status indicator updates to visually indicate a status based on a communication between the computer system and the vehicle). In some embodiments, the status indicator is updated to indicate the status of the respective function of the vehicle in real-time in accordance with a determination that the computer system is within the threshold distance of the vehicle, where the threshold distance of the vehicle is equal to or less than a distance that is required to establish a short-range communication between the computer system and the vehicle.

Including a fourth control user interface object having a status indicator that is updated to indicate the status of a respective function of the vehicle in real-time provides a user with improved feedback as to the current status of the respective function. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while the computer system displays the first user interface object (e.g., 622a and/or 622b) corresponding to the first secure credential at the first position (e.g., 616a and/or 616b), the computer system displays (812), via the display generation component (e.g., 601a and/or 601b), the second user interface object (e.g., 614a and/or 614b) corresponding to the second secure credential at a second position (e.g., 623a and/or 623b) (e.g., a default position, a shortcut position, and/or a position that causes the second user interface object to be partially displayed via the display generation component), different from the first position (e.g., 616a and/or 616b), where the second secure credential is not authorized for use when the second user interface object (e.g., 614a and/or 614b) is displayed at the second position (e.g., 623a and/or 623b) (e.g., the first secure credential of the first user interface object is active for use when the first user interface object is displayed at the first position, but the second secure credential of the second user interface object is not active for use when not in the first position and/or when in the second position). In some embodiments, the second user interface object is displayed at the second position in accordance with a determination that the computer system is within a second threshold distance from the vehicle, where the second threshold distance is less (e.g., shorter) than the threshold distance (e.g., the second threshold distance is a distance associated with the computer system being positioned within a passenger compartment of the vehicle, and thus, a distance that is indicative of the user intending to engage in a transaction while positioned within the vehicle (e.g., the user is at a drive through)).

Displaying the second user interface object corresponding to the second secure credential at the second position, enables a user to quickly select and/or activate the second secure credential without having to navigate to another user interface. Reducing a number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the second secure credential corresponds to a user-selected default secure credential (e.g., the second secure credential is selected via user input (e.g., user input corresponding to a preferred secure credential of a user associated with the computer system) to designate the second secure credential as a default secure credential that is displayed at the first position (e.g., and activated for use) when the computer system is not within the threshold distance of the vehicle, the second secure credential is used most frequently by a user associated with the computer system, the second secure credential was used most recently by a user associated with the computer system, and/or the second secure credential is an earliest secure credential authorized for use with the computer system). In some embodiments, the second secure credential corresponds to a payment account.

Enabling the second secure credential to be a user-selected default secure credential enables a user to quickly access a preferred and/or default secure credential that the user uses most frequently without having to navigate to another user interface. Reducing a number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the computer system detects (814) that the computer system is within a second threshold distance (e.g., 604e) of the vehicle (e.g., 604c) (e.g. enters the second threshold distance by reducing the distance between the computer system and the vehicle without being inside the vehicle), where the second threshold distance (e.g., 604e) is less than the threshold distance (e.g., 604d) (e.g., the second threshold distance is less (e.g., shorter) than a distance required to establish a short-range communication connection between the computer system and the vehicle and/or the second threshold distance is a distance between the computer system and the vehicle that is indicative of a user's intention to unlock and/or gain entry to the vehicle). In response to detecting that the computer system is within the second threshold distance (e.g., 604e) of the vehicle (e.g., 604c), the computer system initiates (816) a process to unlock the vehicle (e.g., 604c) (e.g., initiating the process to unlock the vehicle without requiring and/or receiving further user input) (e.g., initiating the process to unlock the vehicle includes the computer system transmitting data and/or a signal to the vehicle to cause one or more locks of the vehicle to transition from a locked state to an unlocked state (e.g., via an actuator)). In some embodiments, in response to detecting that the computer system is within the second threshold distance of the vehicle, the computer system further provides an output indicating that the vehicle is unlocked and/or displays a locking user interface object that, when selected via user input, is configured to initiate a process for locking the vehicle.

Initiating a process to unlock the vehicle in accordance with a determination that the set of criteria is met causes the vehicle to unlock without requiring further user input. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the computer system displays, via the display generation component (e.g., 601a and/or 601b), a plurality of control user interface objects (e.g., 632a, 632b, 634a, 634b, 636a, 636b, 638a, and/or 638b) (e.g., a plurality of affordances and/or buttons displayed concurrently with the first user interface object). In accordance with a determination that the computer system is within the threshold distance (e.g., 604d) of the vehicle (e.g., 604c), the computer system displays the plurality of control user interface objects (e.g., 632a, 632b, 634a, 634b, 636a, 636b, 638a, and/or 638b) with a first appearance (e.g., an active appearance and/or normal appearance (e.g., a non-gray color scheme and/or a full brightness) that visually indicates that the plurality of control user interface objects can be selected to cause the vehicle to perform the respective functions associated with the plurality of control user interface objects). In some embodiments, while the computer system is within the threshold distance of the vehicle and, therefore, the plurality of control user interface objects are displayed with the first appearance, a respective control user interface object of the plurality of control user interface objects is configured to, when selected via user input corresponding to the respective control user interface object (e.g., a tap gesture, such as a single tap gesture, a double tap gesture, and/or a press gesture, such as a single press gesture, a double press gesture, and/or a long press tap gesture), cause the vehicle to perform a respective function (e.g., transmit data and/or a signal to the vehicle to cause the vehicle to lock and/or unlock, cause a trunk of the vehicle to open and/or close, cause an engine of the vehicle to turn on and/or turn off, cause a climate control system of the vehicle to turn on and/or turn off, and/or cause an alarm of the vehicle to turn on and/or turn off). In accordance with a determination that the computer system is not within the threshold distance (e.g., 604*d*) of the vehicle (e.g., 604*e*), the computer system displays the plurality of control user interface objects (e.g., 632*a*, 632*b*, 634*a*, 634*b*, 636*a*, 636*b*, 638*a*, and/or 638*b*) with a second appearance (e.g., an inactive appearance (e.g., a gray color scheme and/or a reduced brightness that is less than a full brightness) that visually indicates that the plurality of control user interface objects cannot be selected to cause the vehicle to perform the respective functions associated with the plurality of control user interface objects), different from the first appearance. In some embodiments, while the computer system is not within the threshold distance of the vehicle and, therefore, the plurality of control user interface objects are displayed with the second appearance, a respective control user interface object of the plurality of control user interface objects is configured to, when selected via user input corresponding to the respective control user interface object (e.g., a tap gesture, such as a single tap gesture, a double tap gesture, and/or a press gesture, such as a single press gesture, a double press gesture, and/or a long press tap gesture), provide the user with feedback (e.g., visual feedback) that the respective function is not available.

Displaying the plurality of control user interface objects with the first appearance or the second appearance based on the determination of whether or not the computer system is within the threshold distance of the vehicle provides the user with improved feedback as to whether the control user interface objects are active and/or enabled to cause the vehicle to control the respective functions. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while the computer system displays the plurality of control user interface objects (e.g., 632*a*, 632*b*, 634*a*, 634*b*, 636*a*, 636*b*, 638*a*, and/or 638*b*) with the second appearance, different from the first appearance, the computer system detects, via the one or more input devices (e.g., 601*a*, 601*b*, 609, 610, and/or 624), a third user input (e.g., 650*u* and/or 650*v*) (e.g., a tap gesture, such as a single tap gesture) corresponding to a fifth control user interface object (e.g., 632*a*, 632*b*, 634*a*, 634*b*, 636*a*, 636*b*, 638*a*, and/or 638*b*) (e.g., the first control user interface object, the second control user interface object, the third control user interface object, the fourth control user interface object, and/or a control user interface object that is different from the first control user interface object, the second control user interface object, the third control user interface object, and the fourth control user interface object) of the plurality of control user interface objects (e.g., 632*a*, 632*b*, 634*a*, 634*b*, 636*a*, 636*b*, 638*a*, and/or 638*b*). In response to detecting the third user input (e.g., 650*u* and/or 650*v*) and in accordance with a determination that the computer system is not within the threshold distance (e.g., 650*d*) of the vehicle (e.g., 604*c*), the computer system displays, via the display generation component, an animation (e.g., a change in appearance of the fifth control user interface object over time, such as a change in a size of the fifth control user interface object, a change in color of the fifth control user interface object, a change in brightness of the fifth control user interface object, and/or a change in an amount of blur applied to the fifth control user interface object) of the fifth control user interface object (e.g., 632*a*, 632*b*, 634*a*, 634*b*, 636*a*, 636*b*, 638*a*, and/or 638*b*) without causing the vehicle (e.g., 604*c*) to perform a respective function corresponding to the fifth control user interface object (e.g., 632*a*, 632*b*, 634*a*, 634*b*, 636*a*, 636*b*, 638*a*, and/or 638*b*) (e.g., when the computer system is not within the threshold distance of the vehicle, the computer system cannot cause the vehicle to perform various functions, and thus, the plurality of control user interface objects include an appearance that visually indicates that the plurality of control user interface objects will not cause the vehicle to perform the various functions).

Displaying the animation of the fifth control user interface object in response to detecting the third user input provides improved feedback to the user that the fifth control user interface object is not active and/or enabled to cause the vehicle to perform the respective function. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while the computer system displays the first user interface object (e.g., 622*a* and/or 622*b*) (e.g., concurrently with the second user interface object and/or in a position different from the first position) corresponding to the first secure credential (e.g., at the first position or at a second position that is different from the first position (e.g., not in the primary position, and/or in a stack of user interface objects below the first position)), the computer system detects, via the one or more input devices (e.g., 601*a*, 601*b*, 609, 610, and/or 624), a fourth user input (e.g., 650*i* and/or 650*j*) (e.g., a tap gesture, such as a single tap gesture, a rotational input, and/or a press gesture on a physical input device of the computer system) corresponding to selection of the first user interface object. In response to detecting the fourth user input (e.g., 650*i* and/or 650*j*) corresponding to selection of the first user interface object (e.g., 622*a* and/or 622*b*), the computer system displays, via the display generation component (e.g., 601*a* and/or 601*b*), a plurality of control user interface objects (e.g., 632*a*, 632*b*, 634*a*, 634*b*, 636*a*, 636*b*, 638*a*, and/or 638*b*) (e.g., the plurality of control user interface objects are not displayed concurrently with the first user interface object in response to detecting the user input and/or the plurality of control user interface objects are displayed after detecting the fourth user input), where a respective control user interface object of the plurality of control user interface objects (e.g., 632*a*, 632*b*, 634*a*, 634*b*, 636*a*, 636*b*, 638*a*, and/or 638*b*) is configured to, when selected via user input corresponding to the respective control user interface object (e.g., a tap gesture, such as a single tap gesture, a double tap gesture, and/or a press gesture, such as a single press gesture, a double press gesture, and/or a long press tap gesture), cause (e.g., when in communication with the vehicle) the vehicle (e.g., 604*c*) to perform a respective function (e.g., transmit data and/or a signal to the vehicle to cause the vehicle to lock and/or unlock, cause a trunk of the vehicle to open and/or close, cause an engine of the vehicle to turn on and/or turn off, cause a climate control system of the vehicle to turn on and/or turn off, and/or cause an alarm of the vehicle to turn on and/or turn off).

Displaying the plurality of control user interface objects that, when selected via user input, cause the vehicle to perform a respective function in response to detecting the fourth user input enables a user to cause the vehicle to perform a respective function without the user having to be physically present within the vehicle. Enabling the user to cause the vehicle to perform a respective function without the user having to be physically present within the vehicle enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to provide users with relevant user interfaces and/or to cause a vehicle to perform one or more functions. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to display relevant user interfaces and/or to cause a vehicle to perform one or more functions. Accordingly, use of such personal information data enables users to quickly cause a vehicle to perform one or more functions based on a location of the device. Further, other uses for personal information data that benefit the user are also contemplated by the present disclosure.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of proximity detection and/or location-based data, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

What is claimed is:
1. A computer system, comprising:
a display generation component;
one or more input devices;
one or more processors; and memory storing one or more programs configured to be executed by the one or more processors, the one or more programs including instructions for:

detecting, via the one or more input devices, a user input requesting to display an accounts user interface;

in response to detecting the user input requesting to display the accounts user interface, displaying, via the display generation component, the accounts user interface, wherein displaying the accounts user interface includes:

displaying, via the display generation component, a first user interface object corresponding to a first secure credential, wherein the first secure credential corresponds to a vehicle; and displaying, via the display generation component, a second user interface object corresponding to a second secure credential, wherein the second secure credential does not correspond to the vehicle;

while displaying the accounts user interface, detecting, via the one or more input devices, user input corresponding to selection of the first user interface object; and in response to detecting the user input corresponding to selection of the first user interface object:

in accordance with a determination that the computer system is within a threshold range of the vehicle, displaying, via the display generation component, one or more control user interface objects with a first appearance; and in accordance with a determination that the computer system is outside of the threshold range of the vehicle, displaying, via the display generation component, the one or more control user interface objects with a second appearance that is different from the first appearance.

2. The computer system of claim 1, wherein:

the first appearance indicates that the one or more control user interface objects are in an active state; and the second appearance indicates that the one or more control user interface objects are in an inactive state.

3. The computer system of claim 1, wherein:

the first appearance includes a first brightness; and the second appearance includes a second brightness that is less than the first brightness.

4. The computer system of claim 1, wherein:

displaying the one or more control user interface objects with the first appearance includes displaying the one or more control user interface objects without a gray color scheme; and displaying the one or more control user interface objects with the second appearance includes displaying the one or more control user interface objects with a gray color scheme.

5. The computer system of claim 1, wherein the one or more programs further include instructions for:

while displaying the one or more control user interface objects with the first appearance, detecting, via the one or more input devices, user input corresponding to selection of a respective control user interface object of the one or more control user interface objects; and in response to detecting the user input corresponding to selection of the respective control user interface object of the one or more control user interface objects, causing the vehicle to perform a respective function.

6. The computer system of claim 5, wherein the respective function is selected from the group consisting of: a lock function, an engine function, a climate function, a trunk function, and an alarm function.

7. The computer system of claim 1, wherein the one or more programs further include instructions for:

while displaying the one or more control user interface objects with the second appearance, detecting, via the one or more input devices, user input corresponding to selection of a respective control user interface object of the one or more control user interface objects; and in response to detecting the user input corresponding to selection of the respective control user interface object of the one or more control user interface objects, forgoing causing the vehicle to perform a respective function.

8. The computer system of claim 7, wherein the one or more programs further include instructions for:

in response to detecting the user input corresponding to selection of the respective control user interface object of the one or more control user interface objects, displaying, via the display generation component, an animation of the respective control user interface object.

9. The computer system of claim 1, wherein the one or more programs further include instructions for:

in accordance with the determination that the computer system is outside of the threshold range of the vehicle, displaying, via the display generation component, an indication that the computer system is outside of the threshold range of the vehicle.

10. The computer system of claim 1, wherein the one or more programs further include instructions for:

while displaying the one or more control user interface objects with the first appearance, receiving information about a status of the vehicle; and in response to receiving the information about the status of the vehicle, displaying, via the display generation component, a first control user interface object of the one or more control user interface objects with a status indicator corresponding to the information about the status of the vehicle.

11. The computer system of claim 1, wherein the one or more programs further include instructions for:

detecting that the computer system is within a second threshold distance of the vehicle, wherein the second threshold distance is less than the threshold distance; and in response to detecting that the computer system is within the second threshold distance of the vehicle, initiating a process to unlock the vehicle.

12. A non-transitory computer-readable storage medium storing one or more programs configured to be executed by one or more processors of a computer system that is in communication with a display generation component and one or more input devices, the one or more programs including instructions for:

detecting, via the one or more input devices, a user input requesting to display an accounts user interface;

in response to detecting the user input requesting to display the accounts user interface, displaying, via the display generation component, the accounts user interface, wherein displaying the accounts user interface includes:

displaying, via the display generation component, a first user interface object corresponding to a first secure credential, wherein the first secure credential corresponds to a vehicle; and displaying, via the display generation component, a second user interface object corresponding to a second secure credential, wherein the second secure credential does not correspond to the vehicle;

while displaying the accounts user interface, detecting, via the one or more input devices, user input corresponding to selection of the first user interface object; and in response to detecting the user input corresponding to selection of the first user interface object:

in accordance with a determination that the computer system is within a threshold range of the vehicle, displaying, via the display generation component, one or more control user interface objects with a first appearance; and in accordance with a determination that the computer system is outside of the threshold range of the vehicle, displaying, via the display generation component, the one or more control user interface objects with a second appearance that is different from the first appearance.

13. The non-transitory computer-readable storage medium of claim 12, wherein:

the first appearance indicates that the one or more control user interface objects are in an active state; and the second appearance indicates that the one or more control user interface objects are in an inactive state.

14. The non-transitory computer-readable storage medium of claim 12, wherein:

the first appearance includes a first brightness; and the second appearance includes a second brightness that is less than the first brightness.

15. The non-transitory computer-readable storage medium of claim 12, wherein:

displaying the one or more control user interface objects with the first appearance includes displaying the one or more control user interface objects without a gray color scheme; and displaying the one or more control user interface objects with the second appearance includes displaying the one or more control user interface objects with a gray color scheme.

16. The non-transitory computer-readable storage medium of claim 12, wherein the one or more programs further include instructions for:

while displaying the one or more control user interface objects with the first appearance, detecting, via the one or more input devices, user input corresponding to selection of a respective control user interface object of the one or more control user interface objects; and in response to detecting the user input corresponding to selection of the respective control user interface object of the one or more control user interface objects, causing the vehicle to perform a respective function.

17. The non-transitory computer-readable storage medium of claim 16, wherein the respective function is selected from the group consisting of: a lock function, an engine function, a climate function, a trunk function, and an alarm function.

18. The non-transitory computer-readable storage medium of claim 12, wherein the one or more programs further include instructions for:

while displaying the one or more control user interface objects with the second appearance, detecting, via the one or more input devices, user input corresponding to selection of a respective control user interface object of the one or more control user interface objects; and in response to detecting the user input corresponding to selection of the respective control user interface object of the one or more control user interface objects, forgoing causing the vehicle to perform a respective function.

19. The non-transitory computer-readable storage medium of claim 18, wherein the one or more programs further include instructions for:

in response to detecting the user input corresponding to selection of the respective control user interface object of the one or more control user interface objects, displaying, via the display generation component, an animation of the respective control user interface object.

20. The non-transitory computer-readable storage medium of claim 12, wherein the one or more programs further include instructions for:

in accordance with the determination that the computer system is outside of the threshold range of the vehicle, displaying, via the display generation component, an indication that the computer system is outside of the threshold range of the vehicle.

21. The non-transitory computer-readable storage medium of claim 12, wherein the one or more programs further include instructions for:

while displaying the one or more control user interface objects with the first appearance, receiving information about a status of the vehicle; and in response to receiving the information about the status of the vehicle, displaying, via the display generation component, a first control user interface object of the one or more control user interface objects with a status indicator corresponding to the information about the status of the vehicle.

22. The non-transitory computer-readable storage medium of claim 12, wherein the one or more programs further include instructions for:

detecting that the computer system is within a second threshold distance of the vehicle, wherein the second threshold distance is less than the threshold distance; and in response to detecting that the computer system is within the second threshold distance of the vehicle, initiating a process to unlock the vehicle.

23. A method, comprising:

at a computer system that is in communication with a display generation component and one or more input devices:

detecting, via the one or more input devices, a user input requesting to display an accounts user interface;

in response to detecting the user input requesting to display the accounts user interface, displaying, via the display generation component, the accounts user interface, wherein displaying the accounts user interface includes:

displaying, via the display generation component, a first user interface object corresponding to a first secure credential, wherein the first secure credential corresponds to a vehicle; and displaying, via the display generation component, a second user interface object corresponding to a second secure credential, wherein the second secure credential does not correspond to the vehicle;

while displaying the accounts user interface, detecting, via the one or more input devices, user input corresponding to selection of the first user interface object; and in response to detecting the user input corresponding to selection of the first user interface object:

in accordance with a determination that the computer system is within a threshold range of the vehicle, displaying, via the display generation component, one or more control user interface objects with a first appearance; and in accordance with a determination that the computer system is outside of the threshold range of the vehicle, displaying, via the display generation component, the one or more control user interface objects with a second appearance that is different from the first appearance.

24. The method of claim 23, wherein:

the first appearance indicates that the one or more control user interface objects are in an active state; and the second appearance indicates that the one or more control user interface objects are in an inactive state.

25. The method of claim 23, wherein:

the first appearance includes a first brightness; and the second appearance includes a second brightness that is less than the first brightness.

26. The method of claim 23, wherein:

displaying the one or more control user interface objects with the first appearance includes displaying the one or more control user interface objects without a gray color scheme; and displaying the one or more control user interface objects with the second appearance includes displaying the one or more control user interface objects with a gray color scheme.

27. The method of claim 23, further comprising:

while displaying the one or more control user interface objects with the first appearance, detecting, via the one or more input devices, user input corresponding to selection of a respective control user interface object of the one or more control user interface objects; and in response to detecting the user input corresponding to selection of the respective control user interface object of the one or more control user interface objects, causing the vehicle to perform a respective function.

28. The method of claim 27, wherein the respective function is selected from the group consisting of: a lock function, an engine function, a climate function, a trunk function, and an alarm function.

29. The method of claim 13, further comprising:

while displaying the one or more control user interface objects with the second appearance, detecting, via the one or more input devices, user input corresponding to selection of a respective control user interface object of the one or more control user interface objects; and in response to detecting the user input corresponding to selection of the respective control user interface object of the one or more control user interface objects, forgoing causing the vehicle to perform a respective function.

30. The method of claim 29, further comprising:

in response to detecting the user input corresponding to selection of the respective control user interface object of the one or more control user interface objects, displaying, via the display generation component, an animation of the respective control user interface object.

31. The method of claim 23, further comprising:

in accordance with the determination that the computer system is outside of the threshold range of the vehicle, displaying, via the display generation component, an indication that the computer system is outside of the threshold range of the vehicle.

32. The method of claim 23, further comprising:

while displaying the one or more control user interface objects with the first appearance, receiving information about a status of the vehicle; and in response to receiving the information about the status of the vehicle, displaying, via the display generation component, a first control user interface object of the one or more control user interface objects with a status indicator corresponding to the information about the status of the vehicle.

33. The method of claim 23, further comprising:

detecting that the computer system is within a second threshold distance of the vehicle, wherein the second threshold distance is less than the threshold distance; and in response to detecting that the computer system is within the second threshold distance of the vehicle, initiating a process to unlock the vehicle.

* * * * *